(12) United States Patent
Akin et al.

(10) Patent No.: US 12,163,692 B1
(45) Date of Patent: Dec. 10, 2024

(54) HVAC APPARATUS, METHOD, AND SYSTEM

(71) Applicants: Joe A. Akin, Hoover, AL (US); Auburn University, Hoover, AL (US)

(72) Inventors: Joe A. Akin, Hoover, AL (US); David F. Dyer, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 17/822,014

(22) Filed: Aug. 24, 2022

Related U.S. Application Data

(60) Division of application No. 16/113,939, filed on Aug. 27, 2018, now Pat. No. 11,454,407, which is a continuation of application No. 14/199,336, filed on Mar. 6, 2014, now Pat. No. 10,072,856.

(60) Provisional application No. 61/773,446, filed on Mar. 6, 2013.

(51) Int. Cl.
  *F24F 5/00*   (2006.01)
  *F24D 12/02*  (2006.01)
  *F24D 19/10*  (2006.01)

(52) U.S. Cl.
  CPC ............ *F24F 5/0046* (2013.01); *F24D 12/02* (2013.01); *F24D 19/1087* (2013.01)

(58) Field of Classification Search
  CPC ..... F24F 5/0046; F24D 12/02; F24D 19/1087
  See application file for complete search history.

(56) References Cited

U.S. PATENT DOCUMENTS

| | | |
|---|---|---|
| 3,174,541 A | 3/1965 | Brandt |
| 3,302,695 A | 2/1967 | Payne |
| 3,357,763 A | 12/1967 | Toper |
| 3,583,175 A | 6/1971 | Eubank |
| 4,072,187 A | 2/1978 | Lodge |
| 4,127,162 A | 11/1978 | Braver |
| 4,169,500 A | 10/1979 | Braver |
| 4,476,920 A * | 10/1984 | Drucker ................ F25B 29/003 165/242 |
| 4,554,796 A | 11/1985 | Stankard |
| 4,919,123 A | 4/1990 | Jackson et al. |
| 5,034,033 A | 7/1991 | Alsup, Jr. et al. |

(Continued)

FOREIGN PATENT DOCUMENTS

EP    0895038 A1   2/1999

*Primary Examiner* — Raheena R Malik
(74) *Attorney, Agent, or Firm* — McKee, Voorhees & Sease, PLC

(57) ABSTRACT

The invention relates to an HVAC apparatus, method, and system. Aspects of the invention include a supplemental heat source with an air handler unit for a conventional forced air heating and cooling system. The supplemental heat source in one example is a hydronic subsystem. It can be used alone or to supplement the forced air subsystem. Another aspect of the invention includes an air handling subsystem that has a housing that can be highly flexible in configuration and installation. The housing can support internal components, including a hydronic or other supplemental heat source with the forced air components. At least two sides of the housing can be configured for access for maintenance and repair. A control system can be designed to eliminate need for defrost cycle for forced air refrigeration-type subsystem and/or for better maintenance for comfort in the air conditioned space.

14 Claims, 40 Drawing Sheets

(56) References Cited

U.S. PATENT DOCUMENTS

| | | |
|---|---|---|
| 5,109,677 A | 5/1992 | Phillippe |
| 5,239,834 A | 8/1993 | Travers |
| 5,292,280 A | 3/1994 | Janu et al. |
| 5,332,028 A | 7/1994 | Marris |
| 5,367,100 A | 11/1994 | Gongwei et al. |
| 5,367,601 A | 11/1994 | Hannabery |
| 5,377,503 A | 1/1995 | Reedy et al. |
| 5,658,166 A | 11/1997 | Li |
| 5,752,654 A | 5/1998 | Mowery, Sr. et al. |
| 5,963,458 A | 10/1999 | Cascia |
| 6,098,416 A | 8/2000 | Addington et al. |
| 6,101,829 A | 8/2000 | Robinson |
| 6,467,284 B1 | 10/2002 | Chen et al. |
| 6,467,288 B2 | 10/2002 | Kuroki |
| 6,467,289 B2 | 10/2002 | Kuroki |
| 6,591,628 B2 | 7/2003 | Mochizuki et al. |
| 6,685,556 B1 | 2/2004 | Bertin |
| 6,729,153 B2 | 5/2004 | Moon et al. |
| 7,007,495 B2 | 3/2006 | Lee et al. |
| 7,007,498 B2 | 3/2006 | Hansen |
| 7,065,978 B2 | 6/2006 | Hong et al. |
| 7,263,850 B2 | 9/2007 | Eom et al. |
| 7,370,489 B2 | 5/2008 | Rios et al. |
| 7,621,140 B2 | 11/2009 | Schnell et al. |
| 7,793,514 B2 | 9/2010 | Rios et al. |
| 7,849,700 B2 | 12/2010 | Seefeldt |
| 8,056,352 B2 | 11/2011 | Kang et al. |
| 8,540,557 B1 | 9/2013 | Derks et al. |
| 9,441,855 B2 | 9/2016 | Marks |
| 10,480,817 B2 | 11/2019 | Kashihara et al. |
| 10,588,245 B2 | 3/2020 | Lucia et al. |
| 2006/0266074 A1 | 11/2006 | Groll |
| 2008/0098760 A1 | 5/2008 | Seefeldt |
| 2012/0216558 A1 | 8/2012 | Dempsey et al. |
| 2013/0042635 A1 | 2/2013 | Nelson et al. |

\* cited by examiner

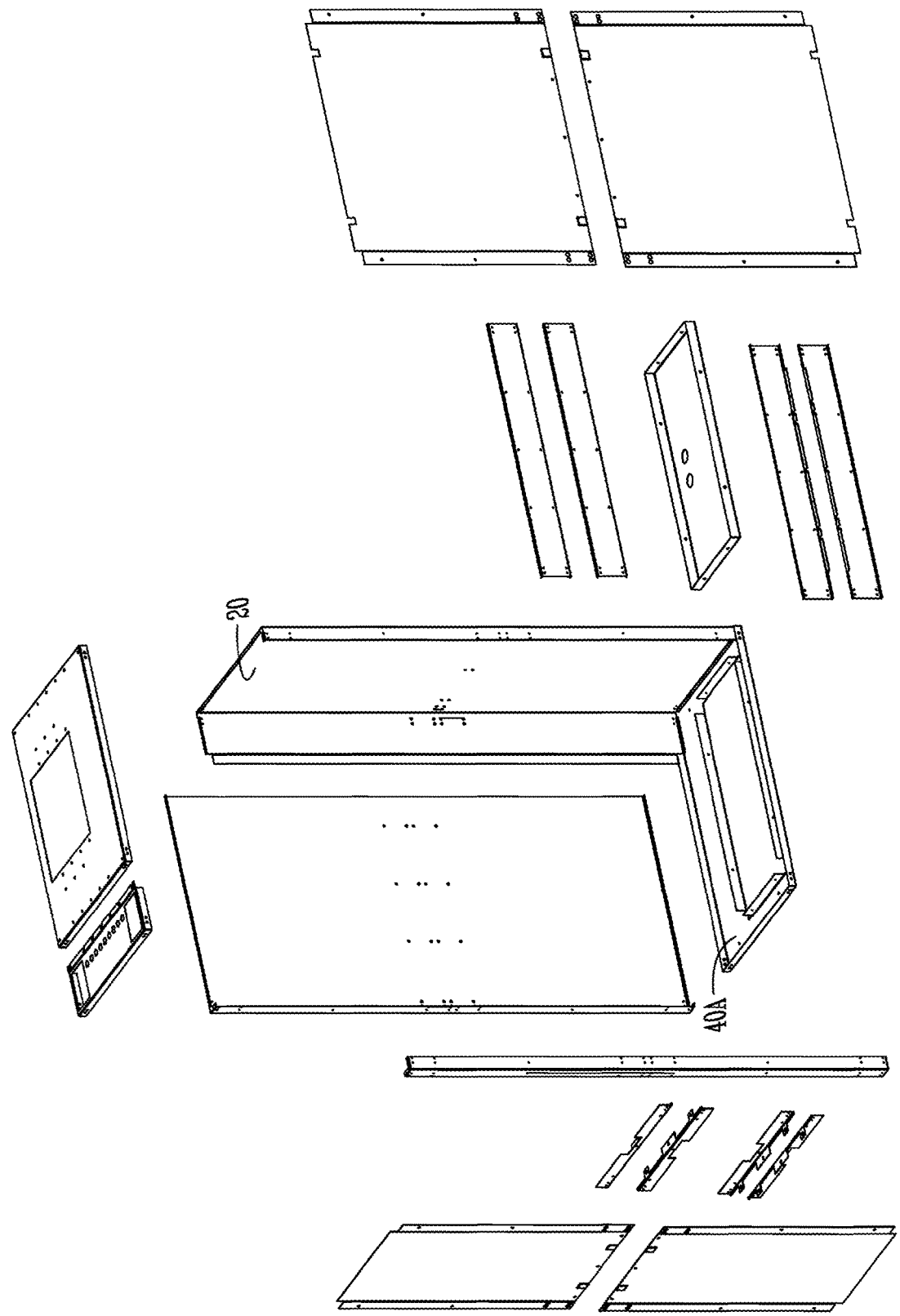

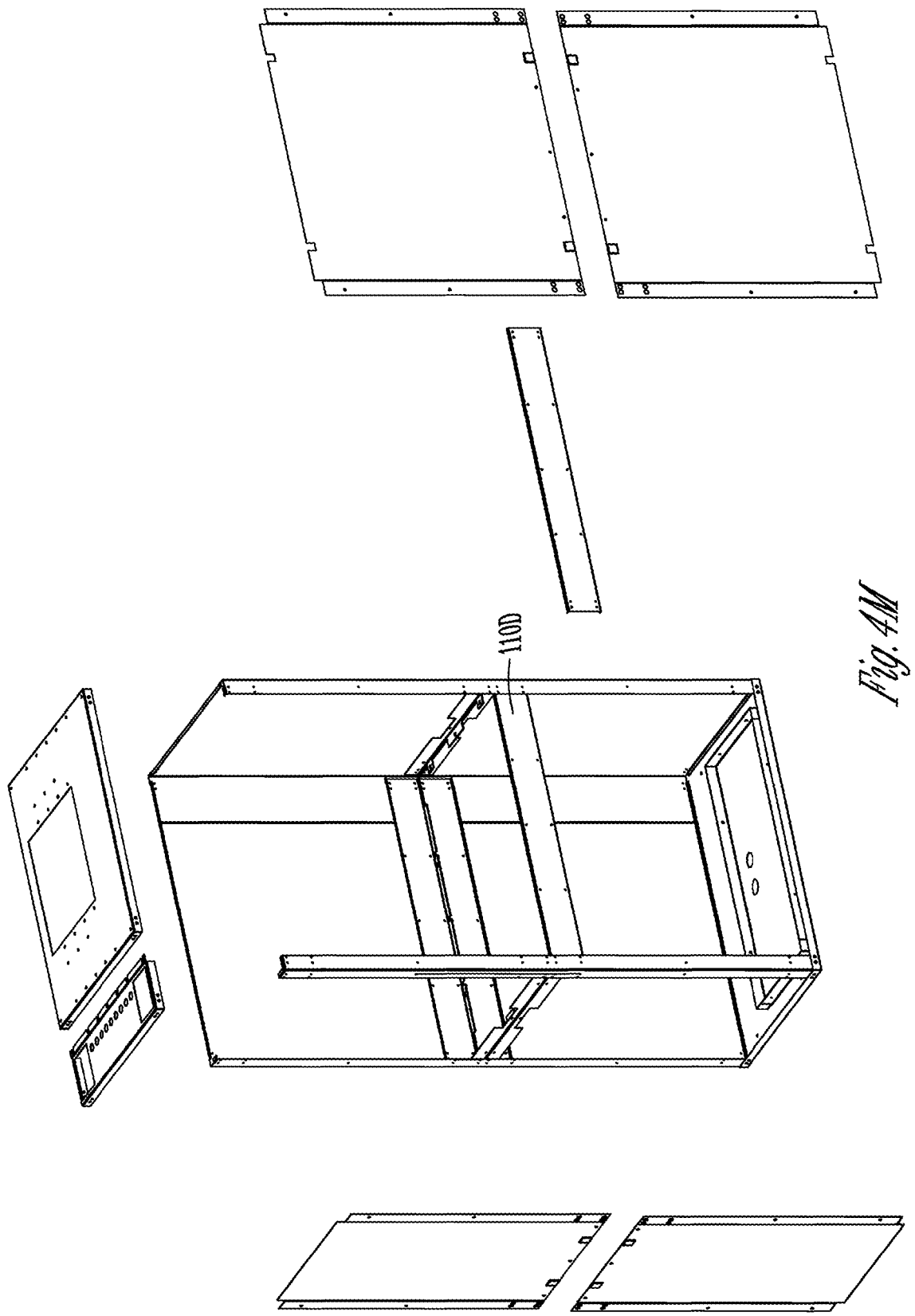

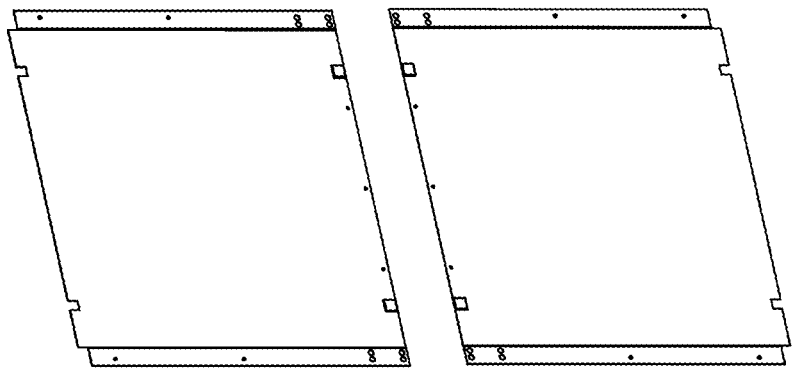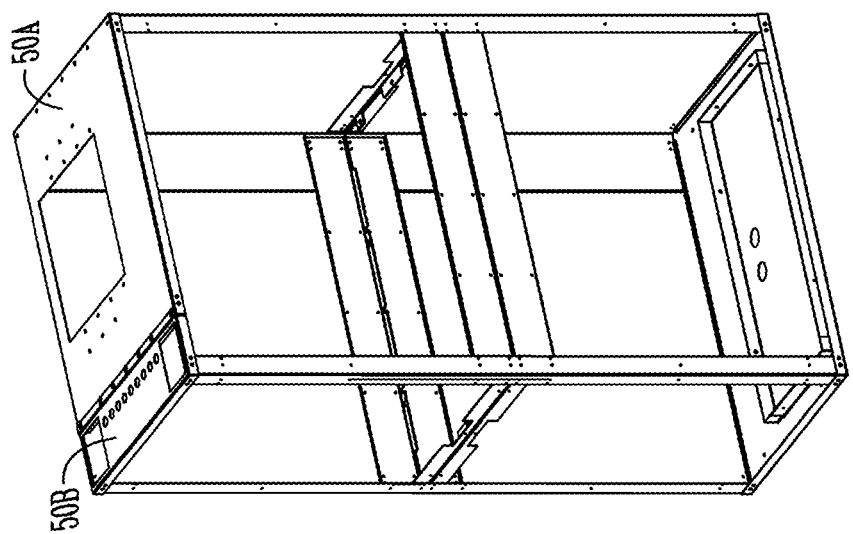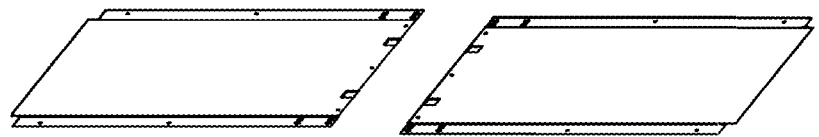
Fig. 40

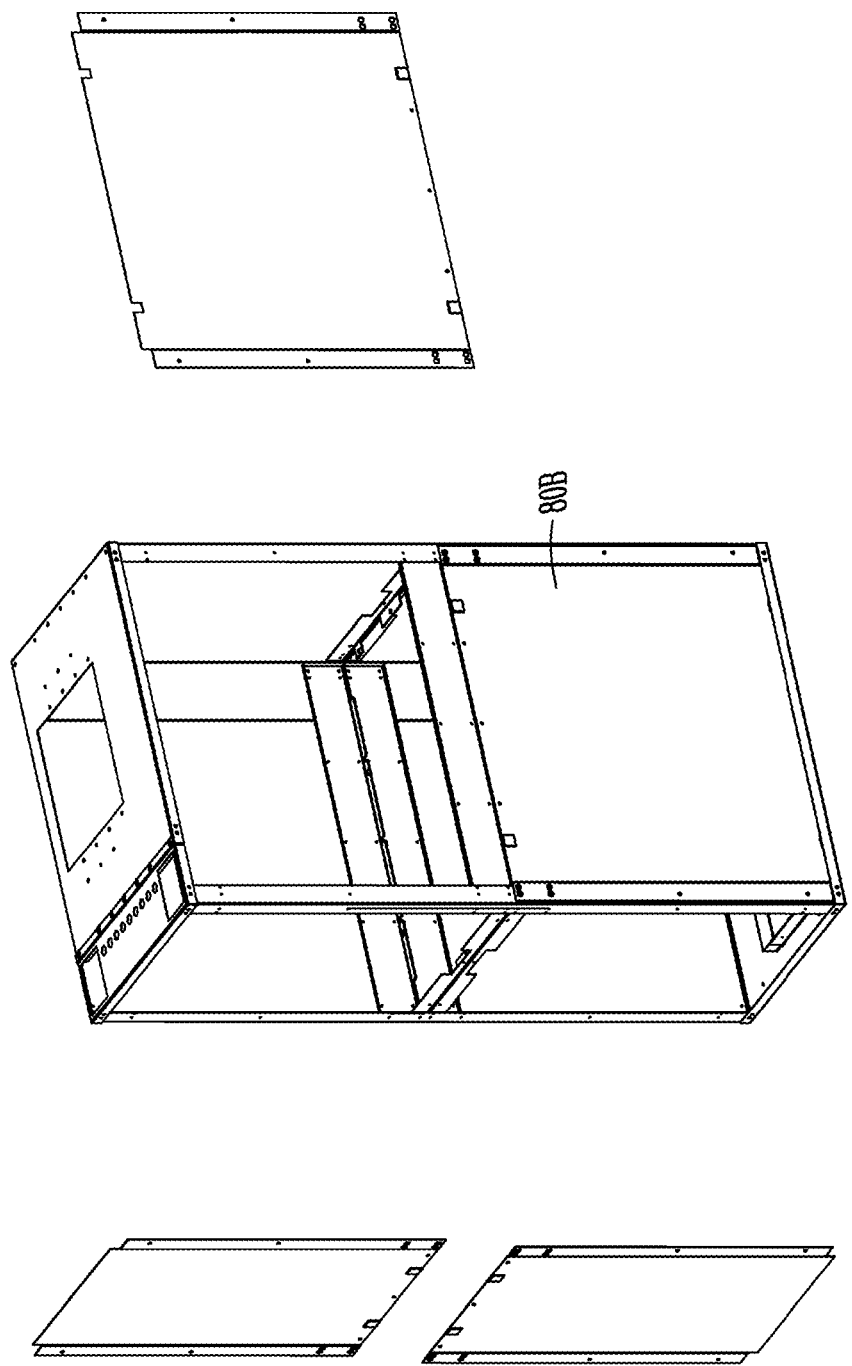

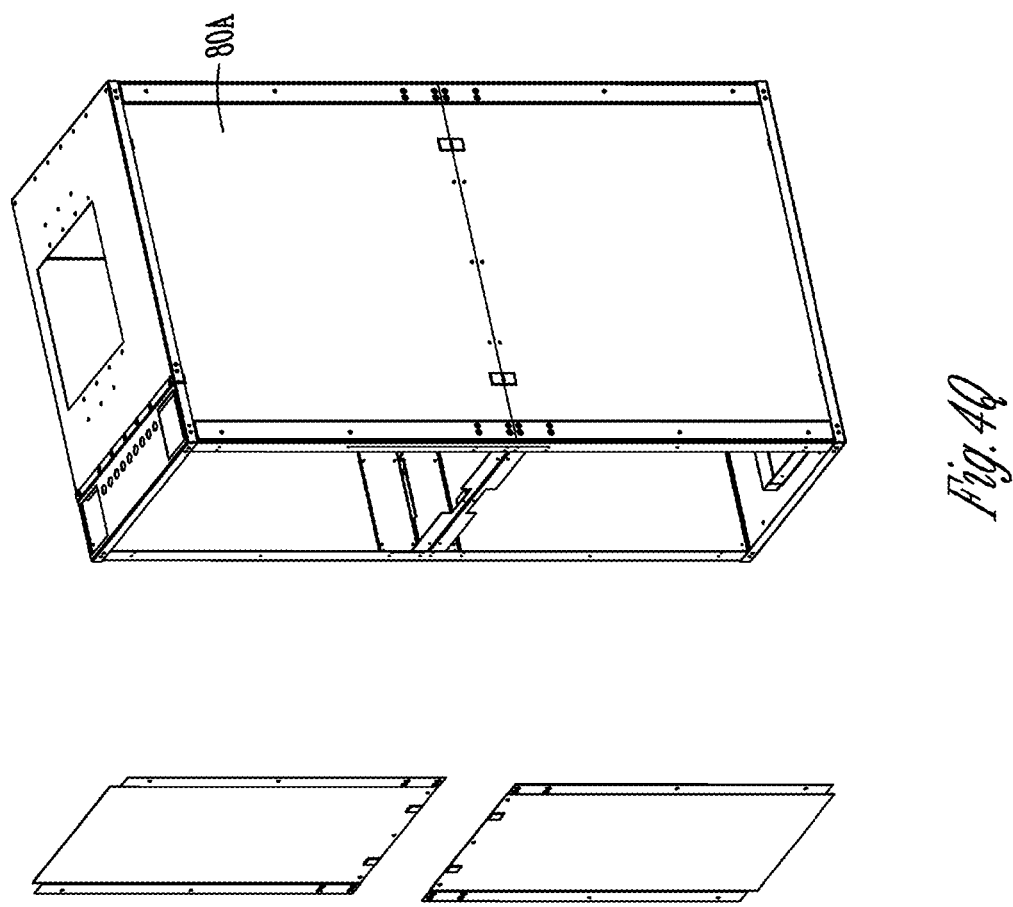

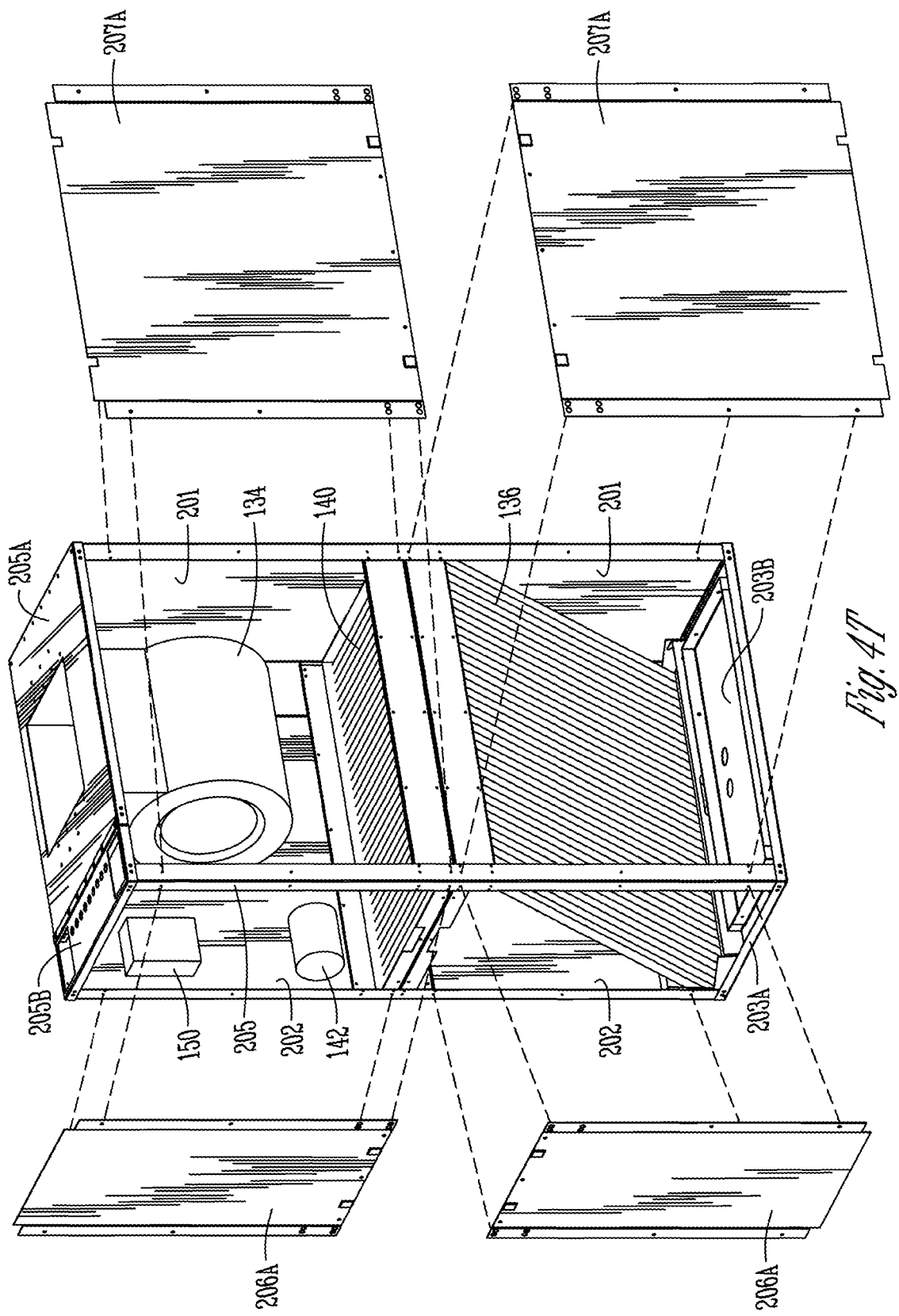

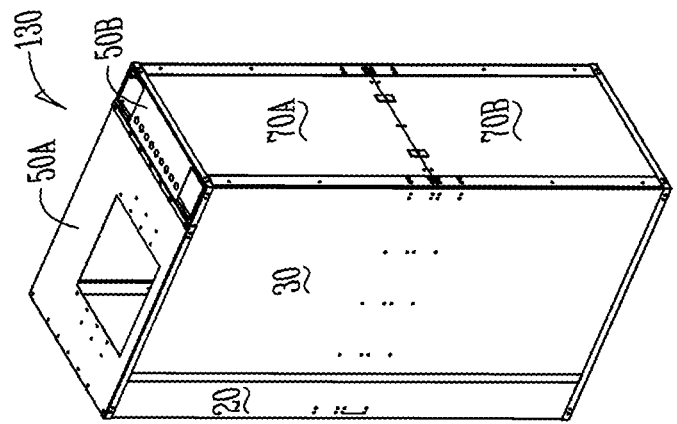
Fig. 7A
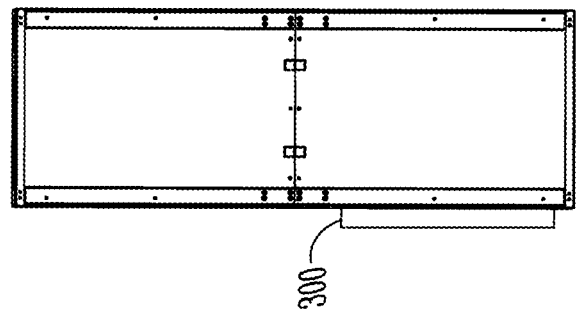
Fig. 7D (RIGHT NARROW SIDE) ELEVATION
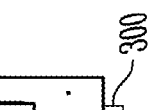
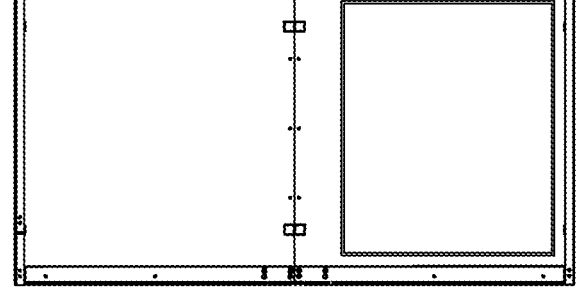
Fig. 7C (TOP) PLAN  Fig. 7B (REAR WIDE SIDE) ELEVATION  Fig. 7E (BOTTOM) PLAN
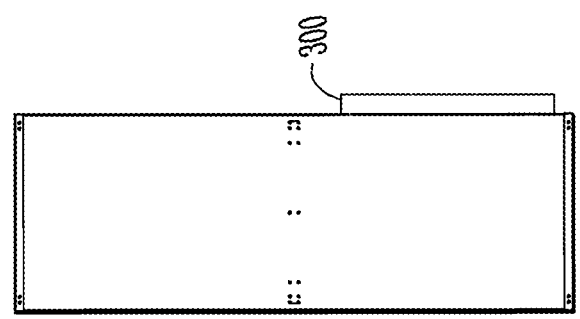
Fig. 7F (LEFT NARROW SIDE) ELEVATION

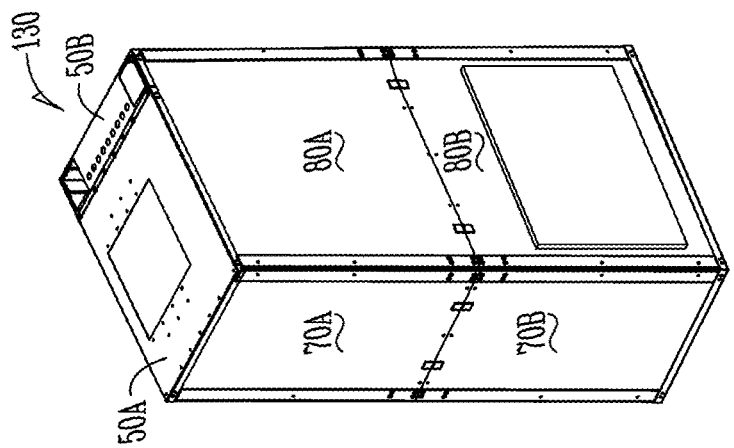
Fig. 8A
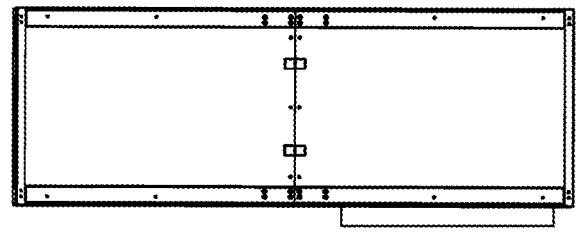
Fig. 8D (LEFT NARROW SIDE) ELEVATION
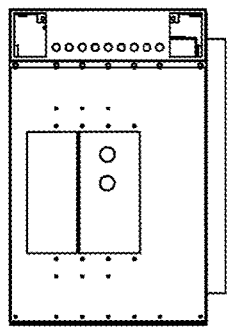
Fig. 8C (TOP) PLAN
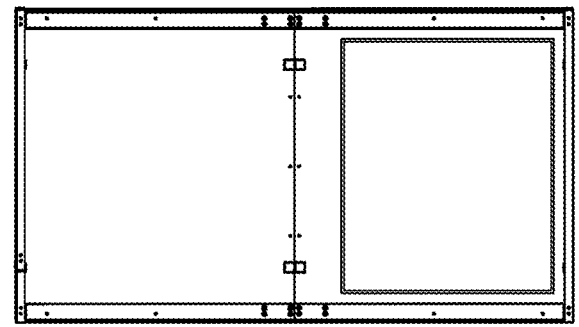
Fig. 8B (REAR WIDE SIDE) ELEVATION
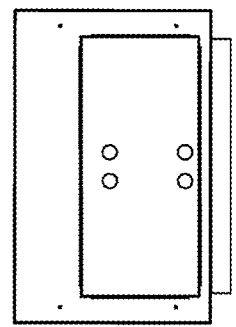
Fig. 8E (BOTTOM) PLAN
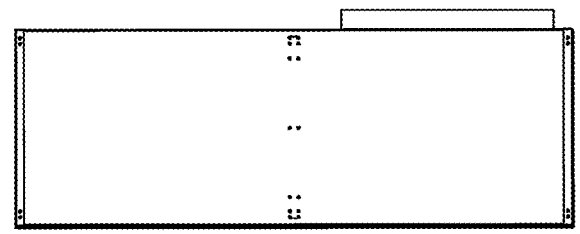
Fig. 8F (RIGHT NARROW SIDE) ELEVATION

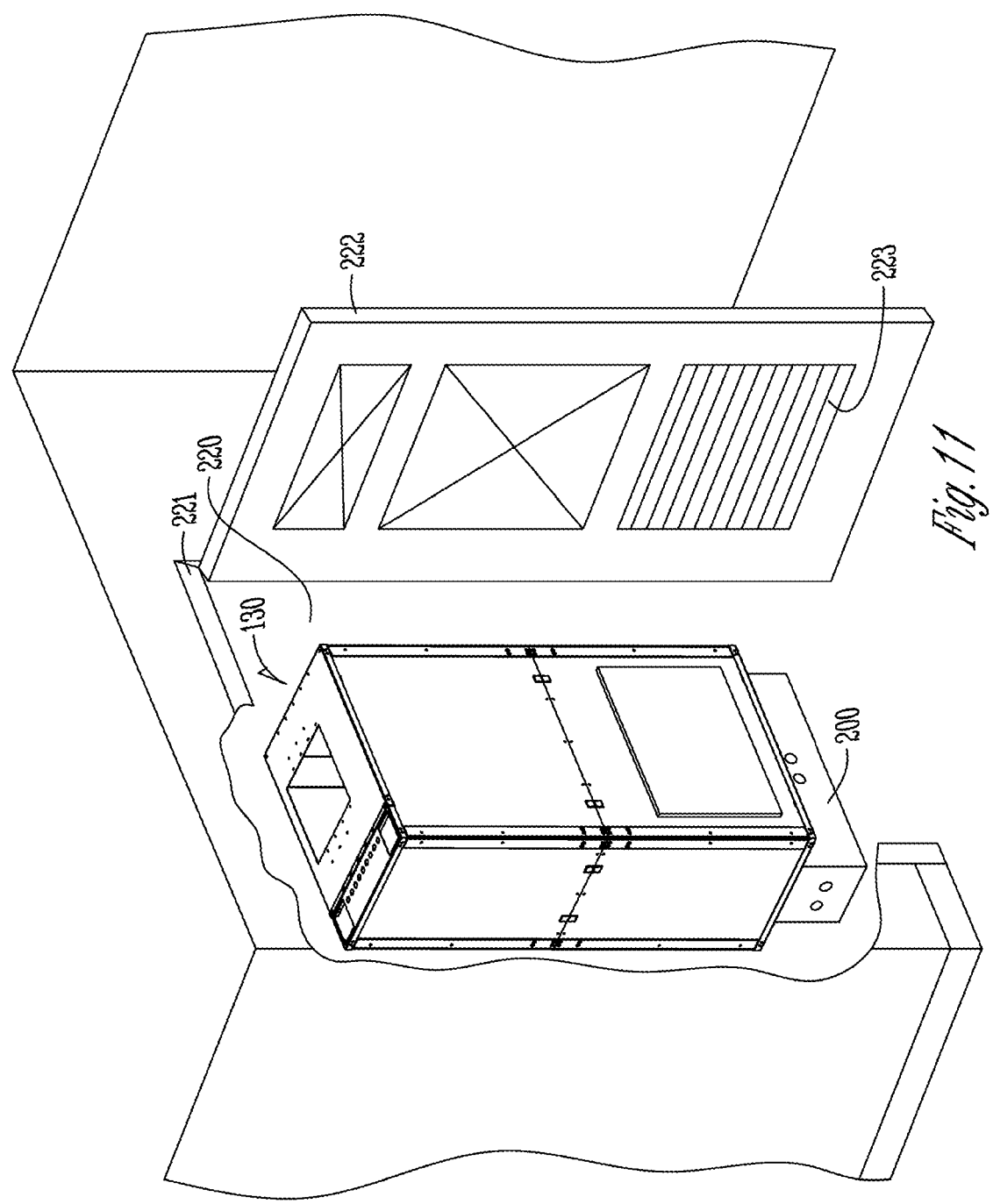

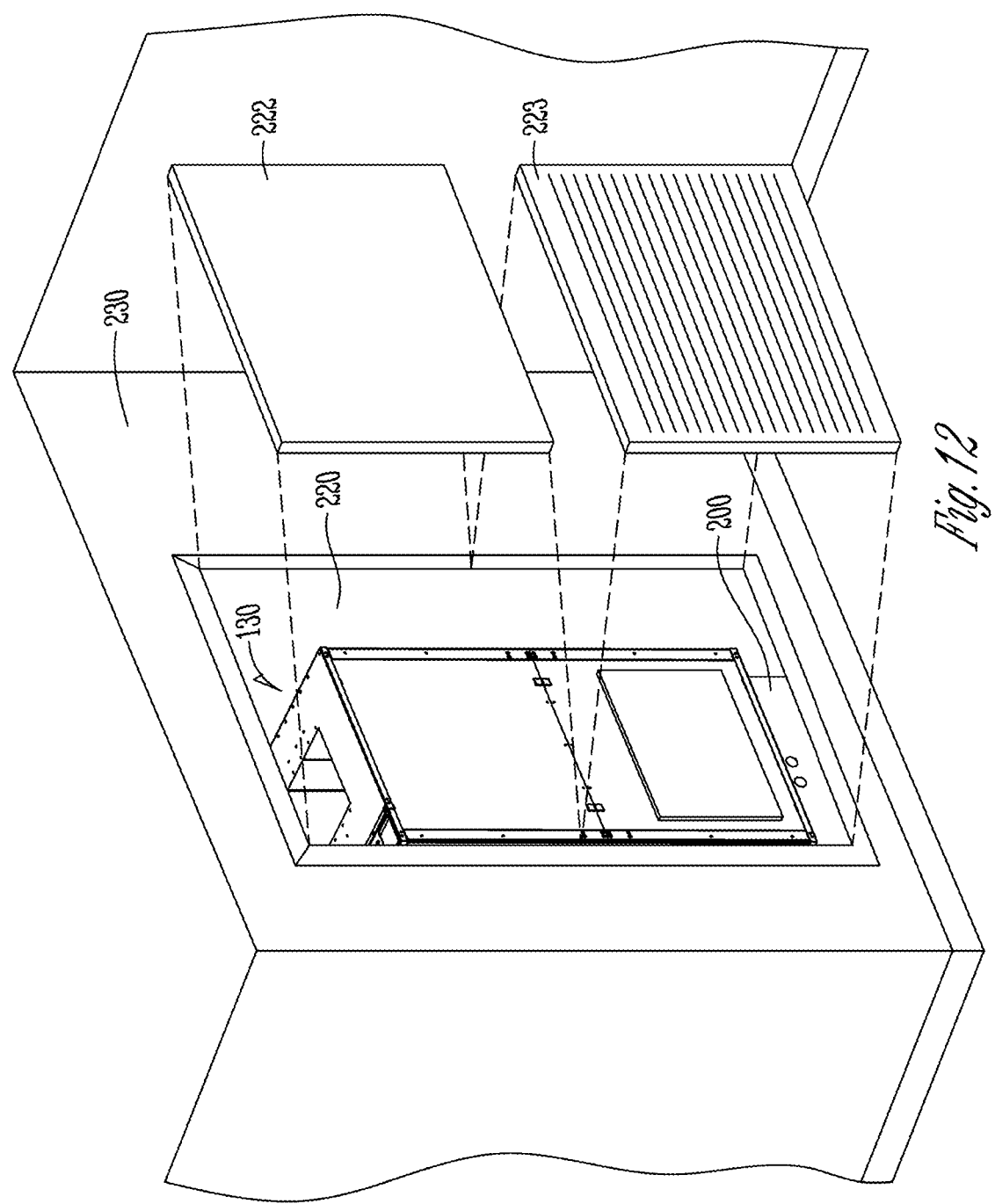

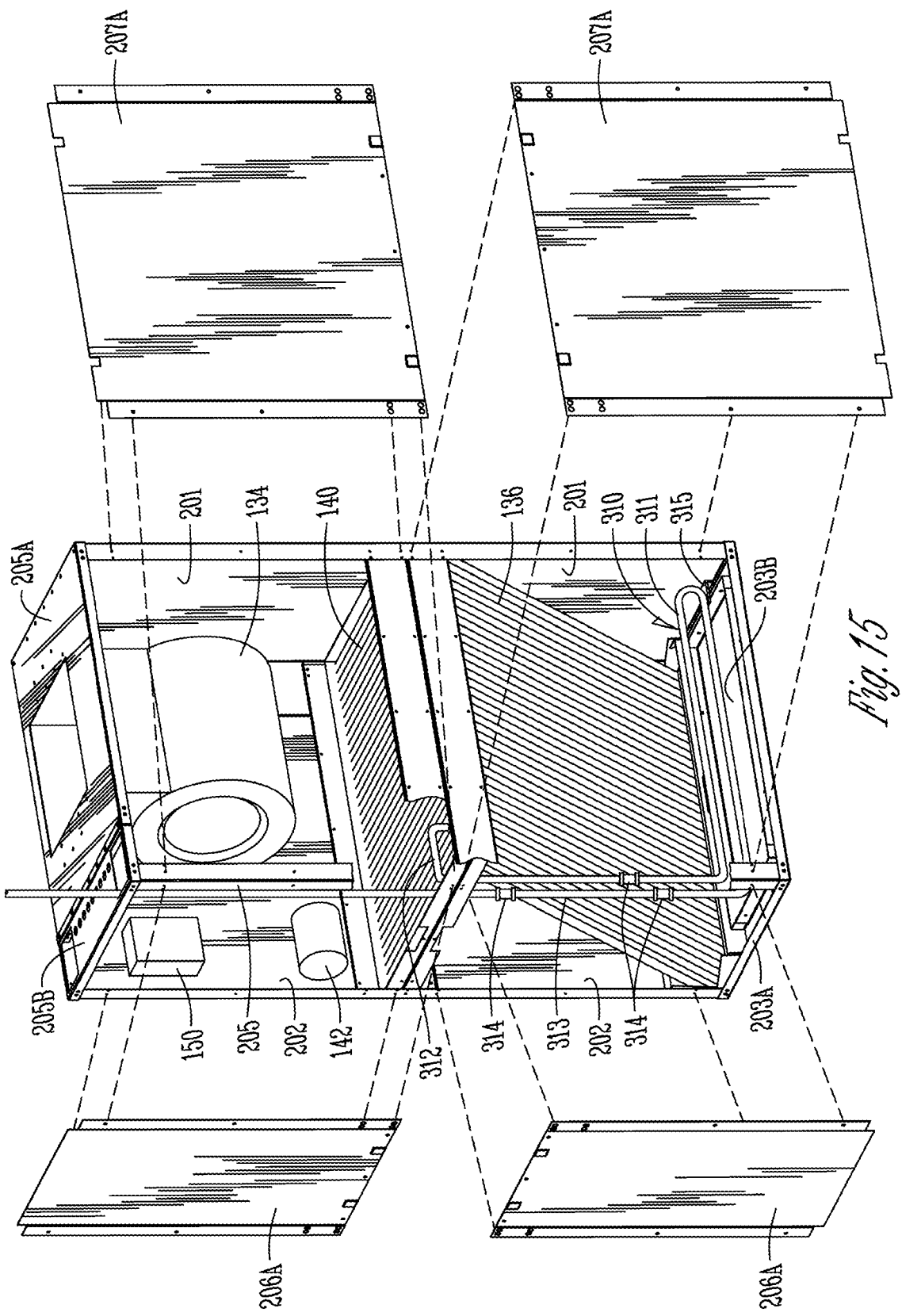

HVAC APPARATUS, METHOD, AND SYSTEM

CROSS-REFERENCE TO RELATED APPLICATIONS

This application is a divisional application of U.S. Ser. No. 16/113,939, filed Aug. 27, 2018, which is a continuation application of U.S. application Ser. No. 14/199,336, filed Mar. 6, 2014, now U.S. Pat. No. 10,072,856, issued Sep. 11, 2018, which claims priority under 35 U.S.C. § 119 to U.S. provisional application Ser. No. 61/773,446, filed Mar. 6, 2013, all of which are herein incorporated by reference in their entirety.

I. BACKGROUND OF THE INVENTION

A. Field of the Invention

The present invention relates to heating, ventilation, and cooling (HVAC) systems, apparatus, and methodologies, and in particular to utilization of a heat pump outside the conditioned air space in combination with a highly configurable air handler subsystem to supply conditioned air effectively, efficiently, and economically to the space.

One primary application of the present invention is to residential spaces such as apartments (including high density configurations), homes, and the like, as well as to analogous spaces.

B. Related Art

A wide variety HVAC approaches exist in the marketplace. A wide variety of manufacturers and vendors of HVAC equipment also exist. Many fall along the line of a separate HVAC system for a conditioned air space (e.g., living space or office space) separate from other systems like water, electrical and lighting.

While various sources of heated or cooled air exist, a predominant system produces forced air heating or cooling using a refrigeration cycle. This normally requires one component (e.g., condenser, fan, and refrigerant coil) placed outside the air conditioned space and therefore exposed to outdoor atmospheric air, and another component with a refrigerant coil and fan that delivers conditioned air to the space.

One difficulty with such systems is the many factors that need to be considered when designing, installing, and operating such systems. Some are obvious, some are subtle. However, they should be considered. And sometimes their interaction is antagonistic.

For example, highly efficient systems could require larger components. However, this is antagonistic to limited space availability in certain circumstances (for example high density apartment complexes). There simply may be limited installation locations and spaces. There may be building or other codes and regulations that limit options.

Additionally, economic pressures are always in play. Less efficient systems are antagonistic to energy costs. Cost of parts, installation, maintenance, and operation may collide with the best heating and cooling delivery.

Still further, options, regulations, needs and desires for HVAC tend to constantly change. Energy efficiency standards change. However, in light of the substantial lifetime of many HVAC components, it is expensive to change systems that have not exhausted their useful life. Furthermore, new standards may not match up with available space, efficiency, or heating and cooling in certain applications.

Therefore, although many basic HVAC components can be purchased commercially, because of the variety of factors that must be considered, substantial amount of customization is required most times. The installer may end up having to select different components for each application if there are multiple installations or configurations in the same building or facility. For example, in an apartment complex, some spaces for the inside conditioned air component may be in a closet. Some may be in the wall. Some may be in a larger room sitting on the floor. But these rooms, spaces, and mounting locations may differ between different apartments in the same apartment building. Thus, the designer or installer may have to customize onsite the housings, cabinets, or parts used to install the system even between apartments in the same building. Customization can require additional labor and materials cost.

In light of these and other factors that can affect HVAC systems, room exists for improvement in this technological field.

Although HVAC technology is a relatively mature industry, again, there are a number of competing factors which leave room for improvement or innovation.

Consider again residential HVAC systems. A conventional system utilizes a heat pump positioned out of doors. An interior unit communicates with the heat pump to distribute heated or cooled conditioned air to the target interior space. In cold weather, the heat pump works to extract heat from outside atmospheric air (the heat source) and, using a refrigeration process, transfer it to the inside target space (the heat sink). On the other hand, if properly configured, in warm or hot weather it can work to extract heat from the target space (the heat source) and release it outside (the heat sink). In either mode, the HVAC system is usually a separate system from other dwelling systems such as water, electric, and lighting.

One issue with these conventional HVAC systems is efficiency. In quite cold weather, a heat pump or furnace must work hard to maintain what is considered a comfort level of conditioned air in the interior target space. For a variety of reasons, a comfort level might not be maintained. Additionally, the more work required of the system, the more energy is consumed. Natural gas, electricity, or other energy sources must be purchased. Some of these costs can fluctuate over time. They can impose substantial financial burden. Government policy, consumer demand, or other influences can complicate this issue. For example, present government regulations are in place or proposed which have or may mandate certain levels of efficiency for HVAC systems. Compliance may be difficult with conventional systems. Thus, there is a need in this technical field for HVAC systems that can adapt and comply with present and future regulations and consumer demands.

Another issue can be space and location requirements for HVAC equipment that meet new efficiency requirements. There are and may be other requirements regarding how much space HVAC components can occupy, or where they can be positioned. Sometimes this is simply a matter of practicality. But it may be difficult to do with conventional systems. For example, if government regulations demand a certain performance level for an HVAC system for a multi-unit apartment building, present conventional components may not fit within present mounting locations. To make them fit, substantial and costly major remodeling of the building might be required. And this issue may exist not only for installation of an HVAC system, but also hinder operation, maintenance, or repair. For example, just because a system might technically fit in a location, it may be impractical or impossible to adequately service or repair the system. Access to critical internal components might be blocked. It may prevent access, removal, and replacement of components. Therefore, there is a need in this technical field for HVAC systems that can be effectively and efficiently configured for different heating/cooling needs and different installation and mounting restrictions.

Consider the following example. An existing apartment building has a relatively small external closet allocated for a heat pump and a relatively small in-wall space for an interior air handling unit. The external closet has a basically vertical space and a part of the closet door has louvers or a screen that functions as a fresh air inlet for the heat pump. The in-wall interior mounting space is basically vertical. Refrigerant lines must be directed through ceiling or floor, or along wall interiors between the components. Panels or openings must be correctly oriented relative the closet door or a removable panel on the wall to allow access and maintenance of internal components such as condenser, heating/cooling coils, fans, etc. Many times the HVAC system components, including housings, fittings, and other hardware, must either be specifically configured for those spaces and orientations or customized for the same. Different components and housings might have to be purchased or customized for other installations in other closets, walls, or buildings. This requires vendors and manufacturers to have a wide variety of inventory for different HVAC needs, or may require substantial resources (cost, time, labor, etc.) to either customize the HVAC equipment or renovate the installation space. Still further, HVAC systems and components have a substantial rated lifespan. Spans of ten or more years are not unusual. Over that time period, replacement parts may no longer be available. As previously mentioned, regulations or consumer demand may change. Other factors may result in the inability or impracticality of repairing or replacing the same or similar equipment into the same space and orientation. Stated differently, it many times is not possible to do an HVAC installation today that could have been done ten or even five years ago. Yet with changing regulations and consumer demand, perhaps millions of such systems will have to be replaced in the near future. Many times increased government efficiency requirements mean increased size requirements for HVAC components. There is a serious issue whether this will be economically possible using conventional HVAC technology.

Thus, there is a continuing need for improvement in the systems and methods of operation relating to this field of technology. Solutions can be difficult because of the sometimes competing factors that must be taken into consideration, including not only efficiency of operation but cost of materials, assembly, maintenance, and repair over the relatively long life of such systems.

II. SUMMARY OF THE INVENTION

It is therefore a principal object, feature, advantage or aspect of the present invention to provide an HVAC apparatus, system, and methods which improve the state of the art or solve problems and deficiencies in this technological field or area.

Other objects, features, aspects or advantages of the present invention include an HVAC system, method or apparatus which:
  a. uses highly standardized components ("parts common") that can be efficiently and effectively configured for different installation parameters, including different mounting locations;
  b. utilizes standardized or the same or similar hardware ("parts common") for each installation;
  c. provides configuration flexibility for both components inside of housings, orientation of housings, and access to the interior of housings;
  d. provides flexible configurability while keeping material costs low but while providing sufficient structural support for components;
  e. provides highly configurable housings that further allow selection and even optional combinations of components for different conditioned air needs or desires;
  f. can be utilized in combination with a variety of commercially available refrigeration type conditioned air units outside the conditioned air space;
  g. can incorporate a supplemental heat source, for example, a hydronic coil subsystem to have a different or supplemental source of heat that can provide heated air to the conditioned air space;
  h. can utilize a supplemental heat source to avoid the need for a defrost cycle, and components for same in the outdoor heat pump;
  i. can include a programmable control circuit and subsystem that can be easily programmed for a variety of system operation needs or desires, including but not limited to avoiding defrost cycles and/or utilizing various supplemental heat sources.

One aspect of the invention uses a highly configurable air handler unit for distributing conditioned air to the conditioned air space in conjunction with other HVAC components such as a heat pump. The air handler housing includes an interior space adapted for mounting components for delivering conditioned heated or cooled air to the space. The housing can also accommodate a supplemental, secondary, or boosted or booster heat source. One example is a hydronic coil. The housing can also accommodate other system components including but not limited to a control circuit or subsystem, as well as other useful features for such an air handling unit. The control subsystem can be programmed to automatically or semi-automatically operate the system with efficiency and economic benefits. One example is avoidance of the need for a defrost cycle for the heat pump. Another is to switch in booster heat to promote comfort.

Another aspect of the invention comprises basically a standardized air handler housing that is selected for use in a wide variety of possible applications. The standardized housing is designed, with a number of parts common, to enclose and accommodate a plurality of commercially available air handler components like fans and refrigerant coils. It is also designed to have room for booster heat (to supplement normal HVAC operation) or a primary commercially-available hydronic coil (to alone supply heat when the heat pump is turned off), and other components. The standardized housing thus balances the need for flexibility as to what goes inside it with sufficient structural support for those components and several (e.g. four) removable panels for access when needed for maintenance or repair. The housing utilizes parts common, including several identical parts and substantial amounts of identical hardware and interchangeable parts.

In one form, the housing includes a structural shell that can enclose the interior space. The structural shell utilizes a number of standardized pieces that include structural support for the needed interior components but at least two different sides that can accommodate access into that interior space. The enclosure can be assembled using a significant amount of parts common, including standard fasteners and same or similar parts, to reduce amount of inventory and cost as well as simplify assembly. Yet it is flexible to receive or incorporate optional features according to different optional configurations. This allows it to be installed in different orientations but with high flexibility as to what goes inside it and how it is finally configured for each application.

Another aspect of the invention comprises an air handler housing adapted to accommodate conventional conditioned air components such as fan and refrigerant coil. Additionally it is adapted to include in the airflow path a hydronic coil having connections to a heated water source. One example is a conventional tank water heater. The air handler thus can supply heated air by a conventional drawing of or passing air through a refrigerator coil, or pass air through the hydronic coil, or utilize a combination of both.

Another aspect of the invention comprises an air handler subsystem that includes both a refrigeration cycle coil and a hydronic coil in the air path. A control subsystem monitors ambient temperature at the outdoor heat pump. The control sub circuit is set to avoid the need for a defrost cycle at the outdoor heat pump by switching in the hydronic coil upon ambient outdoor temperature dropping to a certain temperature deemed indicative for the need for defrost.

Another aspect of the invention is a control subsystem with an air handler containing refrigeration cycle coil and hydronic coil, and sensors to detect when booster heat from the hydronic coil heat is needed. In one example, supply air temperature can be sensed. If it drops below a certain temperature, the control system actuates the hydronic coil system to supplement heat to maintain an acceptable comfort level for occupants in the conditioned space.

In another aspect of the invention, if a condensing water heater/hot water generator is used as the secondary heat source, an additional hydronic heat exchanger can be installed to exchange heat from the return warm water from the primary hydronic coil to the returned airstream. This allows water returning to the condensing water heater/hot water generator to stay below a certain temperature and stay in a condensing mode. Condensing mode raises the efficiency of the system, saving overall cost to run in heat mode.

In another aspect of the invention, the supplemental heat components could be housed separately from the remainder of the air handler unit. This module could, for example, house a hydronic coil, water pump, and connectors. It could be assembled and sold as a separate unit. It could be used alone or in conjunction with the air handler unit.

In another aspect of the invention, an HVAC system with thermostatic control has a programmable processor to operate the system according to user selection. The control system can monitor one or more conditions or characteristics and operate the HVAC system in an efficient or effective manner.

Benefits accompanying one or more of the above-mentioned aspects of the invention can be several. Examples include but are not limited to the following:

a. Since the system can be installed in a variety of configurations using common parts, the inventory that must be carried by manufacturers, distributors, and installers is dramatically reduced with an attendant economic and time savings.

b. Since the system can be accessed, maintained, repaired, or component parts can be replaced from at least two of its four sides regardless of orientation, maintenance costs are dramatically reduced.

c. The system can be configured to use electricity when it is economically advantageous to do so and gas or renewables for the remaining requirement. This can help promote sharing by gas and electric companies of the residential housing market HVAC load. It also may deter programs that both utilities currently use to promote the use of their equipment in less than ideal conditions which cost consumers both money and comfort. Consumers may pay less for energy and be more comfortable.

d. The system can eliminate one combustion flue gas stack by using the water heater for both domestic hot water and space heating. This can be extremely important in multi-family housing where new codes make it virtually impossible to provide venting for two combustion devices in equipment closets within the housing unit. This also reduces the initial cost of equipment as well as its installation and maintenance costs.

e. A major deficiency of current heat pump systems is that as outside temperature drops the supply air temperature to conditioned spaces tends to drop to an uncomfortable level. The use of hot water for boosting the supply air temperature can reduce or eliminate this problem.

f. The life expectancy of a conventional heat pump system is dramatically reduced by a defrost cycle. Since the defrost cycle is eliminated with the system, the life expectancy of the system will dramatically increase and maintenance costs over its useful life will dramatically decrease.

These and other objects, features, aspects, and advantages of the present invention will become more apparent with reference to the accompanying specification and claims.

III. BRIEF DESCRIPTION OF THE DRAWINGS

FIG. 4T illustrates mounting of components into the interior of the housing and shows different access panels that can be utilized with the housing.

Figure 5A:
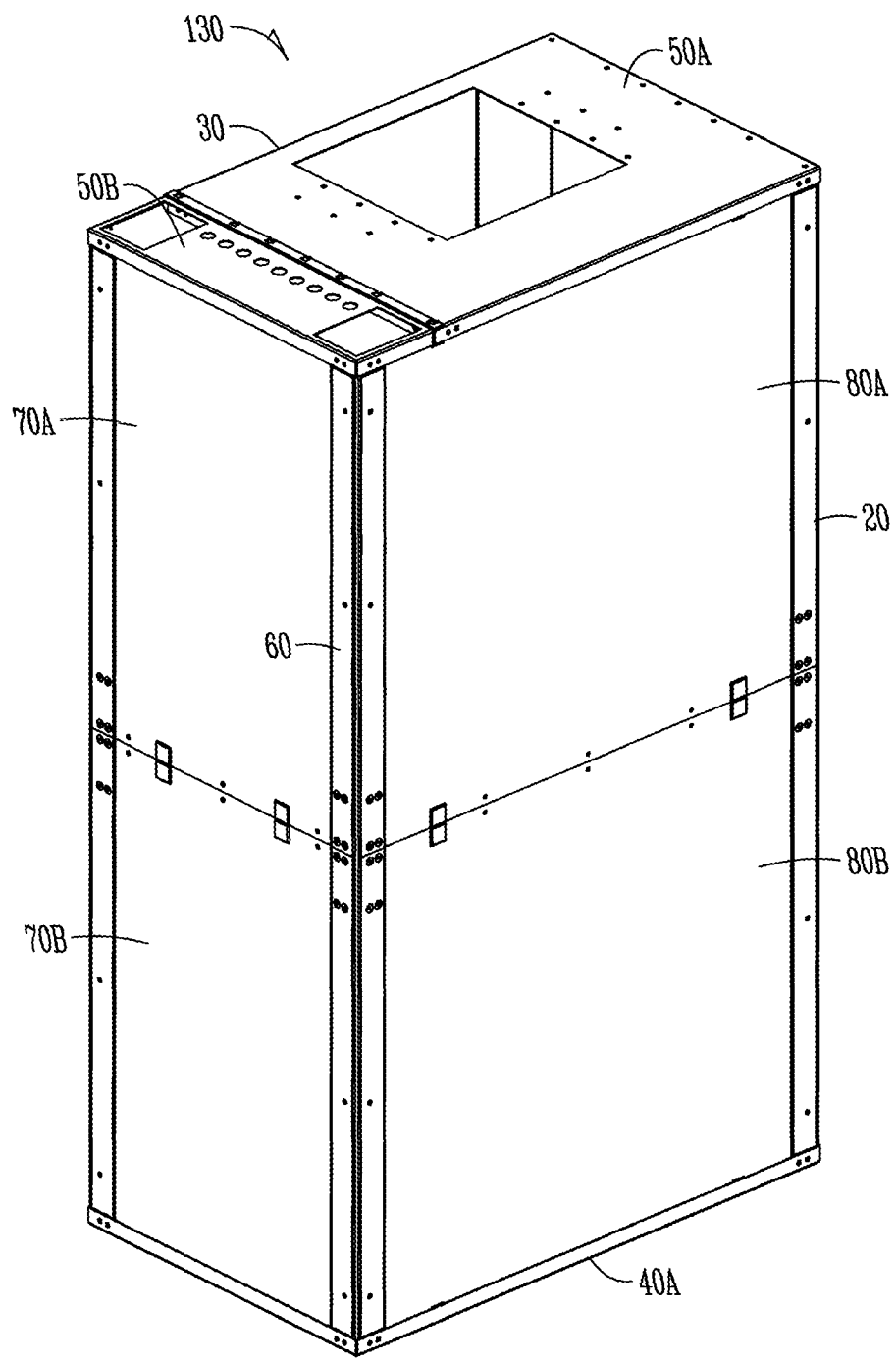
FIG. 5A is a perspective view of the housing the assembled housing of FIG. 4A from a different view angle.
Figure 5C:
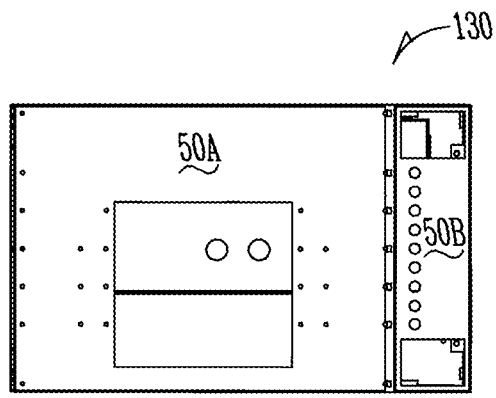
Figure 5B:
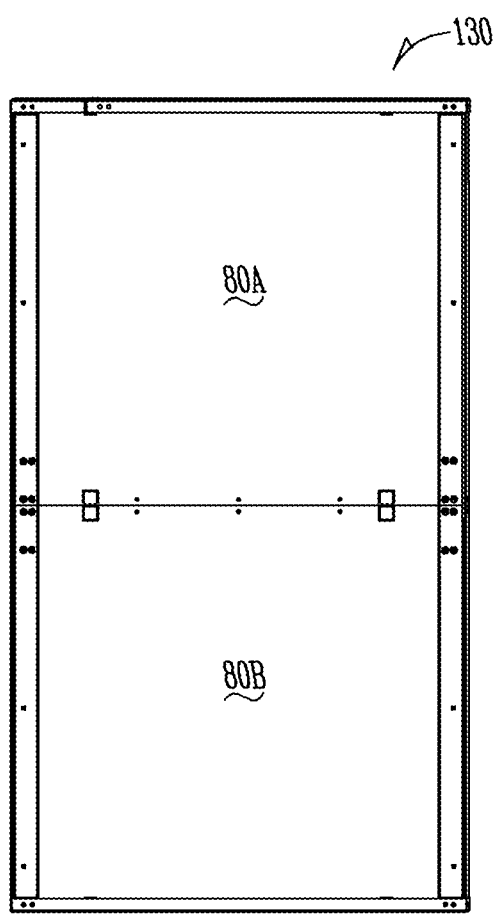
Figure 5D:
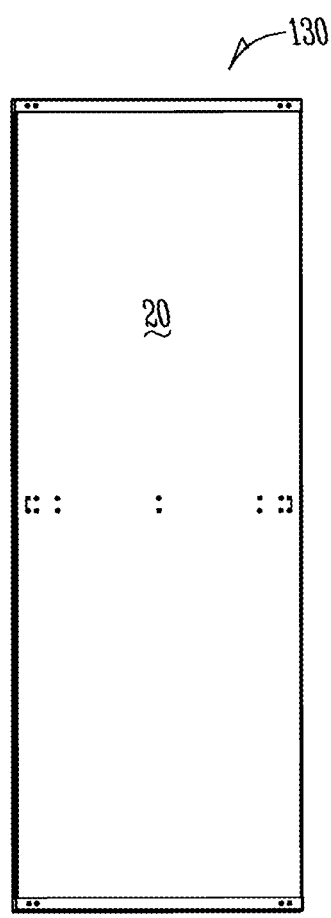
Figure 5E:
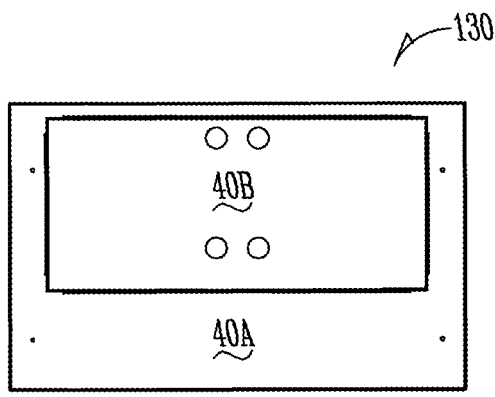

FIGS. 5B-G are isometric views of the housing of FIG. 5A.

Figure 5G:
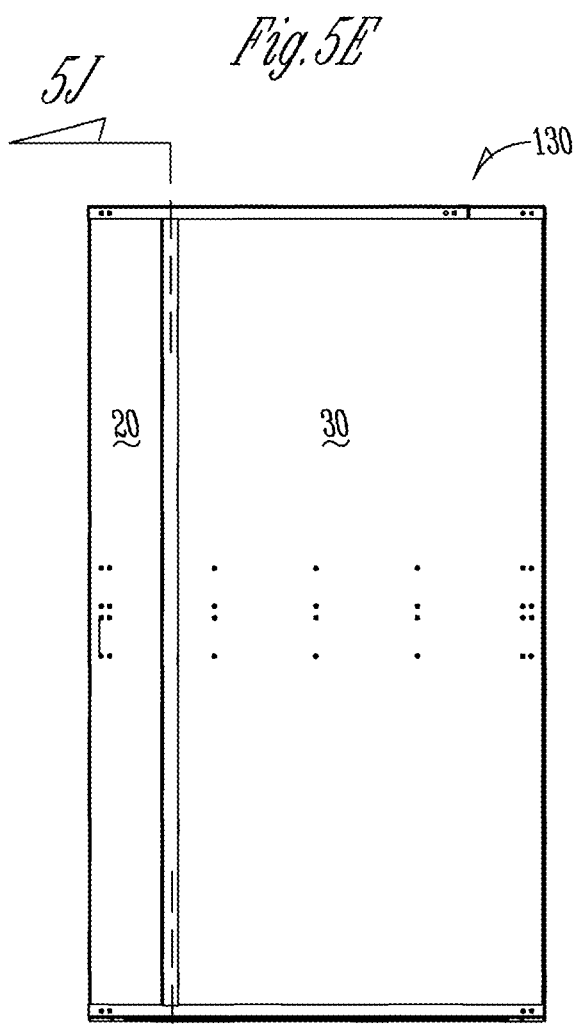
Figure 5F:
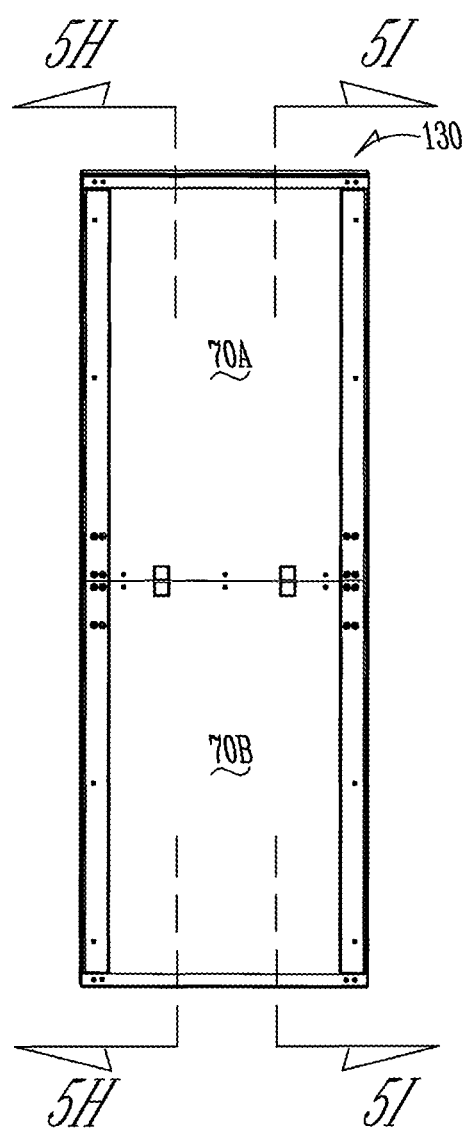
Figure 5H:
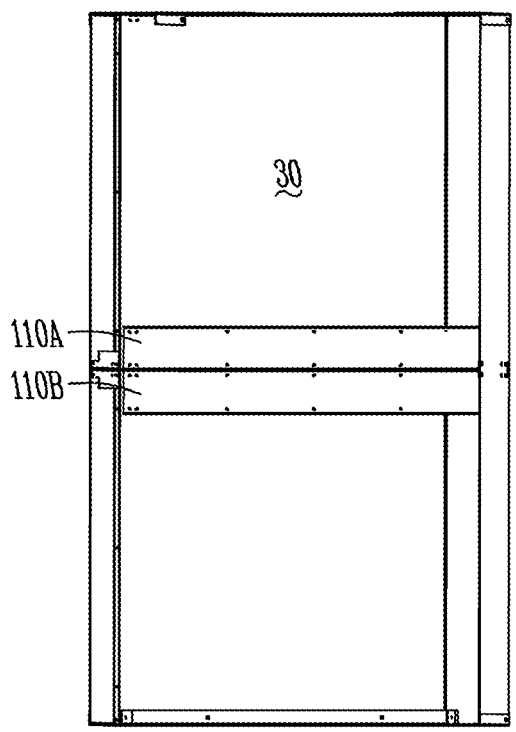
Figure 5I:
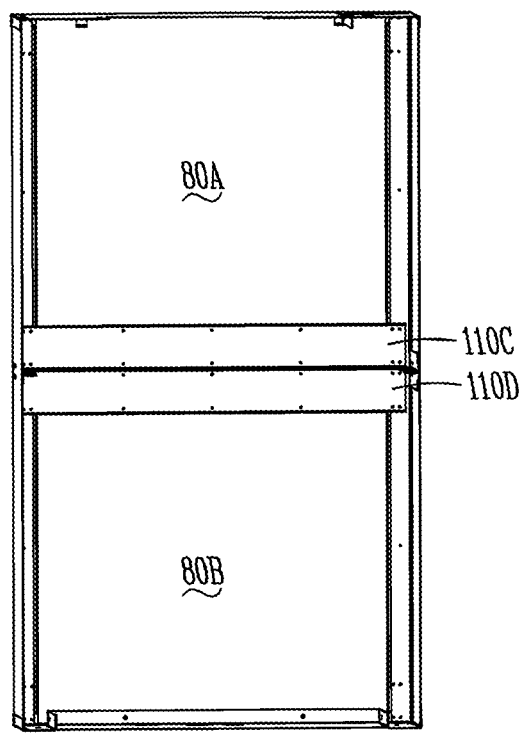
Figure 5J:
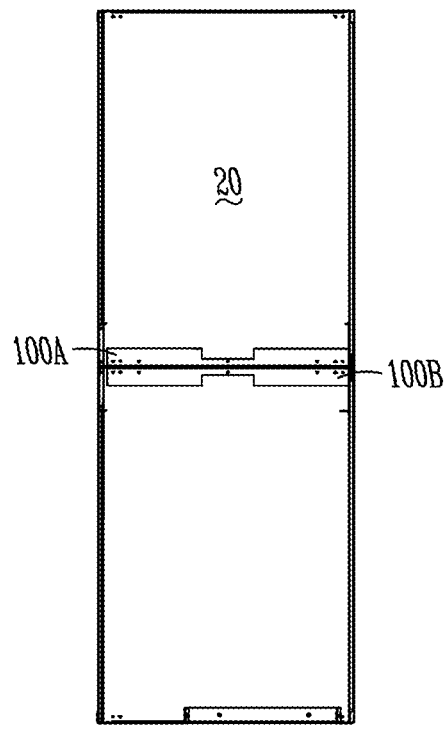

FIGS. 5H-J are sectional views taken along the section lines of FIGS. 5F-5G.

Figure 6A:
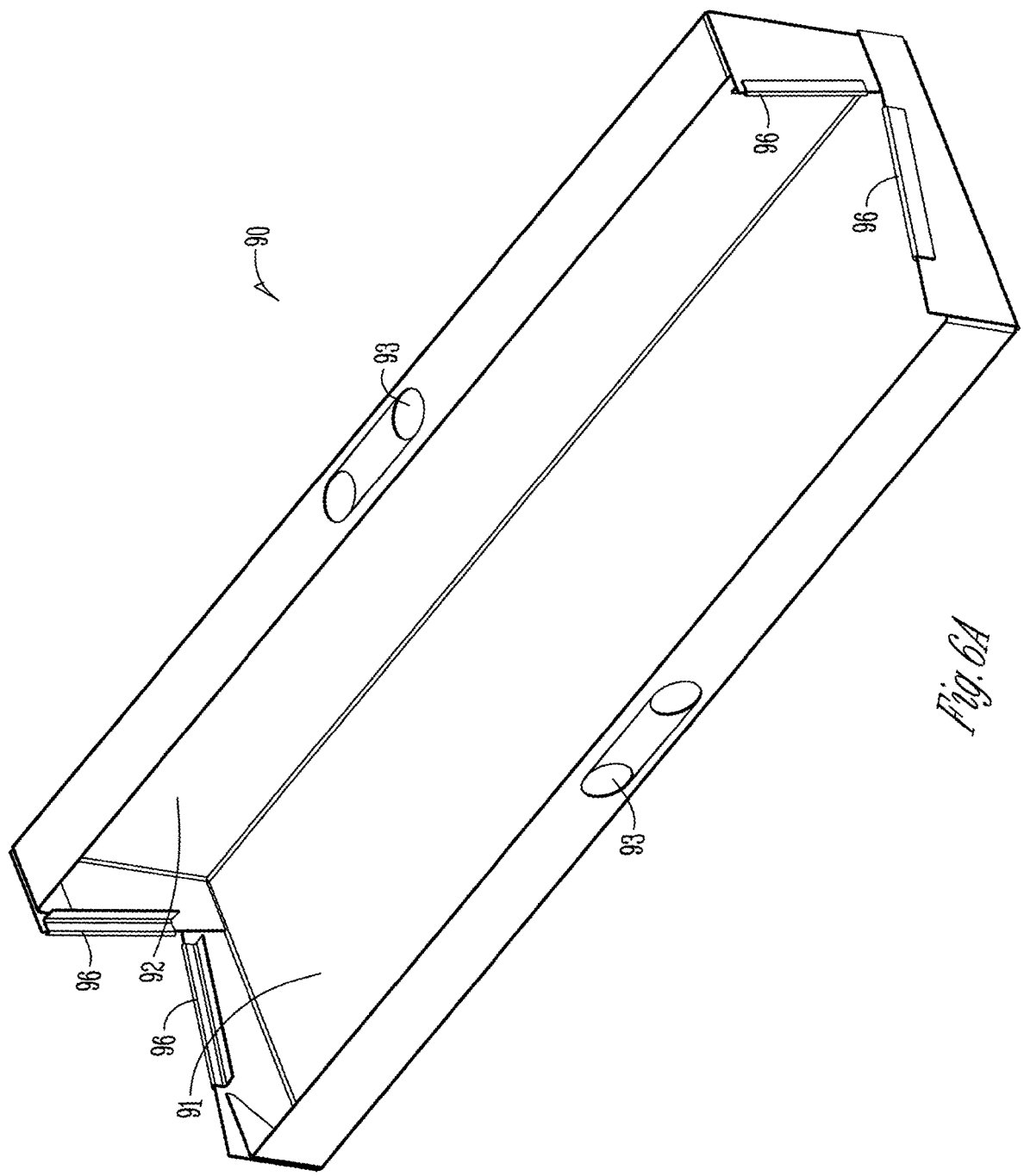

FIG. 6A is a perspective view of an optional condensation pan/drain that can be utilized in the housing as shown in FIG. 4T.

Figure 6B:
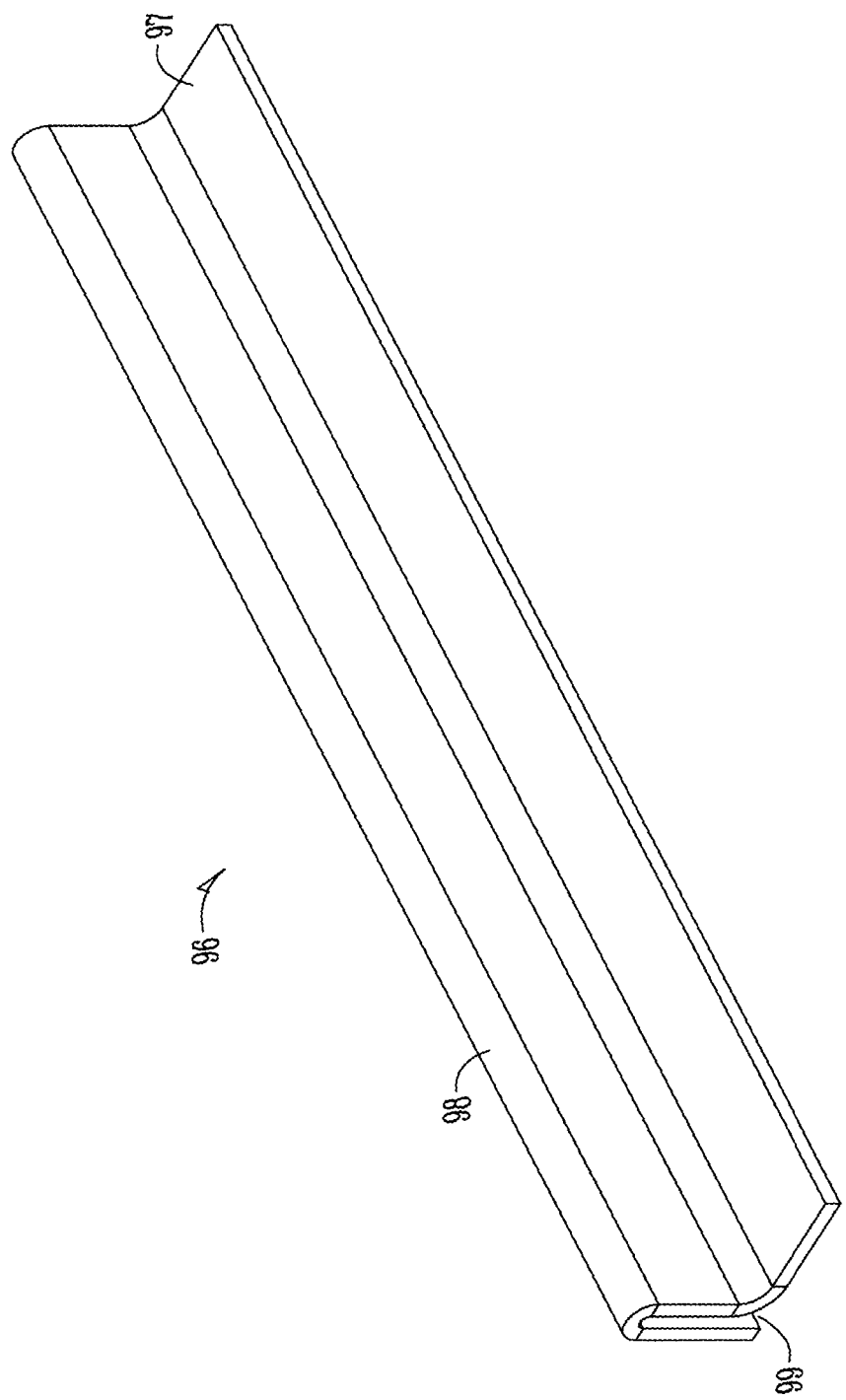

FIG. 6B is an enlarged view of a coil support clip that can be used with the pan/drain of FIG. 6A.

Figure 4A:
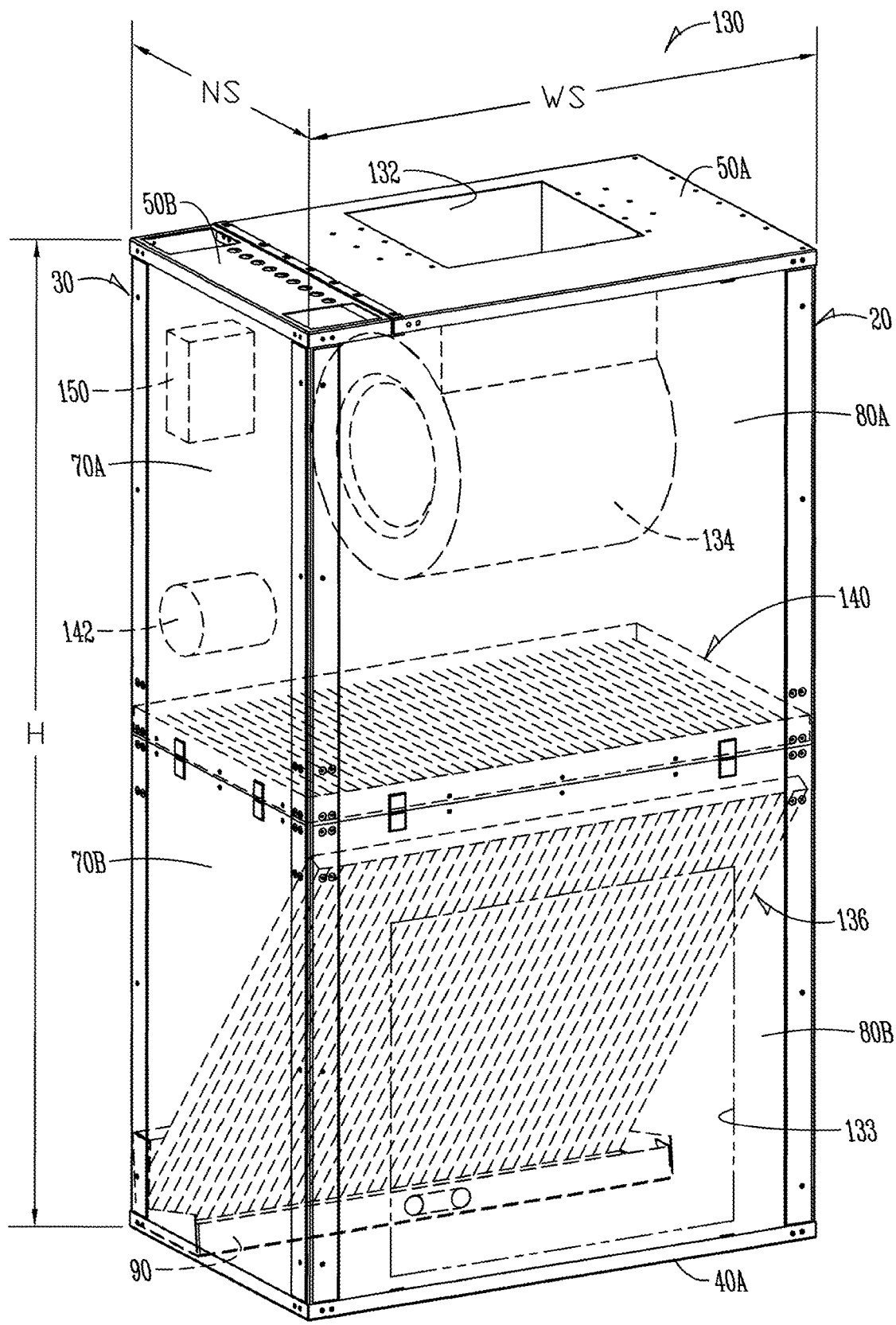
FIG. 4A is a perspective view of an air handler subsystem according to one aspect of the invention that can be used with the system of FIG. 1B, including a highly configurable housing and exemplary internal components in dashed lines.

FIG. 7A is a perspective assembled view of an air handler unit such as FIG. 4A in a first common configuration.

FIGS. 7B-F are isometric views of FIG. 7A.

FIG. 8A is a perspective view of air handler subsystem such as FIG. 4A from a different perspective and in a different configuration than FIG. 7A.

FIGS. 8B-F are isometric views of FIG. 8A.

Figure 9A:
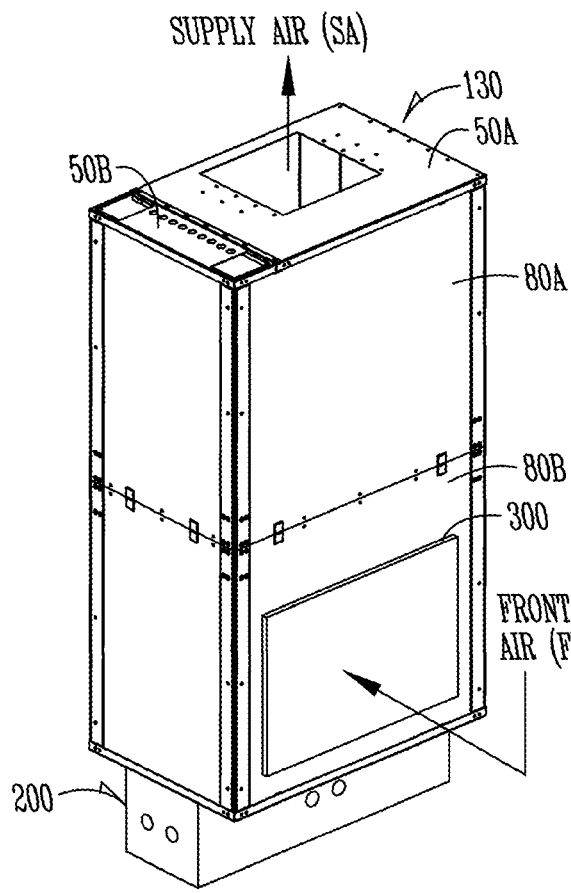

FIG. 9A is a perspective view of an air handler unit such as FIG. 4A shown mounted on what is called a pedestal base.

Figure 9B:
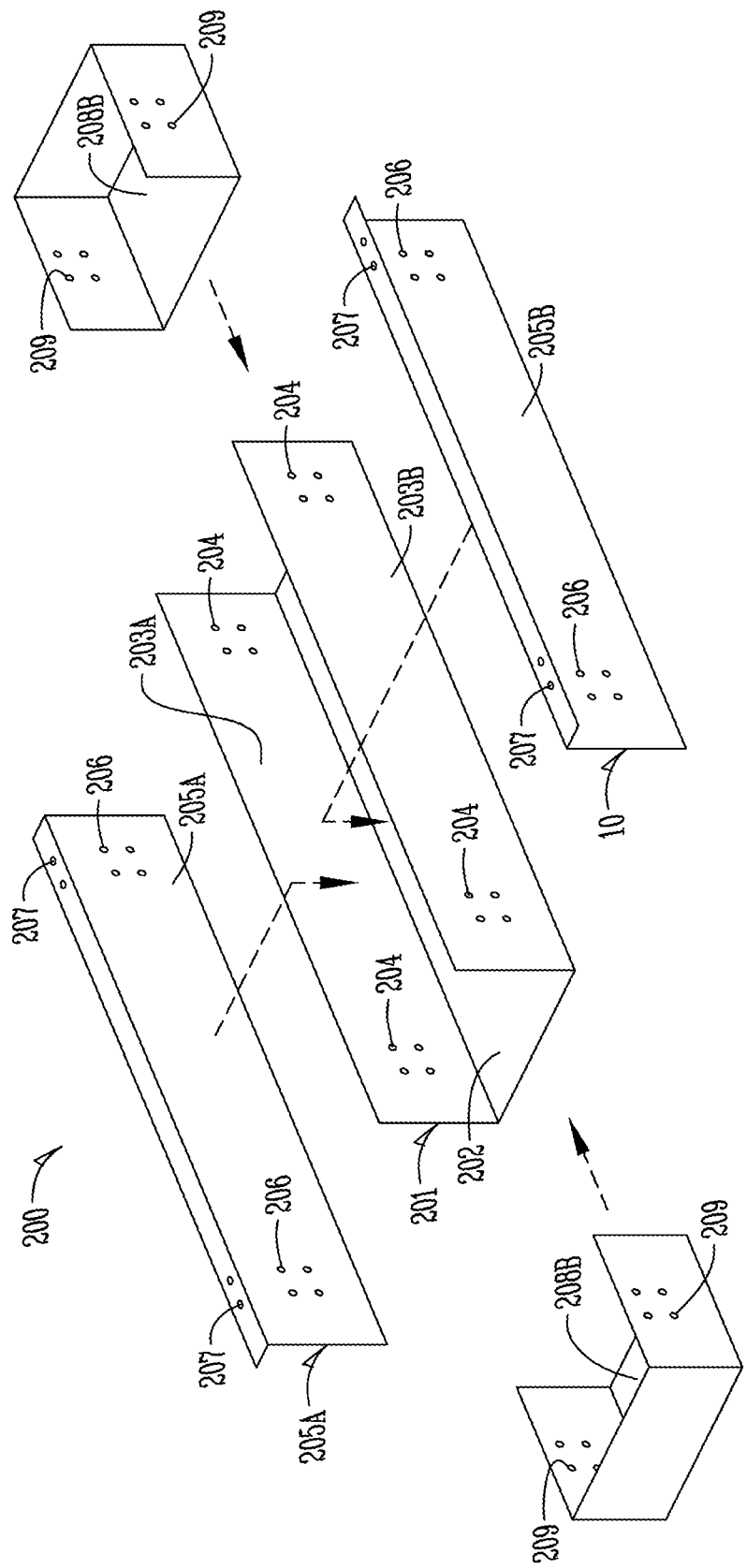

FIG. 9B is an enlarged perspective view of the pedestal base of FIG. 9A.

Figure 10:
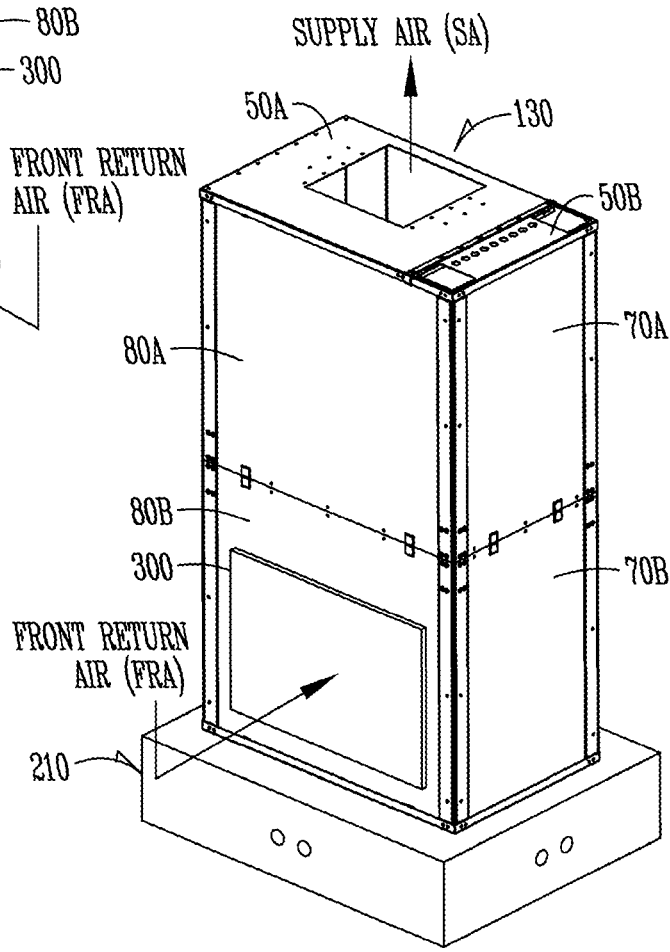

FIG. 10 is a perspective view from a different perspective and in a different configuration of an air handler unit of 4A but mounted on what is called a plenum base (such as are known in the art or can be field-built by persons in this art).

FIG. 11 is a perspective view of a still further installation configuration for an air handler unit of FIG. 4A on a pedestal base and mounted in a door frame with a door that would enclose it.

FIG. 12 is a still further illustration of an air handler subsystem such as FIG. 4A in a slightly different configuration on a pedestal base mounted in a wall.

Figure 13:
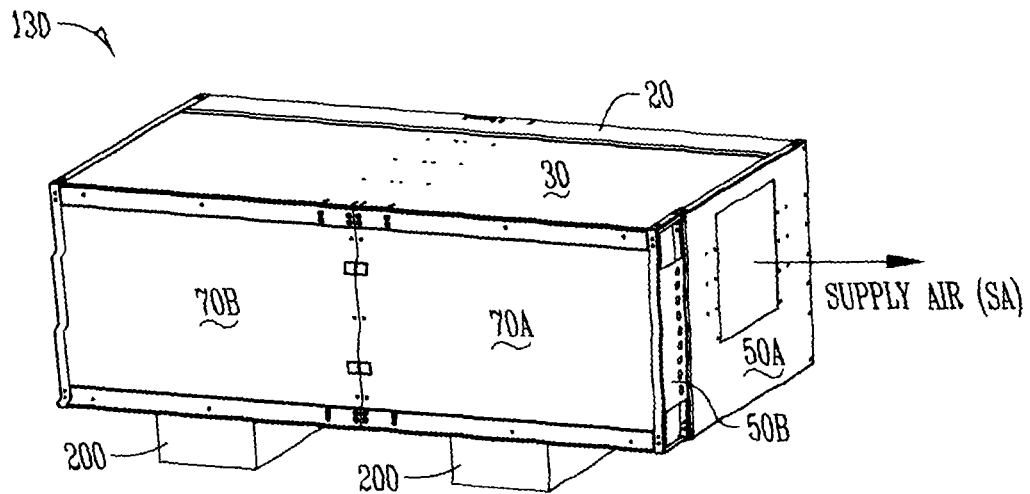

FIG. 13 is a perspective view of a still further installation and mounting configuration for an air handler unit such as FIG. 4A mounted horizontally on two pedestal bases.

Figure 14:
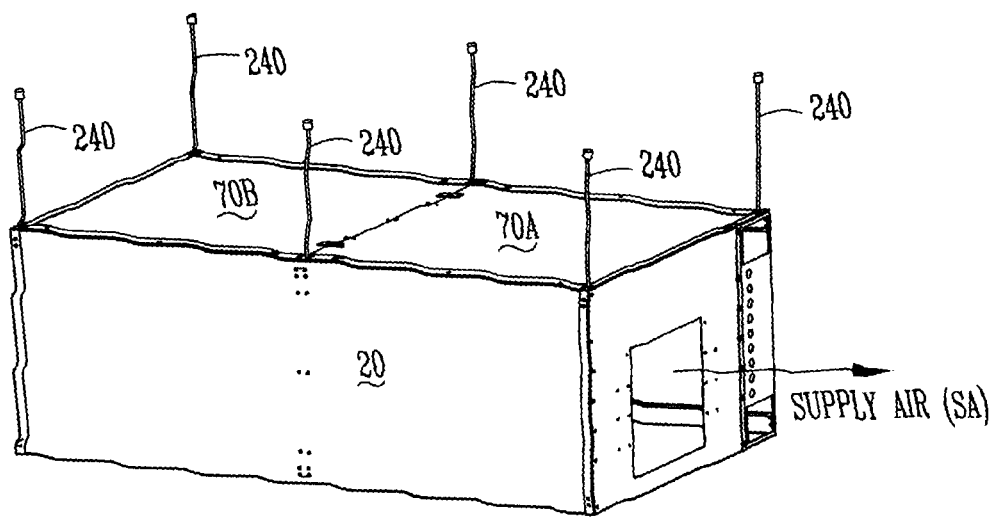

FIG. 14 is a still further potential mounting configuration in a horizontal manner of an air handler unit of FIG. 4A from suspension rods or cables.

FIG. 15 is similar to FIG. 4A but illustrates an optional additional hydronic heat exchanger that can promote improved efficiency if the main hydronic heat exchanger utilizes a condensing water heater/hot water generator.

IV. DETAILED DESCRIPTION OF EXEMPLARY EMBODIMENTS

A. Overview

For a better understanding of the invention, examples of specific forms the invention and its aspects can take will now be described in detail. These examples are neither inclusive nor exclusive of all forms the invention and its aspects can take. Variations obvious to those skilled in the art will be included within the invention which is solely described by the appended claims. These exemplary embodiments will be described in the context of an HVAC system including a commercially available outdoor refrigeration-based heat pump, an indoor air handler component that supplies or is connected to duct work to supply conditioned air to an indoor space, a supplemental or booster heat supply, in this example, a hydronic subsystem, and a control subsystem to operate the components. These examples will primarily be in the context of the indoor air handler subsystem principally housed in a highly configurable but highly efficient assembly which can receive conventional commercially available components including but not limited to a fan, a hydronic coil of the hydronic subsystem, and a refrigerant coil that would be operatively connected to the outdoor heat pump.

A further principle context of this description will be installing the system relative to an apartment building that can have various space limitations or mounting location choices. However, the invention can be applied in a variety of situations and contexts not necessarily limited to those described in these few examples.

In this description, frequent reference will be taken to the appended drawings. Reference numbers or letters will be used to indicate various parts or locations in the drawings. The same reference numbers or letters will indicate the same parts or locations throughout the drawings unless otherwise indicated.

B. Overall System 10

Figure 1A:
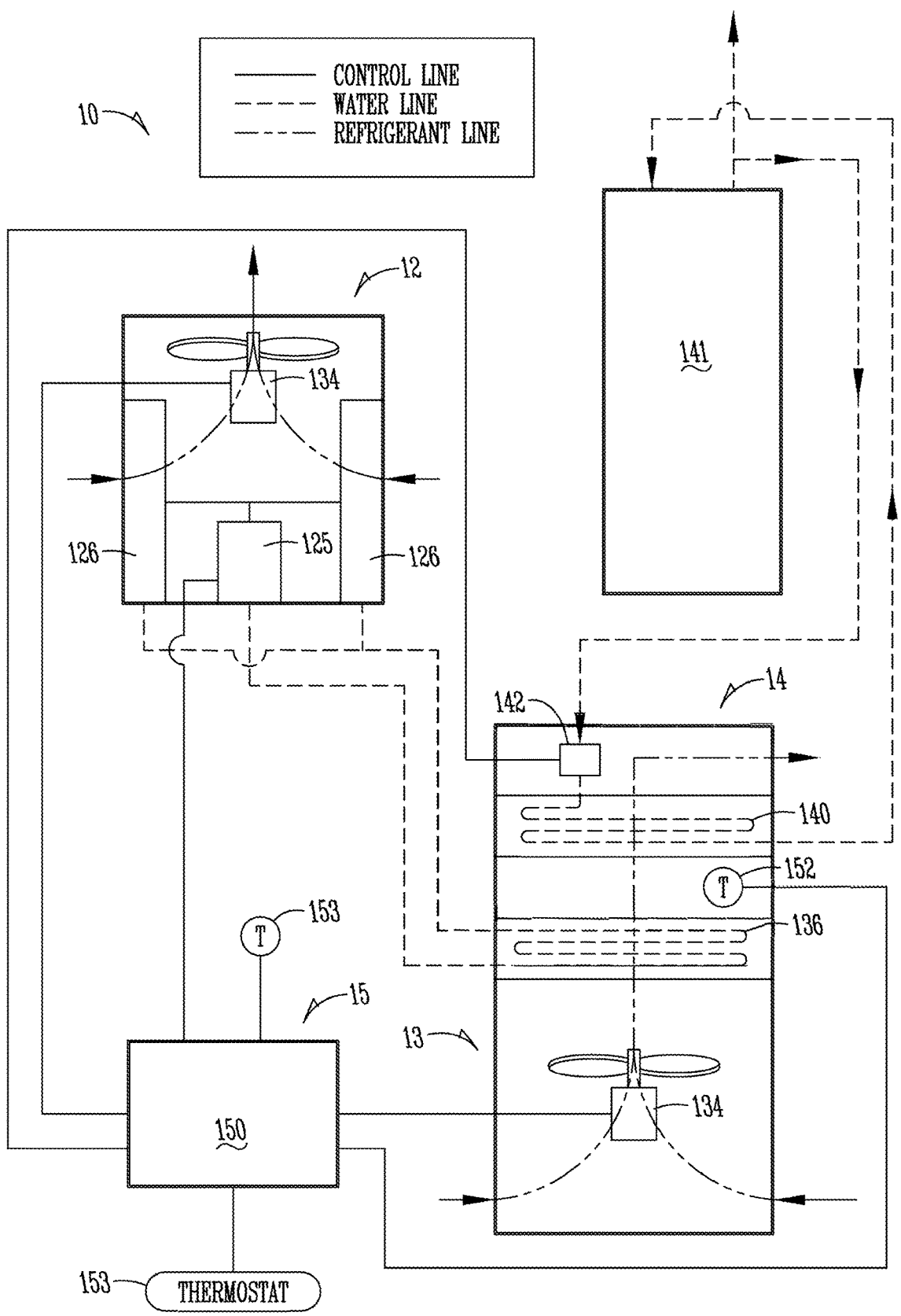
FIG. 1A is a diagrammatic view of one exemplary embodiment of an HVAC system according to the invention.

In one aspect of the invention, an HVAC system 10 includes an out of doors heat pump sub-system 12, an indoor air handler sub-system 13, a source of heated water 14, and a control circuit or sub-system 15. FIG. 1A illustrates system 10 diagrammatically. FIGS. 1B, 2A-C, 3, and 4A also illustrate this exemplary embodiment. Primary features of system 10 include the following.

Heat pump sub-system 12 can be conventional, off-the-shelf, and commercially available including a housing 120, a condenser 125, one or more refrigerant coils 126 (here two coils 126L and 126R), and a fan or blower 124. However, in this embodiment, heat pump sub-system 12 is not conventional in at least one way. It is controlled by control subsystem 15 to avoid any defrost cycle.

Air handler sub-system 13 can be somewhat conventional, including a housing, at least one refrigeration coil, and a fan. However, in this embodiment, air handler 13 includes the following.

A secondary or booster heat source 14, here a hydronic or hot water coil 140 in the air path of fan 134. A water pump 142 operatively connected between a tank-type condensing water heater 141 (e.g. conventional commercially available residential gas-fired) and hydronic coil 140 (commercially available from a variety of sources). Water heater 141 supplies a source of heated water to pump 142, but also can provide heated water for other uses at the target space (e.g. to bathroom and kitchen fixtures, see FIG. 1B).

A control circuit or sub-system 15 operates the system. It likewise can be off-the-shelf, commercially available hardware (e.g. programmable controller or microprocessor) with input and output interfaces that can operatively communicate with the indicated components in FIG. 2. Circuit 15 would include some type of board, housing, or substrate, a programmable processor 151, and input and output connections. For example, as indicated at FIG. 2, control circuit 15 can receive inputs from a variety of sources and instruct a program of operation of the active components in system 10 based on one or more of those inputs accordingly to aspects of the invention.

FIG. 1A diagrammatically illustrates in high level form one exemplary aspect of the invention. System 10 includes the outdoor heat pump 12.

Figure 1B:
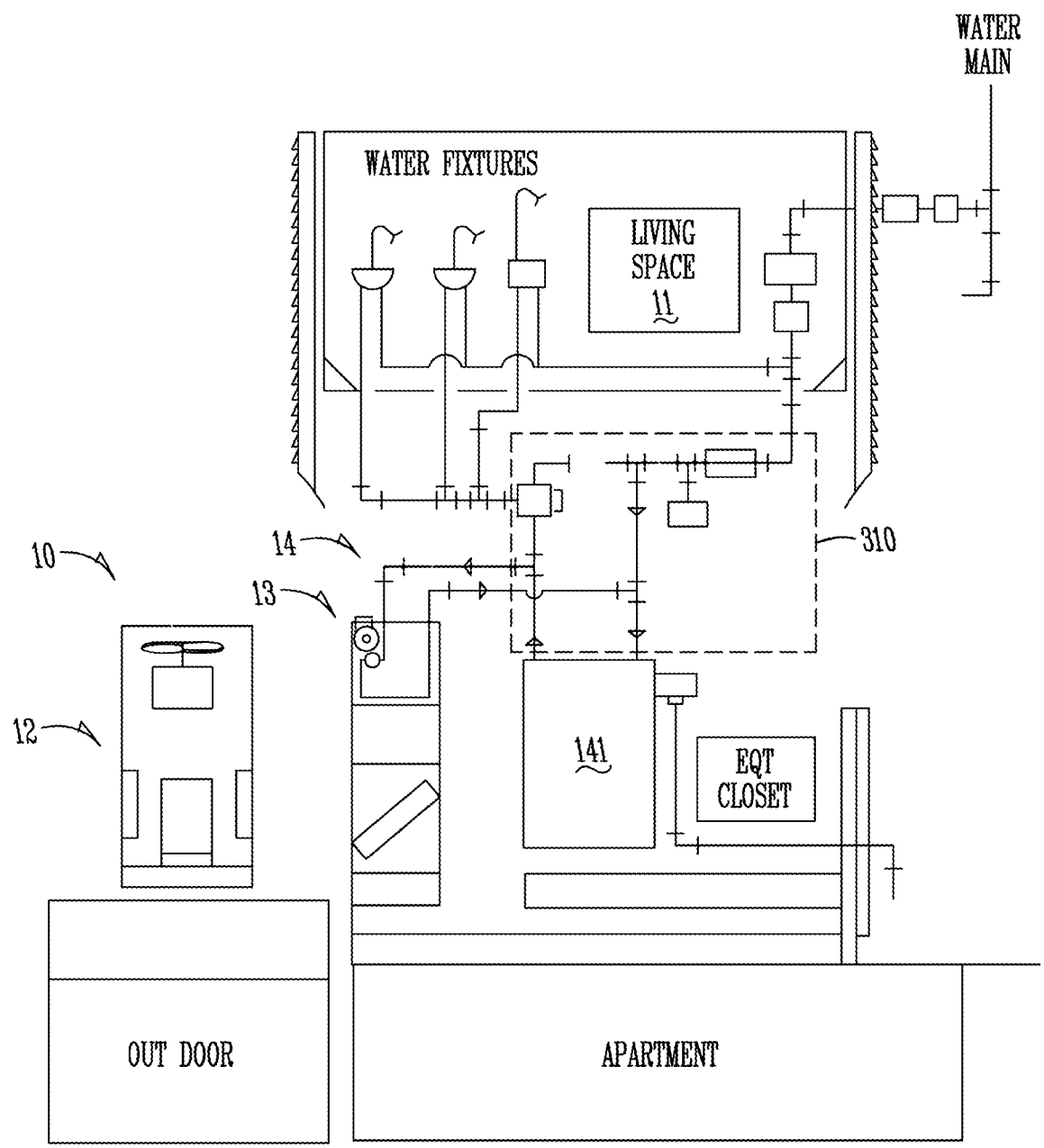
FIG. 1B is a more detailed diagrammatic depiction of one form the system of FIG. 1A can take.

FIG. 1B illustrates the general system 10 in more detail in the context of a residential installation. The schematics of FIGS. 1A and 1B highlight the three main components.

Operation of system 10 in cooling mode is the same as conventional systems, namely cold liquid refrigerant is generated in the outside unit and delivered to the air handler where it is used to cool the conditioned air. In heating mode, system 10 will also operate like a conventional heat pump with two notable exceptions. First, when outside air temperature reaches a point where it is more costly to produce heat with the heat pump as compared to the water heater, the heat pump is turned off and hot water from the water heater is transported through the hydronic coil by the pump in the fan/coil unit thus heating the conditioned air. Since the heat pump is turned off before the outside air temperature is low enough to ice the outside refrigeration coil, a defrost cycle is not required. Secondly, if at any time the air supply temperature to the conditioned space falls below a comfortable level (typically 88° F. to 93° F.), hot water is pumped through the hydronic coil in the fan/coil unit to boost the supply air temperature to a comfortable level.

More details of each of the sub-systems will be set forth below. As will be appreciated by those skilled in the art, advantages of system 10 can include one or more of the following.

Since the system can be installed in almost any configuration using parts common, the inventory that must be carried by manufacturers, distributors, and installers is dramatically reduced with attendant economic and time savings.

Since the system can be accessed, maintained, repaired, or component parts replaced from several sides regardless of orientation, maintenance costs are dramatically reduced.

For electrically-powered heat sumps and non-electrically-powered (e.g. natural gas or other fossil fuels, or bio-based or other renewable fuels) secondary or booster heat source, the system uses electricity when it is economically advantageous to do so and uses gas or renewables for the remaining requirement. This allows the gas company and electric company to share the residential housing market HVAC load and should limit programs that both utilities currently use to promote the use of their equipment in less than ideal conditions thereby costing consumers both money and comfort. Consumers can thus pay less for energy and are more comfortable.

The system can eliminate one combustion flue gas stack by using the water heater for both domestic hot water and space heating. This is extremely important in multifamily housing where new codes make it virtually impossible to provide venting for two combustion devices in equipment closets with the housing unit. Of course, this also reduces the initial cost of equipment, as well as its installation and maintenance costs. A major deficiency of current heat pump systems is that as outside temperature drops the supply air temperature to conditioned spaces drops to an uncomfortable level. The use of hot water for boosting the supply air temperature eliminates this problem.

The life expectancy of a conventional heat pump system is dramatically reduced by a defrost cycle. Since the defrost cycle is eliminated by system 10 however, the life expectancy of the setup will dramatically increase and maintenance costs over its life cycle will dramatically decrease.

Heat Pump Subsystem 12

Outside modified/enhanced conventional heat pump unit 12 contains a refrigeration compressor 125 and one or more refrigeration coil(s) 126 that serve as a condenser in the cooling mode and an evaporator in the heating mode. The major difference between this concept and a conventional heat pump outside unit is the absence of a defrost cycle. Very high efficiency units up to approximately 20 SEER are currently available on the market and could be used in this concept. See FIGS. 1A, 1B, and 3.

This sub-system 12 of system 10 is the same as a conventional outdoor heat pump section that produces heating or cooling by a reversible refrigeration cycle with two notable exceptions. First, this unit does not require or utilize the reversing cycle used by conventional systems to defrost in heating applications. Second, the unit can be installed through a wall eliminating the need to locate this unit on the ground, roof, etc.

Unitary through the wall heat pumps are well known. This outdoor heat pump section can be mounted through the wall and allows refrigerant lines (suction and return) to be easily and cost effectively connected between this unit and the air handler.

The specifications and operational characteristics can be selected by one skilled in the art. They can be mounted in suitable positions such that they have clear access to ambient air as well as electric power for fan and condenser.

Air handler Subsystem 13

Air handler subsystem 13 has a housing 130 that includes some conventional heated air HVAC components (fan, refrigeration coil, and appropriate air inlet and outlet). As seen in FIG. 1A, in this example a hydronic coil is added into the air path between return air inlet into the air handler and outlet to heated space 11 or duct work to a heated space 11.

The hydronic coil 140 is operatively connected to a heated water supply. Here it is a conventional tank commercially-available gas-fired residential-sized water heater 141. Operational and performance characteristics can be selected according to need or desire.

Water heater 141 provides hot water for the hydronic coil in the air handler 13 as well as potable hot water. Ideally, this water heater would be fired on natural gas or fueled by a renewable energy source such as biomass or solar. Current, water heaters on the market have efficiencies exceeding 95%.

An inside fan/coil unit 13 contains a blower assembly 124 to move air through a duct system for distribution to conditioned spaces, a refrigerant coil 136 for transferring energy (either heating or cooling) from the refrigerant to the conditioned air, and a hydronic coil 140 for providing heat to the conditioned air. A water pump 142 is incorporated in air handler 130 to move hot water through hydronic coil 140 when required. The major difference in function between this concept and conventional fan/coil units used in the residential housing market is the addition of the hydronic coil and associated pump. See FIGS. 1A, 1B, 4A, and 5A-J.

A water heater 141 provides hot water for hydronic coil 140 in air handler 130 as well as potable hot water.

Housing 130 for Fan/coil unit 13 can be assembled in a variety of configurations, including installed vertically (narrow sides vertical) or horizontally (narrow sides horizontal). Additionally, the interior of housing 130 can be accessed, maintained, repaired and component parts replaced from at least one, and usually two, of its four sides regardless of orientation.

The outer surfaces of the air handler unit 13 in this embodiment is a rectangular box with cross sectional dimensions of "a" by "b" where a>b and height "h". The "a" dimension is hereafter called the "wide side" and the "b" dimension is called the "narrow side".

In this embodiment, "h" equals 48 inches, "a" equals 27 inches, and "b" equals "17" inches. These dimensions provide an enclosure 130 that can fit in a variety of installation circumstances that are presented to the installer.

Access to all internal components is always available through one of the wide sides and either the left or right narrow side. (The same hardware can be assembled to provide access through the left or right side but not both sides.) The air handler contains a heating and cooling refrigeration coil (DX coil), a hydronic heating coil, a supply fan, and a hydronic pump for circulating hot water through the hydronic coil. The air handler can be manufactured as one unit or two units-one containing the hydronic heating coil/pump/fan and the other containing the DX coil and condensate pan.

The air handler unit cabinet design allows access to all internal components through the wide side and either the left or right narrow side using the same hardware. This includes condensate cleanout fitting. The particular configuration can either be factory set or can be configured in the supplier or local contractor work areas.

The air handler unit cabinet design allows the air handler to be installed in a number of configurations using the same hardware. These configurations include, but are not necessarily limited to:
  a. A vertical floor (pedestal) mount with wide-side access and return air.
  b. A vertical plenum mount with wide side access and bottom or side return air.
  c. A vertical plenum base with narrow side access and bottom or side return air.
  d. Vertical floor mount in standard doorframe with free return through door louvers.
  e. Vertical floor thru wall using a decorative return access kit.
  f. Vertical floor mount as part of a packaged unit.
  g. Horizontal floor or suspended mount with end return.

See FIGS. 9B, 10B, and 11-14 for specific examples.

The air handler is configured to fit in mechanical closets that were built for less efficient systems and are now too small for presently available systems.

Because all parts are interchangeable for all required configurations, the inventory at all levels in the supply chain are dramatically reduced with attendant cost savings. In addition, the reduction in the total number of parts required reduces tooling costs and manufacturing space requirements all leading to reduced manufacturing cost.

The drain pan used to catch condensate during cooling is designed so that the same pan can be used when the air handler is in either a vertical or horizontal orientation.

The design of the air handler is such that a common height and wide side dimension can be used for multiple capacity units allowing the use of the same drain pan and pedestal mounting kit.

The pump used to move hot water in the hydronic loop is designed so that the same pump can function in high head applications like a tankless water heater or in low head situations. Further, it is designed for easy access.

The air handler can be manufactured as a one piece unit or two piece unit. The one piece unit will require a change of only three parts used in the two piece design: one narrow side vertical outside panel and two vertical wrapper panels.

The hydronic cooling coils are designed to utilize same-end headers and can be rotated 180 degrees so that the same coils can be used in all configurations.

The location, mounting techniques, and accessibility of the fan motor and housing assembly is unique in that it can be removed either from the narrow side or wide side by simply undoing three nuts. The mounting technique provides for two flanges on the top of the fan housing outlet. The fan is inserted into the slot in the cabinet with the top flange on the outside of the cabinet. The fan is then rotated up so that the second flange contacts the underside of the cabinet. Mating holes are provided and nuts are used to fasten the lower flange to the cabinet.

The drain pan is unique in that one drain pan can be used for either vertical or horizontal orientation of the air handler and the same drain pan can be used for different capacity air handlers (because a common width, dimension "a", is used for different capacity air handlers).

The Pedestal Base Kit allows condensate primary, secondary drain lines, and traps to drain through the bottom panel and exit in all directions front, back, either side, above bottom pan for front exit for through-wall mounting. See FIGS. 9A and 9B and description below.

3. Control Subsystem 15

FIG. 1A indicates schematically the operative connection of the components. It also diagrammatically indicates a control subsystem 15. Control subsystem 15, as will be further described below, can integrate the control of these components.

FIG. 1B is a more detailed diagram and schematic of one specific application of system 10 of FIG. 1A. In this example, heat pump 12 is mounted (e.g., on concrete slab) outdoors. Air handler 13 is mounted in or near the residential air conditioned space. Likewise the water heater associated with hydronic subsystem 14. FIG. 1B illustrates how this HVAC system 10 can integrate with other household systems (e.g., faucets, showers, etc.).

Figure 2A:
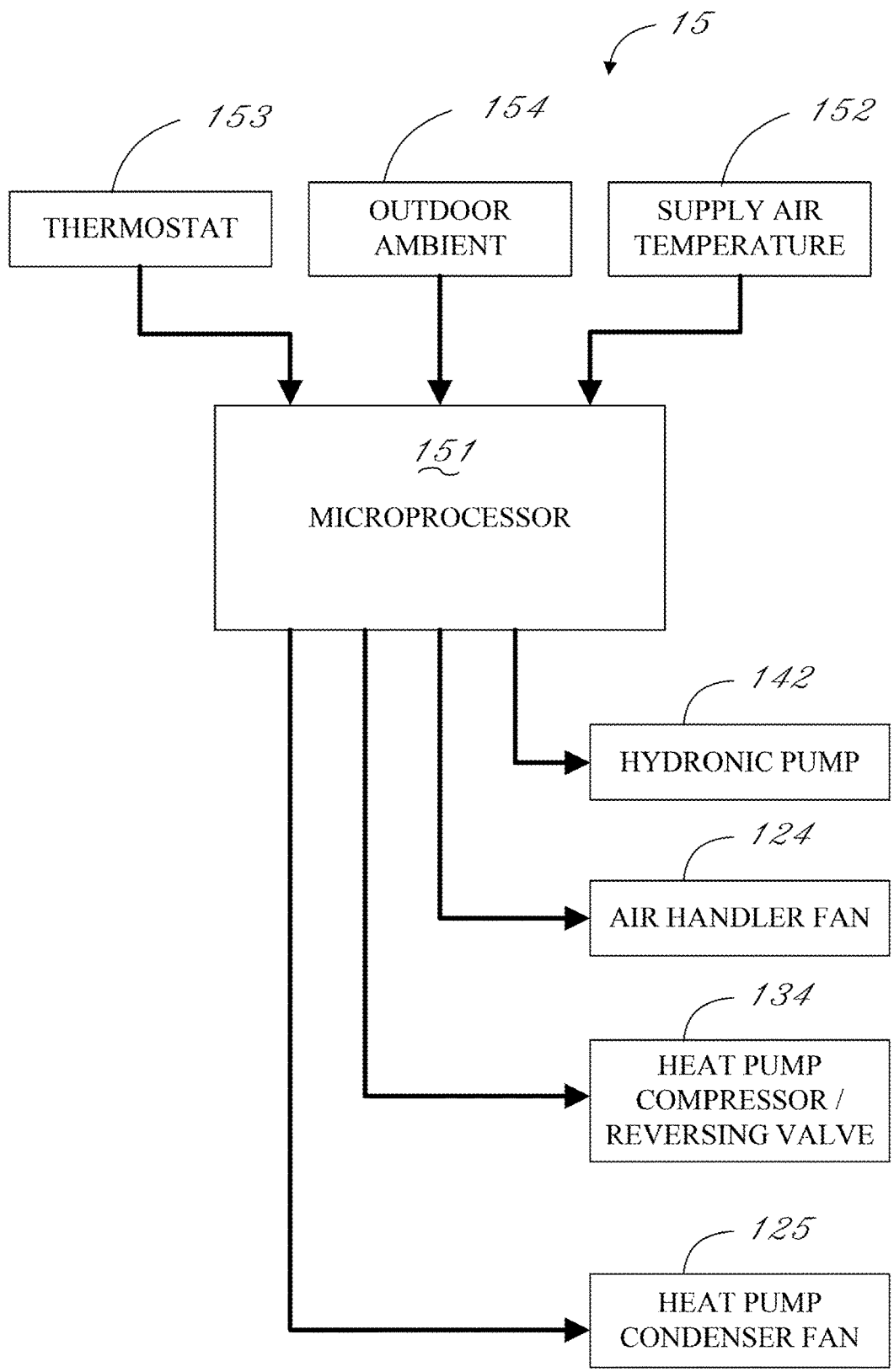
FIG. 2A is a schematic diagram of a control subsystem that can be used with the system of FIG. 1B.

FIG. 2A illustrates diagrammatically control system 15. A programmable microprocessor 151 (same or similar to those commonly used in conventional HVAC systems) includes several inputs. The thermostat 153 allows control over set points related to user desire. Outdoor temperature sensor 154 would supply outside ambient air temperature. Leaving air supply temperature sensor 152 would inform microprocessor 151 of air temperature at or near air leaving air handler subsystem 13.

Microprocessor 151 would have outputs that would include connections to a hydronic pump 142, which would feed hot water from a hot water heater to the hydronic coil in air handler subsystem 13, air handler fan 124, heat pump fan 134, and heat pump compressor 125.

Figure 3:
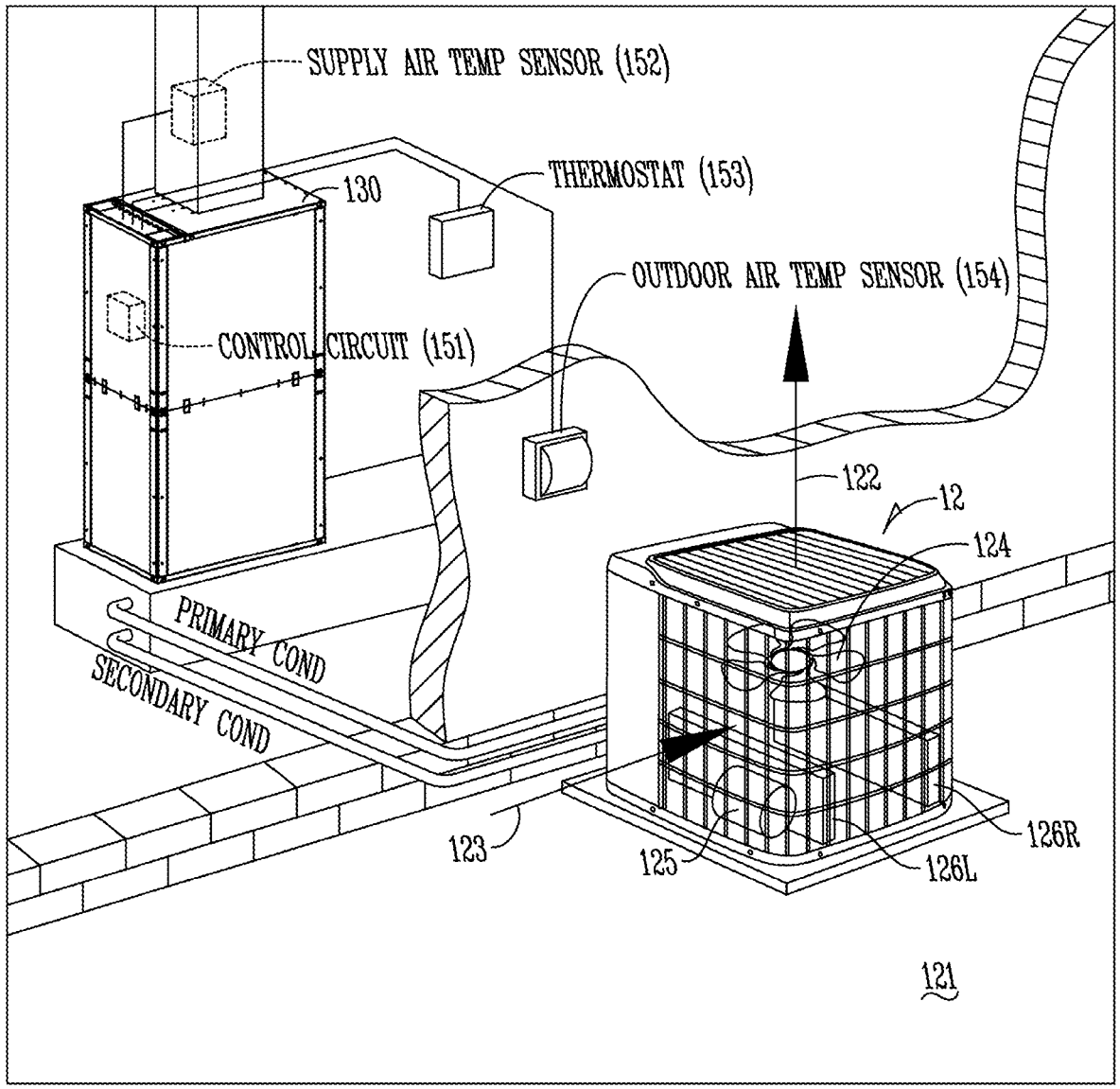
FIG. 3 is a diagrammatic depiction of a commercially available outdoor refrigeration cycle-type heat pump that can be used with the system of FIG. 1B.

As indicated at FIG. 3, conventional heat pump 12 would allow outside air in and through one or more refrigeration cycle coils 126 (hereto are shown at 126A and B). Fan 124 would circulate air through coils 126 and out from outlet 122 to outside. Condenser 125 would be operated too in either heating or cooling mode for supplying either heated or cooled air to air conditions space in the building as in conventional.

In an aspect of the invention, utilization of an air handler housing that can accommodate both the conventional refrigeration cycle coil as well as a hydronic coil, and hook to an onsite heated water source, allows the control system to operate system 10 either solely based on the heat pump/refrigeration cycle for conditioned air to conditioned space 11. Alternatively it could shut off that subsystem and solely rely on hydronic subsystem 14 to supply heated air to conditioned space 11.

Furthermore it could operate both the refrigeration cycle and hydronic type subsystems.

As can be appreciated by those skilled in the art, having this dual capability provides substantial flexibility of operation of system 10 over a wide variety of circumstances.

The cabinet 130 (see also FIG. 4A) will house a solid-state control board with multiple set and/or programmable connection points. Board allows all internal wire connections and external connections (heat pump/ambient sensor/thermostat/electronic air cleaner/humidifier/water heater inter-tie/115V-60H-1P power supply/UV light/flow sensor/etc. to feed out through the top panel and push-fit with male/female bullet connectors that are labeled properly. Internal connections such as motor leads, pumps leads, and leaving-air sensor are also connected at factory using the above-mentioned bullet connectors. Board and transformer are fuse-protected and safety protected by two door-switches wired in services. This module includes all listed parts and should easily become ETL/UL/CSA/Intertek approved.

System 10 allows benefits such as:
1. Avoiding defrost cycle of heat pump 20 by monitoring conditions indicative of need for defrost and turning heat pump 20 off. Optionally, heated water from water heater 40 could be provided to hydronic coil 46, and operated with fan 48 if heat is needed at the target space. Avoiding defrost cycles can extend the longevity of heat pump 20 and its components.
2. Optionally supplementing heat to the target space with hydronic sub-system 44/46 while heat pump 20 is supplying heat.

Additionally, housing 130 for air handler subassembly 30 can be specifically configured to allow high flexibility in mounting location and orientation. This can include the ability to mount components in the housings and then the housing to end-use position with essentially a common set of parts. Even though air ducts and refrigeration, electrical, and water lines would have to be operatively connected, the housings and hardware have aspects of uniformity that would reduce the number of parts and components a vendor of this system would have to have. It would ease the burden on installers with respect to different mounting configurations. Additional discussion of configurability of housing 130 is set forth later.

The functions provided by system 10 can include:
1. Optional filtered air flow (consisting of any ratio of mixed air from outside and return) for space cooling produced by defrostless heat pump section.
2. Filtered air flow (consisting of any ratio of mixed air from outside and return) for first stage space heating produced by an outdoor, defrostless heat pump unit. This outdoor heat pump unit is a part of the system and is unique in that it does not utilize a defrost cycle because this unit is stopped before the outdoor temperature level requires defrosting. During the time the outdoor heat pump unit is off, the hydronic coil described is used to supply heated air.
3. Filtered air flow (consisting of any ratio of mixed air from outside and return) produced by a hydronic coil receiving hot water from any currently available hot water generator to serve as either the primary heating coil or a booster heating coil.
4. Dehumidification of filtered air flow (consisting of any ratio of mixed air from outside and return) produced by the filtered cooling air flow.
5. Heated, potable water for domestic use.
6. Control of the system to optimize comfort and economy of operation.

For example, based on a pre-determined analysis of capacity of the components for heating and cooling, the space 11 to be air conditioned, the price of energy sources for operating the components, and perhaps other factors, the designer of system 10 could program a microprocessor 151 to automatically determine heath pump, hydronics subsystem, or a combination of both over time for various sensed or programmed conditions.

One example would be that when outside air temperature gets below a certain level, heat pump subsystem 12 must work harder to extract heat from that cooler air. This requires more energy use. If heat pump subsystem 12 is electrically powered, by pre-evaluation, empirical testing, or other methods, the program could calculate when it would be cheaper to either supplement heat with hydronic subsystem 14 or switch completely to hydronic system 14.

Figure 2B:
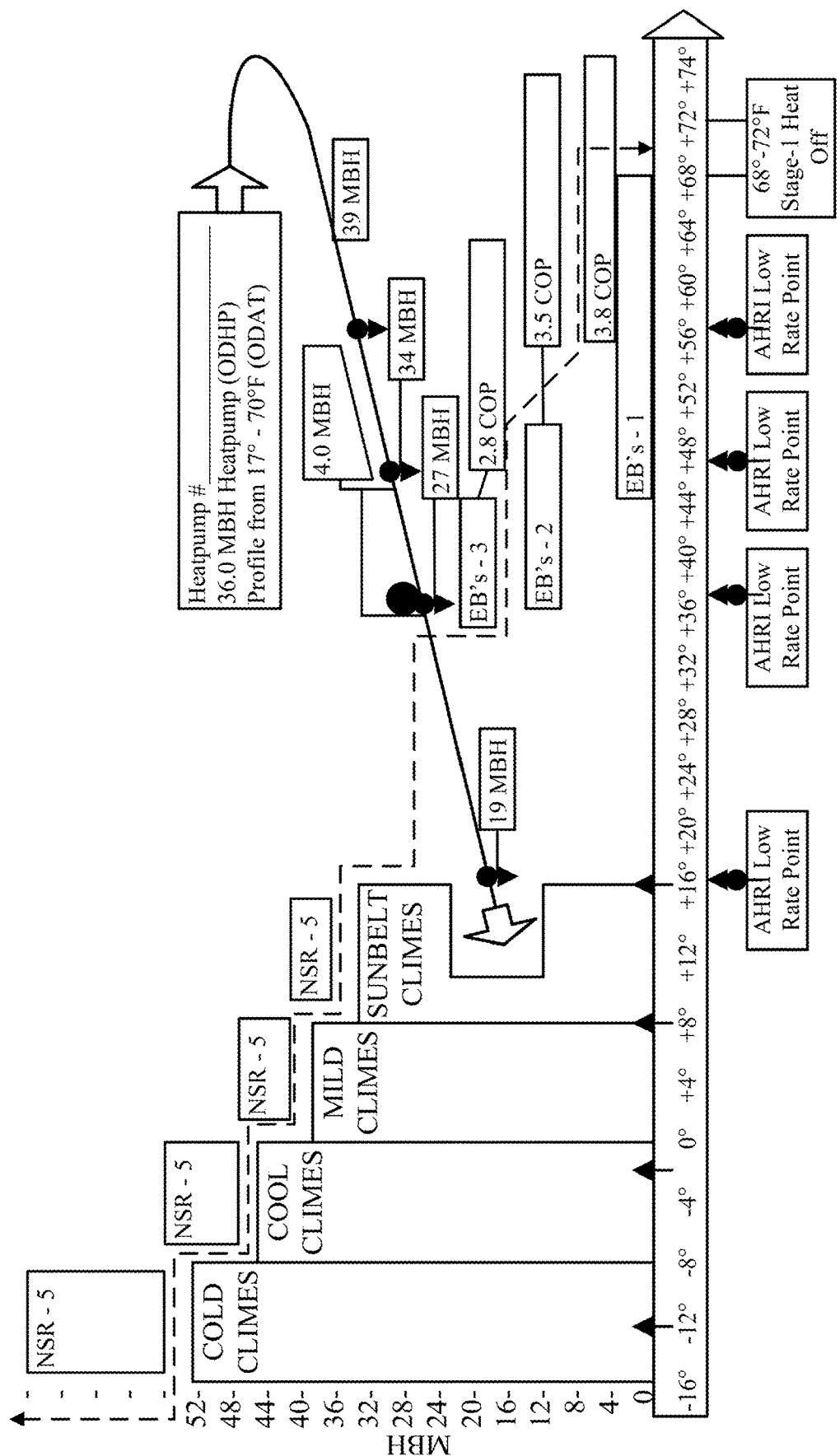
FIG. 2B is a diagram illustrating testing data and analysis of operation of a system like that of FIG. 1B relative to different geographic climates and how this would dictate how the controller would be programmed to achieve functions such as avoiding defrost cycle and provided improved comfort to the space that is being heated.

Another example of benefit of system 10 is as follows. As indicated at FIGS. 2B and C, by evaluation, empirical testing, or otherwise, for a given geographic reason, a set point could be determined where heat pump 12 would be turned off to avoid ever needing a defrost procedure. These set points can differ for different climate zones. Need for heated air based on thermostat setting could be supplied by the hydronic subsystem 14. In this case regardless of energy cost, avoiding the need for defrost cycle that heat pump 12 has at least the following benefits. Defrost cycles on top of operation of heat pump 12 add to wear and tear on heat pump 12. Additionally, capability of defrost requires additional components (e.g. heaters and other related hardware and control). Ability to monitor and automatically avoid conditions indicative of need for defrost could create these benefits and savings. Heat pump 12 has some of the most expensive components of system 10. Avoiding wear and tear over normal useful life (years if not decades) can be advantageous.

FIG. 2B diagrammatically illustrates how some of the set points of system 15 can be derived.

For example, the vertical bars starting on the left side and going right represent relatively the total heating requirements on average for different climate zones (starting on the left with coldest average ambient temperature and becoming warmer). These might correspond, for example, to Canada, Minnesota, Illinois, Tennessee, and Alabama respectively.

The diagonal line includes operating characteristics of a heat pump to meet those heating requirements.

In this example, the following set points were selected:
1. Outside ambient air >45° F., operate heat pump 12 alone (because its heating efficiency in that range likely outperforms hydronic subsystem 14).
2. Outside ambient air between 43° F. and 45° F., use hydronic subsystem 14 to boost heating if needed.
3. Outside ambient air is between 37° F. and 43° F., cut out heat pump sub-system and use hydronic subsystem 14 for all calls for heat. In some cases this is based on a determination that the hydronic heat system can produce called-for space heating cheaper than the heat pump. This can also or in the alternative be based on a determination that outside ambient air <35° F. likely will begin to cause frosting of the heat pump refrigerant coil and need a defrost cycle. Monitoring the ambient air temperature and avoiding heat pump operation in a condition indicative of need for defrost allows a significant benefit over conventional heat pumps that have defrost cycles. Manufacturers would not have to include expensive components to accomplish the defrost cycle with the heat pump.

By referring to information like FIG. 2B, the installer could select a set point or points by climate region.

A still further example of benefits of the combined hydronic/refrigeration cycle base system 10 involves user comfort. Sensing supply air temperature would allow microprocessor 151 to better control comfort level in space 11 that is to be air conditioned. For example, supply air temperature that drops significantly below human body temperature at least can create the perception by people in space 11 of uncomfortable cold even though room temperature is well within what should be considered adequate. Sometimes when outside air temperature is colder, heat pump 12 is unable to produce supply temperatures at or near human body temperature. Control circuit 15 could be programmed to kick on the hydronic system 14 to supplement heat emanating from an air handler subsystem 13 in those situations. The perception of comfort can be enhanced. At a minimum, it can be maintained at a better level across time than reliance on heat pump subsystem 12 alone.

A specific example of this comfort feature 15 is operation of system 10 by control sub-system 15 as follows:
1. Supply air temperature >90° F. in heating mode, continue to utilize the heat pump 12.
2. Supply air temperature <90° F. in heating mode, kick in supplemental heat with the main hydronic subsystem 14. This is based on a determination that if air temperature at the heating coil of the heat pump is under 90° F., it cannot produce comfortable air temperature in many spaces. The human body temperature is around 97° F. If air supplied to the ductwork or outlet to the conditioned space is at or under 90° F., it is well known in the art that humans may not feel comfortable air temperature, or at least not perceive the same. Having the supplement hydronic heat system 14 available can boost the supply air until it reaches a comfortable level.

Figure 2C:
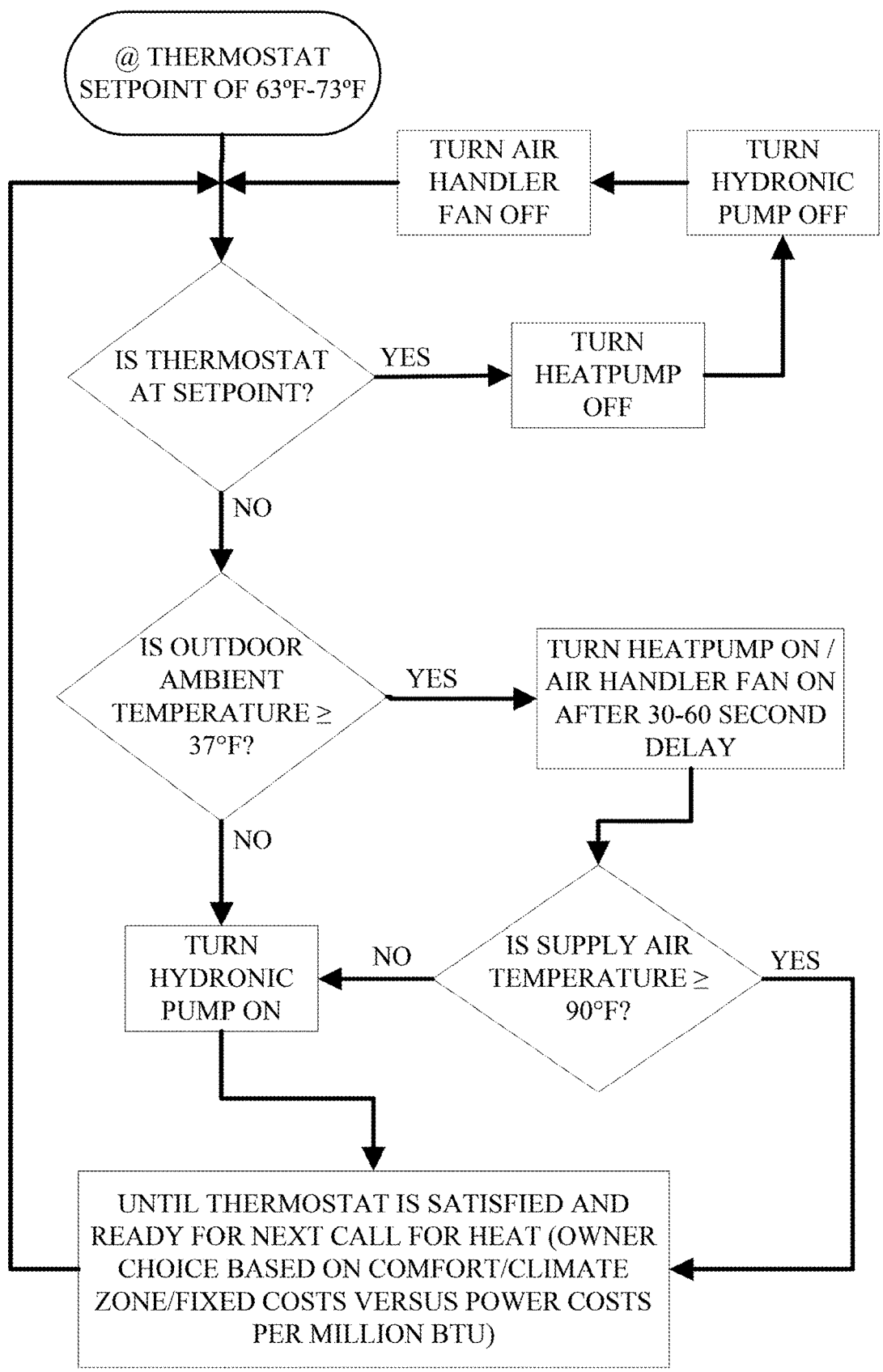
FIG. 2C is a block diagram flow chart of one control algorithm by which the HVAC system of FIG. 1B could be operated.

FIG. 2C provides one example of a programmable algorithm that can be programmed into microprocessor 151 according to the above regimens. As can be appreciated, the designer/programmer can create other regimens according to need or desire. The combined hydronic/heat pump combination provides flexibility for the same. Again, the addition of a hydronic coil is not at great expense but at this improved flexibility. Taking advantage of a relatively high efficiency hot water source (take water heater that is gas fired at today's natural gas prices for example) further provides an economical supplemental heat source that is usually readily available in apartment type settings or other indoor settings that use heated water.

As can therefore be seen, system 10 can be incorporated into a fairly conventional heated air HVAC system with a relatively few number of connections.

The overall system 10 operates more economically than most systems currently on the market for a number of reasons:
1. The system uses electrical energy when it is cheaper and natural gas (or other energy source) when that energy is cheaper for heating. This feature is accomplished by using a hydronic coil in the air handler and the control unit that determines the optimum operating condition subject to user constraints.
2. The system does not allow or require the heat pump to operate in a defrost mode.
3. Defrost mode which cools the space when one wants heating. The control unit accomplishes this action.
4. The system eliminates the need for electric resistance heating which is typically an order of magnitude more expensive than the use of natural gas, wood, etc. The electric resistance heating is replaced by the hydronic coil in the air handler.

The air supply temperature on heating is superior to that of conventional heat pump systems by using the booster heating coil in the air handler unit to maintain a nearly constant and comfortable supply temperature even when the outside temperature is very cold.

The system allows the use of heat pump cycles of the highest efficiency available without employing a defrost cycle as well as utilizing hot water from hot water generators of all types and energy inputs (natural gas, wood, etc.) to provide energy for the hydronic coil in the air handler unit.

The system can provide heat even when the defrostless heat pump section fails by utilizing the hydronic coil in the air handler unit.

The control unit is a programmable, solid state electronic device that receives/transmits data from a thermostat; outdoor temperature sensor; leaving supply air temperature sensor; hydronic pump; the outside, defrostless heat pump unit; and other accessories. The control algorithm used is specifically designed to allow optimum control of the system subject to user input constraints. Specifically, the controls unit allows:
1. All electrical connections to be made by push-fit-lock terminals.
2. The user to control leaving air temperature through the use of the hydronic heating coil.
3. Turning off or on the outdoor, defrostless heat pump unit based on user set points (or automatically calculated set points) to minimize the cost of heating (subject to user constraints).
4. Connection with any type of hot water generator.
5. Time delay for several components, including: on/off for the fan motor, hydronic pump, outdoor defrostless heat pump, and other accessories. The time delay is programmable.
6. Connection points for humidifiers, lamps, electronic filters, etc.

As can be seen, aspects of system 10 can provide at least these types of advantages:
a. More efficient HVAC/water-heating operation at reduced costs.
b. More comfortable space-heating/reduced repair costs by using no-defrost techniques.
c. The ability to replace/retrofit/build existing or new high-density housing without spending on expensive structural changes to the building.
d. Prevent unnecessary HVAC system component replacement resulting from the R-22 to R410A refrigerant changeover.
e. Lower greenhouse gas emissions.

Operation of system 10 can provide these and other benefits:
f. Promotes increased operating efficiencies. For some systems on the order of a 15-25% seasonal energy efficiency ratio (SEER) improvement. An example could be from about 13.5-15.5 SEER.
g. Promotes improvement in annual fuel utilization efficiency (AFUE) on the order of 25% for some circumstances. An example could be from 80+ AFUE to 95+ AFUE.
h. Promotes water heating efficiency; for some an improvement on the order of 25%. An example could be from about 78 recovery efficiency (RE) to 95 RE.

This can also result in increased comfort and decrease in owner's costs of installation/utilities/maintenance.

The system uses a modified conventional outdoor heat pump unit and an indoor fan/coil unite that contain both a conventional refrigeration heating/cooling coil and a hydronic booster hating coil. The system is capable of providing HVAC for at least the domestic market (e.g. residential housing market including, but not necessarily limited to, single family and multifamily residences, apartment building, low and high density condominiums, modular and manufacture housing, military, campus and other high density housing. It can be used with future new construction, replacement/retrofit of existing equipment, and government-backed housing through HUD and other government entities.

C. Specific Example of Air Handler Sub Assembly 13 and Highly Configurable Air Handler Housing 130

FIG. 4A illustrates in assembled form air handler housing 130 including in dashed lines a set of internal components setup consistent with FIGS. 1A and 1B. Height H is 48 inches. Narrow side NS is 17 inches. Wide side WS is 27 inches.

Those dimensions define an interior space adapted to house the following components: Fan 134, hydronic coil 140, and refrigeration cycle type coil 136.

Each of those components is commercially available and selected for the capability of providing performance and characteristics deemed needed for a wide variety of air conditioned spaces 11, including a wide variety of geographic regions. An example would be a typical 1-3 bedroom apartment.

FIG. 4A also illustrates that optionally water pump 142 might be housed within housing 130 as well as housing 150 for at least a substantial number of components for the control subsystem 15.

Optionally, a condensation collection pan/drain 90 (see FIGS. 6A and 6B also) could be positioned and help support coil 136 in its angled position shown in FIG. 4A.

Housing 130 can be configured to allow quick and easy mounting of each of the components as will be described later.

And, as well be appreciated, housing 130 can have appropriate return air and supply air openings relative to the components.

Another aspect according to the invention is the specific components of air handler housing 130 relative to making it highly efficient, economical and configurable to a variety of applications.

Figure 4B:
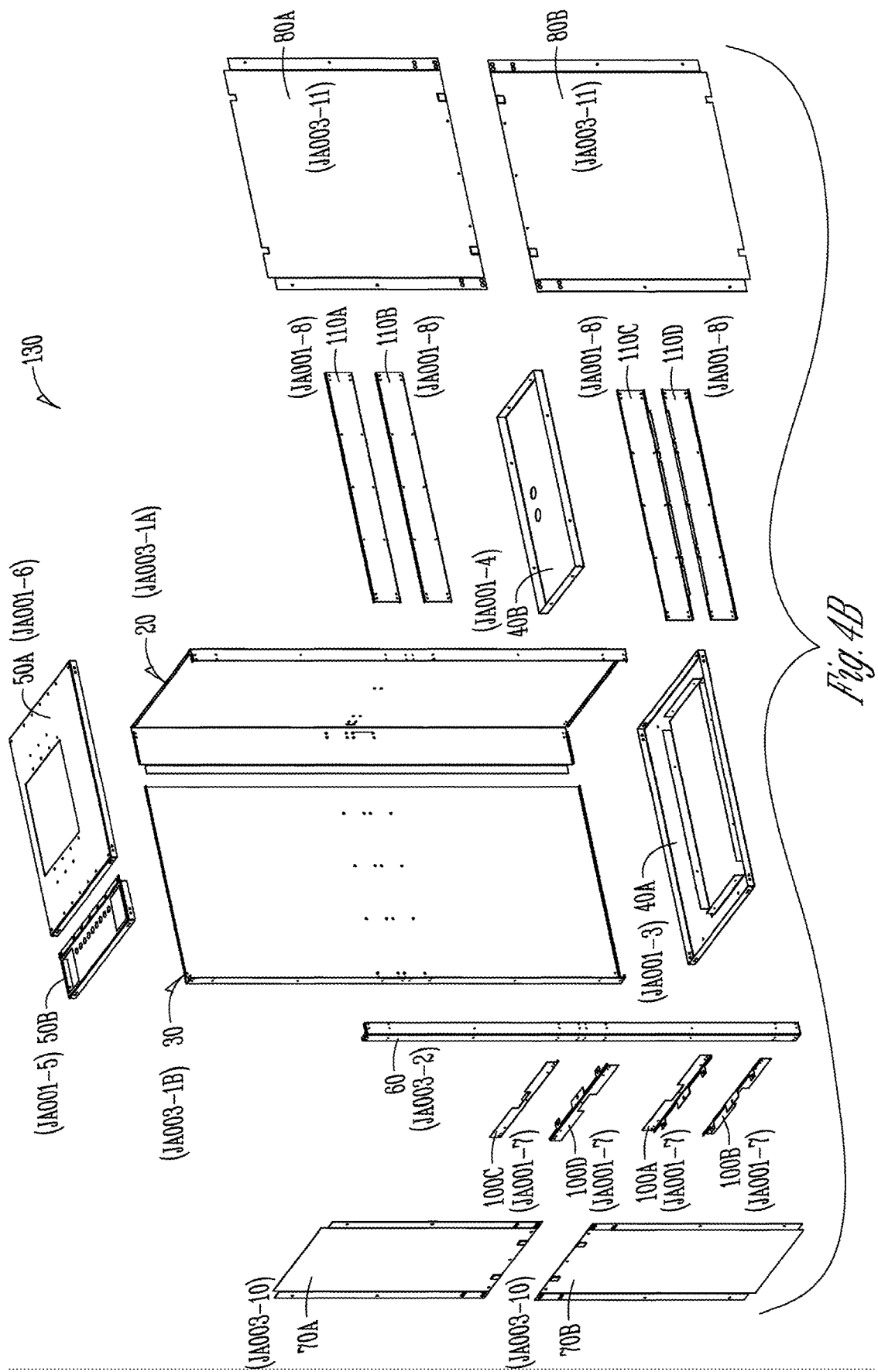
FIG. 4B is an exploded view of parts of the housing of FIG. 4A.

FIG. 4B is an exploded view of housing 130 parts. With reference to FIG. 4B as well as FIGS. 4C-T, it will be appreciated the benefits of housing 130.

Many of the parts of housing 130, when assembled, are symmetrical about a centerline. With essentially the same starting parts, different configurations are possible with the same fasteners. A few optional parts can be used to complete different configurations in some instances. But not only the parts, but the manufacturing of the parts allows needed internal components to be mounted or otherwise positioned in appropriate operational positions without need for special add-ons or on-the-spot customization.

FIG. 4C illustrates a specific configuration for one of the narrow walls (reference numeral 20). It has an L-shape and can be called a wrap side wall 20. It can fit relative to an end wall 40A (FIG. 4C) and be bolted into place by matching several bolt holes. Bolts, nuts and washers, if needed, can all be of the same size characteristics.

Figure 4D:
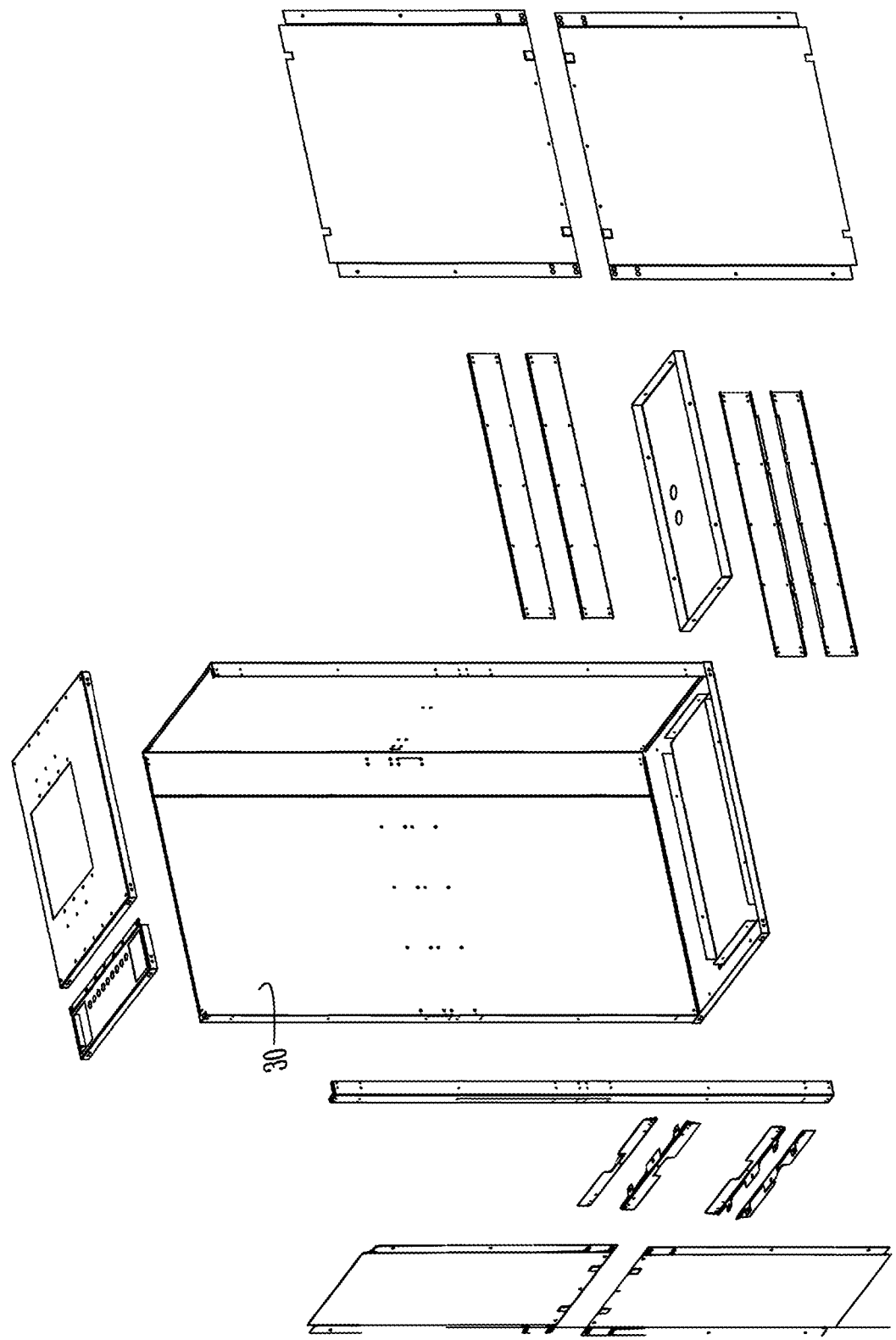
FIGS. 4C-4T are similar views showing one potential sequence of assembly of the highly configurable housing of FIG. 4B into the air handler enclosure housing of FIG. 4A.

FIG. 4D adds one piece wide side wall 30 to bottom 40A and wraps narrow side 20. The same bolts could be used to attach it along base 40A at matching bolt holes. At this point, two sides and a bottom of the enclosure begin creating a structural shell for housing 130.

Figure 4E:
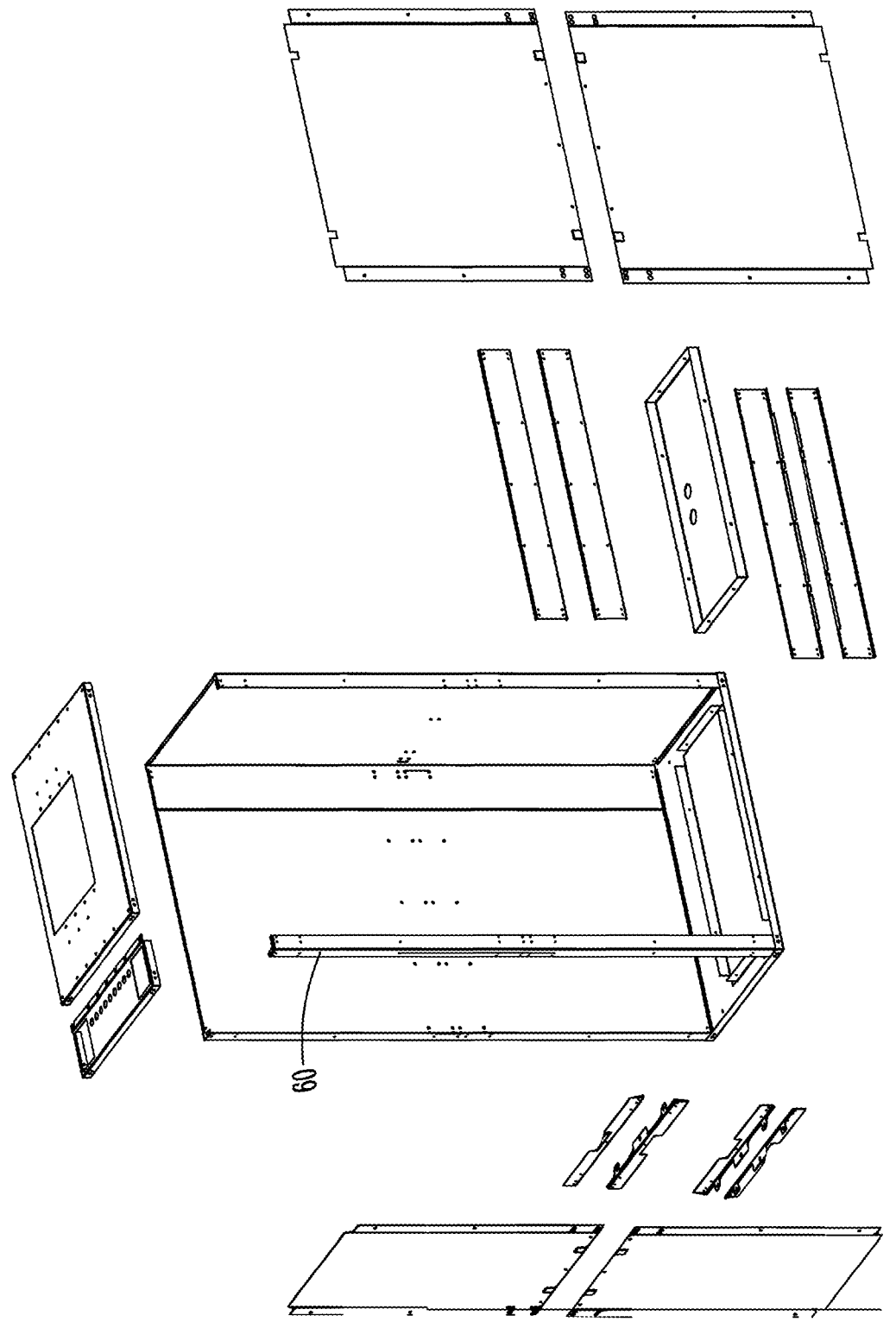

FIG. 4E adds a vertical support 60 at a free corner. It is likewise bolted at matching bolt holes with the same bolt hardware.

Figure 4F:
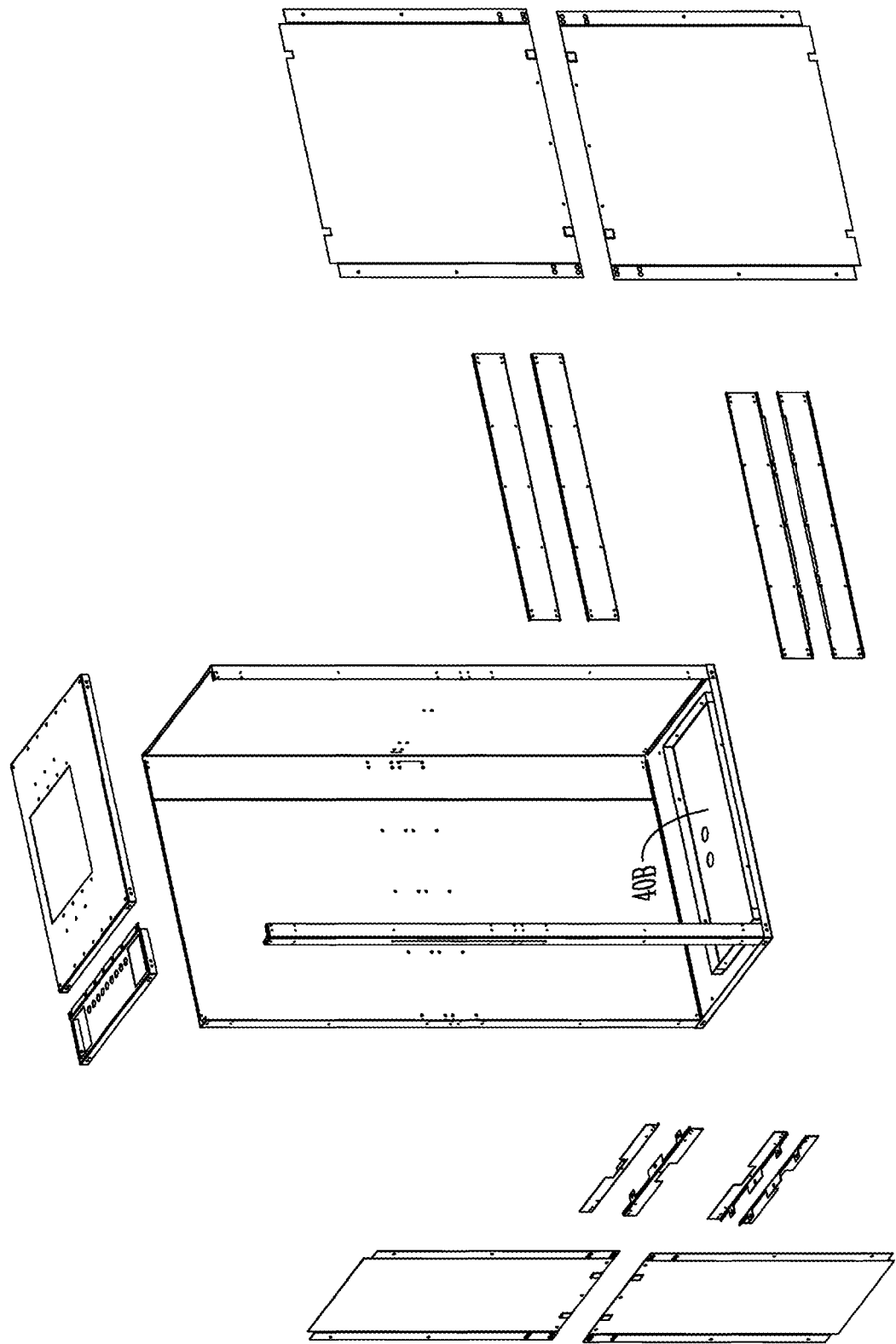

FIG. 4F shows a bottom plate 40B that could fit within a larger opening in bottom 40A for certain configurations. It can have matching bolt holes to be bolted in place. It can have openings for passage of such things as refrigerant conduits, water conduits, or electrical wires. But it can basically be used to plug and create an essentially predominantly solid bottom wall of housing 130.

Figure 4G:
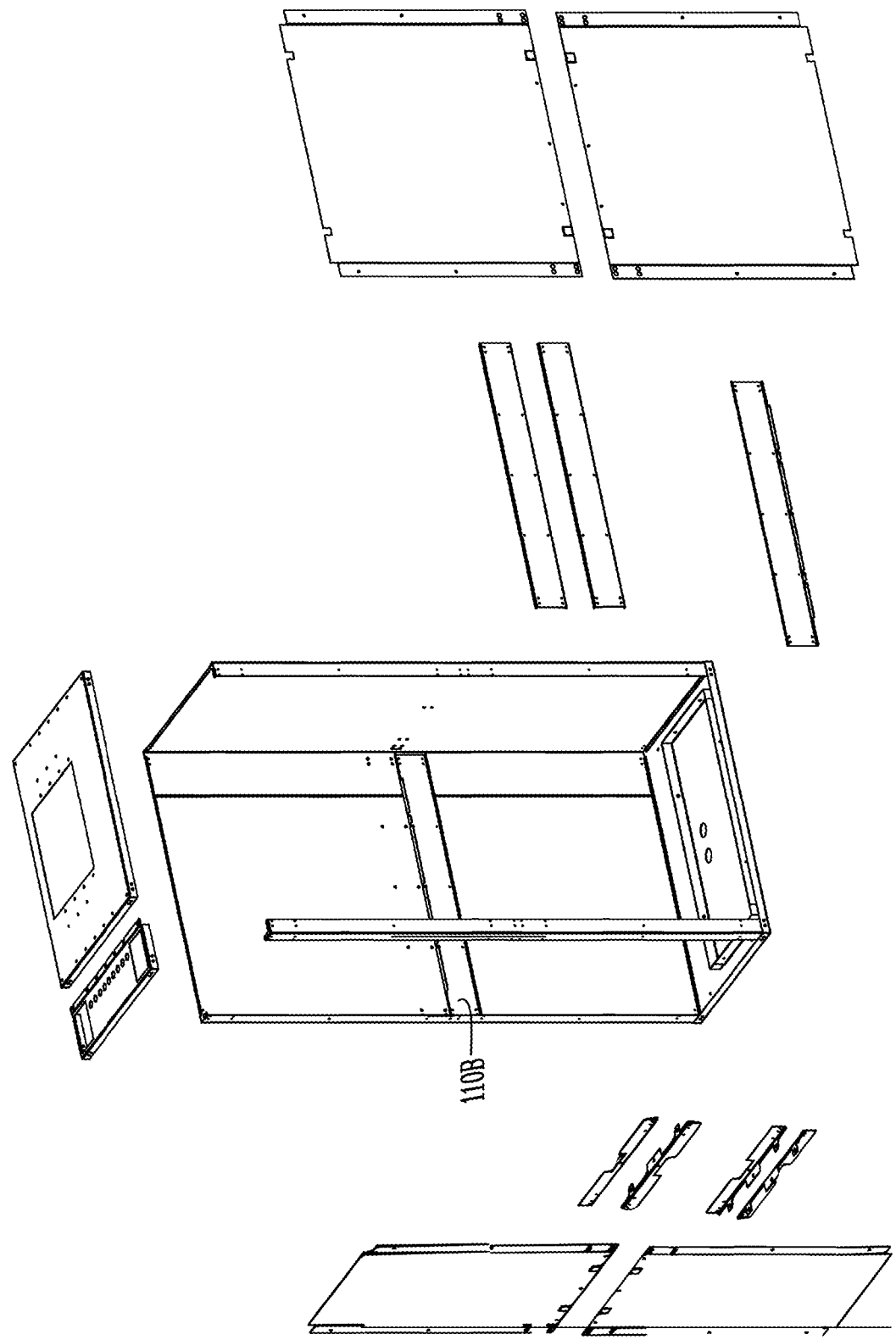
Figure 4H:
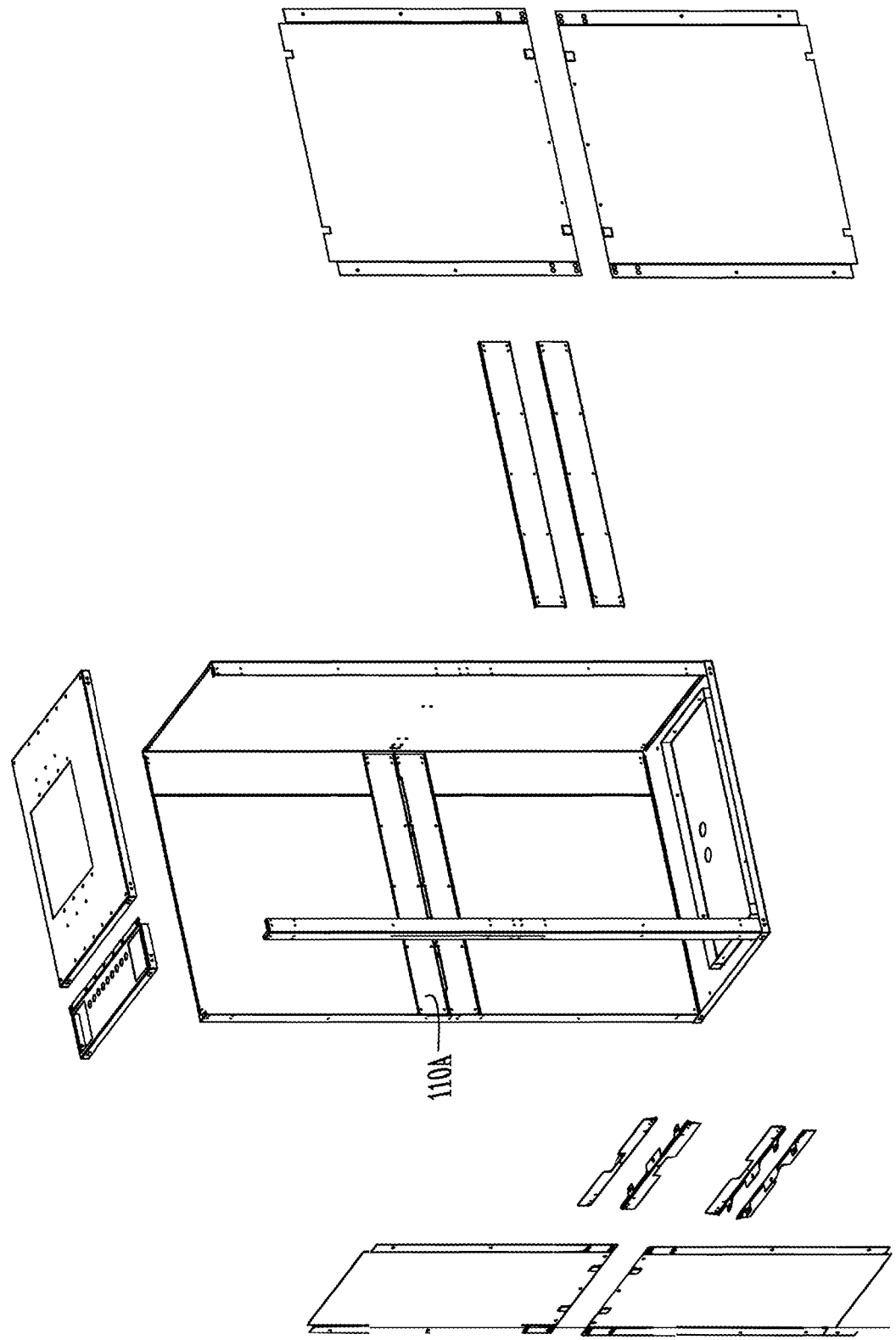
Figure 41:
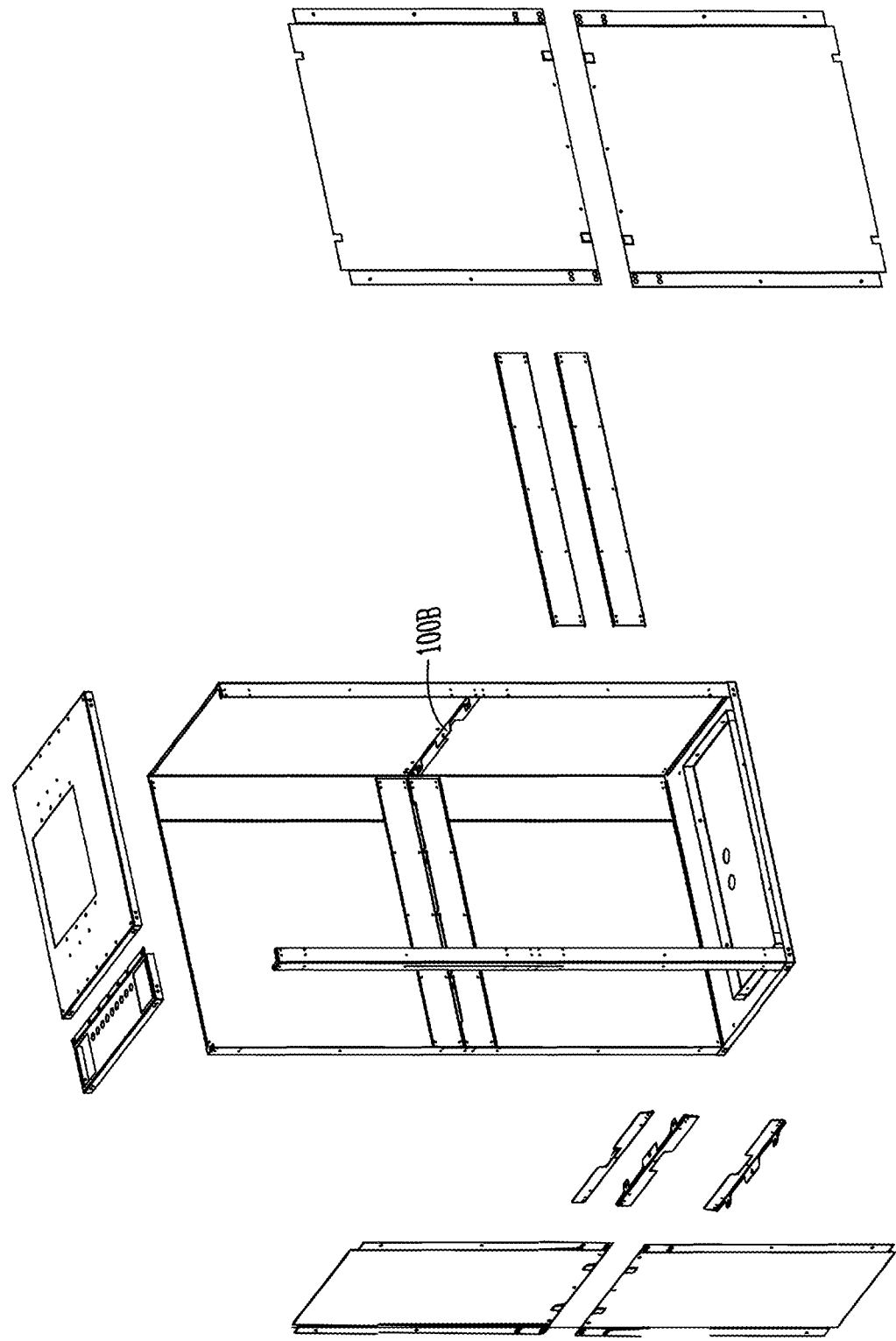

FIGS. 4G and 4H illustrate how identical mid beams 110B and 110A can be bolted with the same bolt hardware across wide wall 30 and the wrap around section of narrow side 20 to further structurally connect those pieces. Those two support beams or plates 110A and B are identical and simply can be reversed to be mirror image if needed and thus only one of those parts is needed in inventory.

Figure 4J:
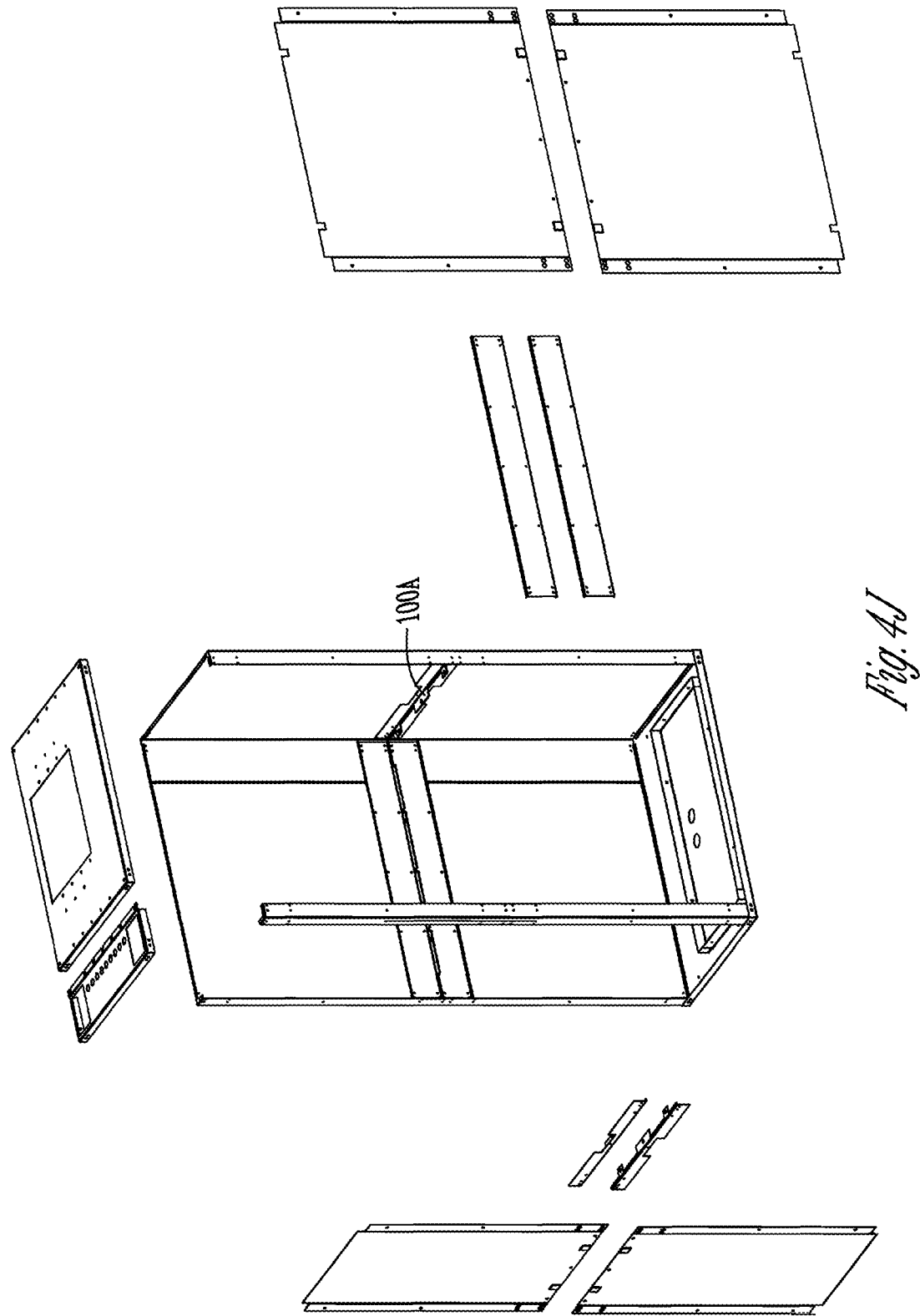

In a similar fashion FIGS. 4I and 4J show a sequentially how identical narrow side mid supports 100B and 100A can be installed along basically the midpoint of wrap around narrow side 20. It can be seen those supports are identical in shape but can simply be arranged as mirror images and have mounting tabs to bolt and support the hydronic coil 140 in position. Again, it is possible for the same bolt hardware to be used. However, if different hardware is needed, it can be accommodated.

Figure 4K:
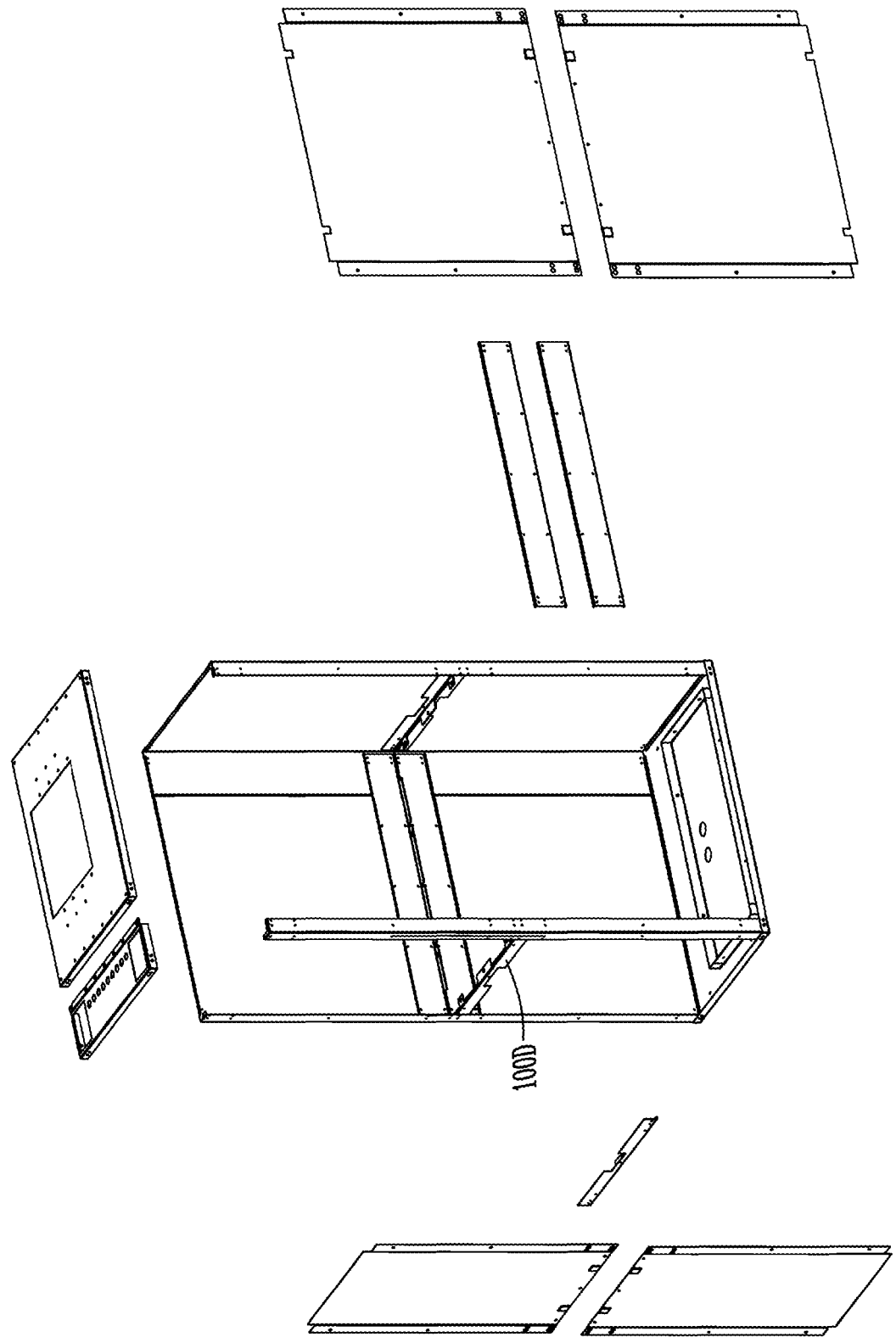
Figure 4L:
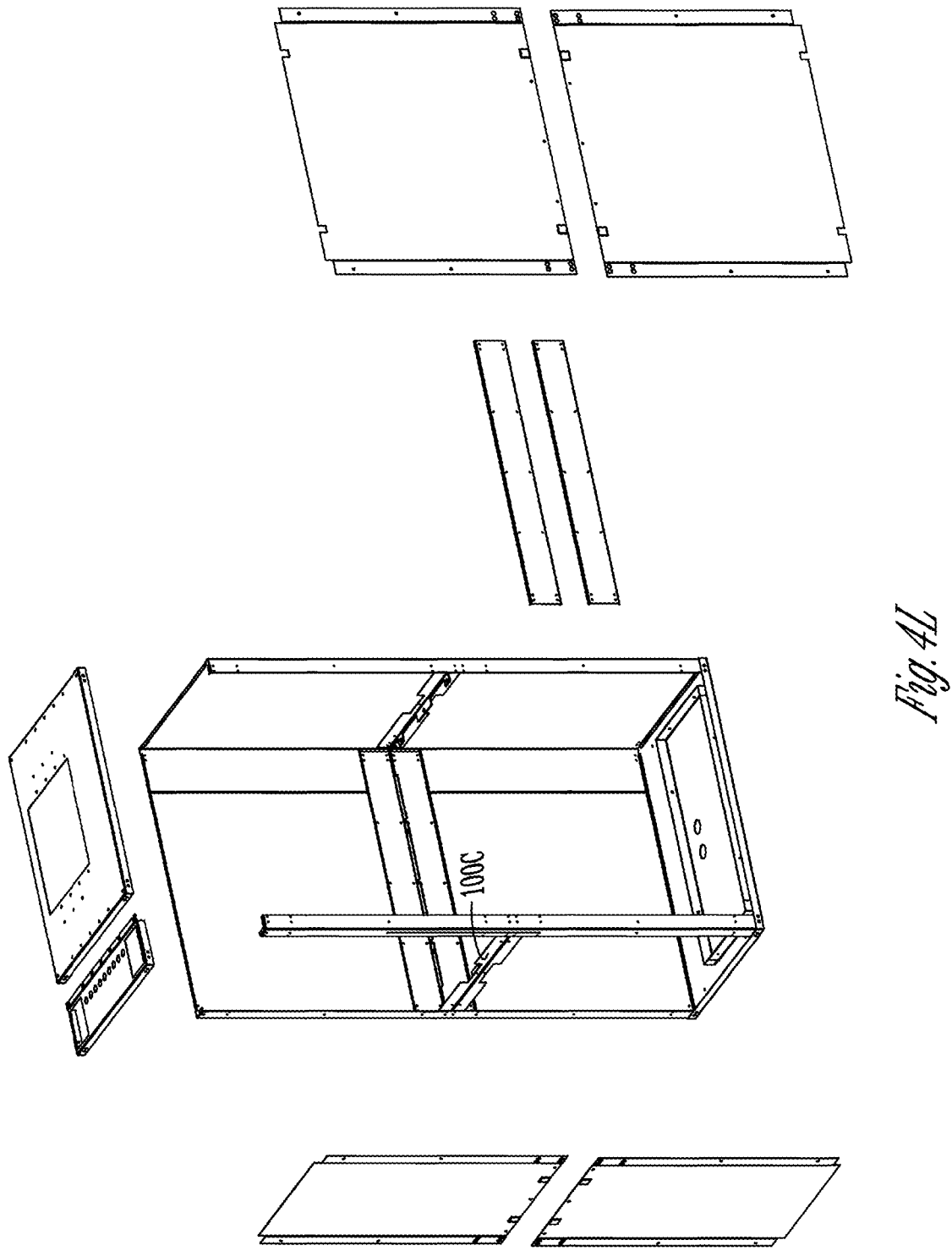

FIGS. 4K and 4L show additional narrow side mid supports 100D and 100C can be bolted by the same hardware between wide wall 30 and vertical support 60.

Figure 4N:
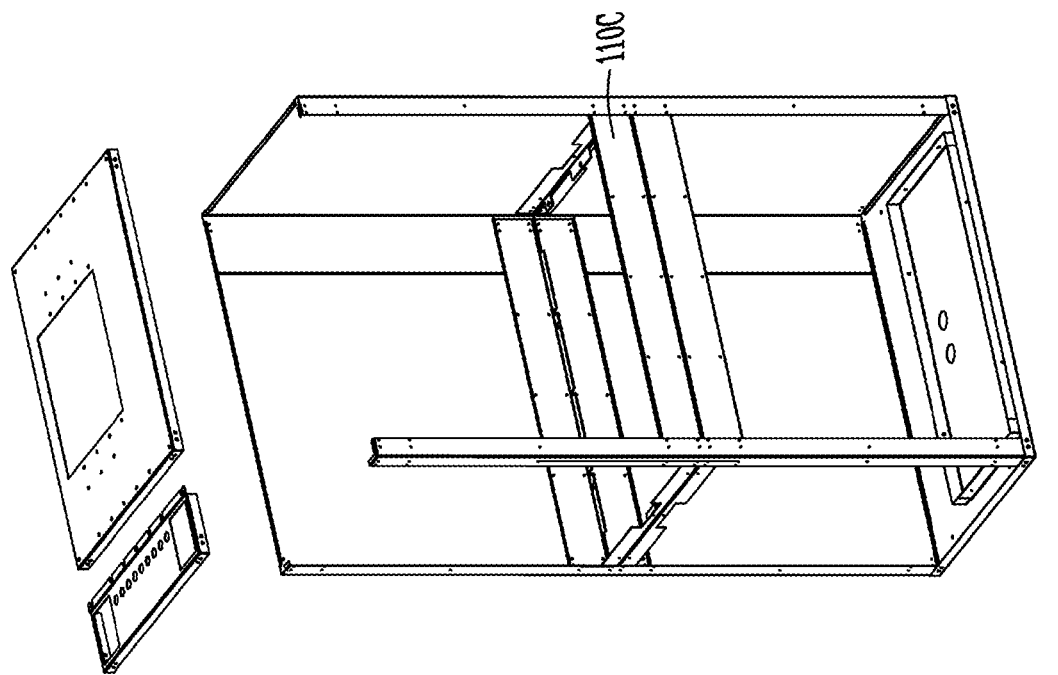
Figure 4R:
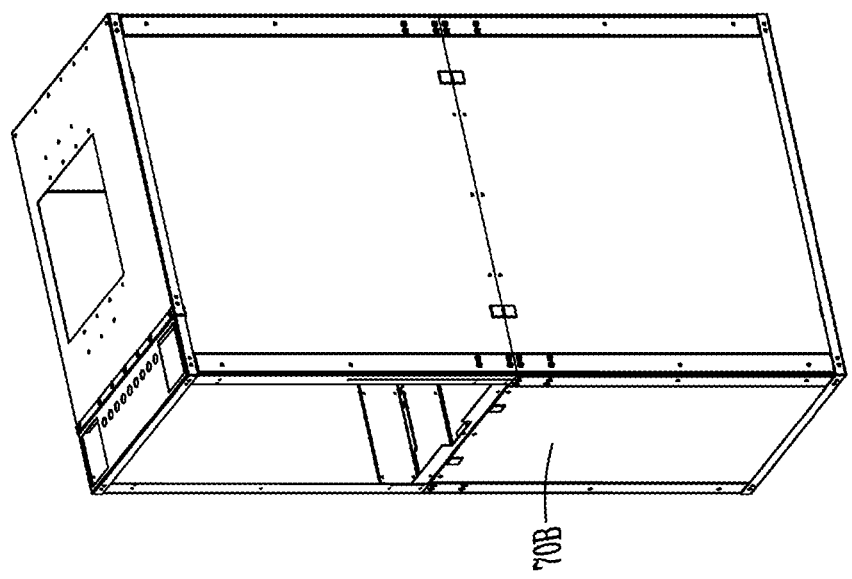
Figure 4S:
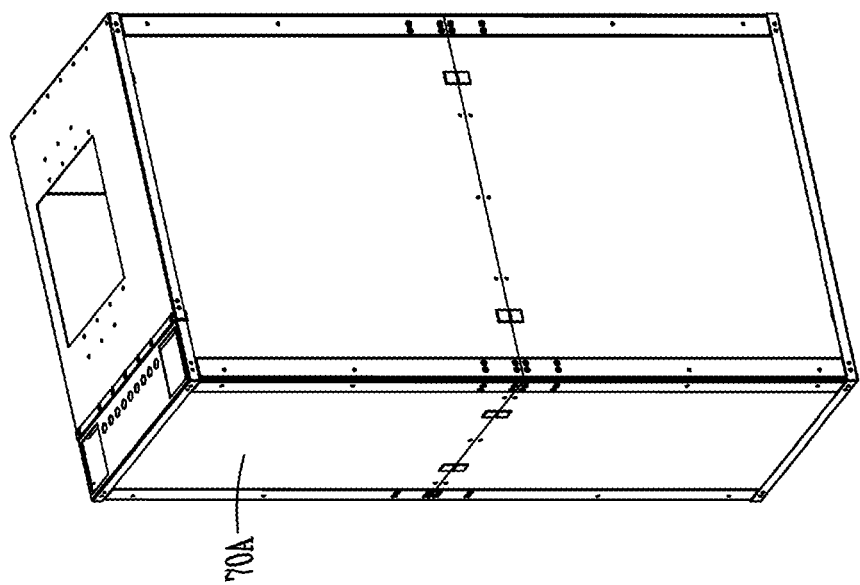

FIGS. 4M and 4N show two additional parallel mid support plates 100D and 100C can be added from vertical support 60 over to narrow wrap around side 20.

FIG. 4O shows that top 50A and second top piece 50B can then be bolted down to the top of the partial assembly at FIG. 4N. As can be appreciated, once that occurs, a structural skeleton by wrap around narrow side 20, one piece wide side 30, bottom piece 40A, and top pieces 58B, along with the vertical support 60 and the wide and narrow side strengthening plates 100A-D and 110A-D essentially produce a structurally robust enclosure to support interior components of air handler subsystem 13. However, as illustrated at FIG. 4O, it allows access through removable access panels to two sides of enclosure 130.

As would be appreciated, the ability to create a structurally robust enclosure 130 for the air handler subsystem 13 but also allow selectable access through at least two sides, provides high flexibility for the designer, installer, and maintainer.

As can be further appreciated by FIGS. 4P-S, having two wide side access panels 80B and 80A and two narrow side access panels 70B and 70A available and removable, the rectangular and cross section housing 130 can be installed in different limited spaces or in different orientations (e.g. narrow sides vertical or narrow sides horizontal) with the high probability with at least one side would allow sufficient access for maintenance and repair.

As can be further appreciated, any of those access panels could either be slid into position because of the configuration of the skeleton support. Alternatively, one or more of them could be bolted into position (using the same bolt hardware).

FIG. 4T illustrates the four potential removal access panels 70A and B and 80A and B removed and internal components of air handler subsystem 13 shown. As can be appreciated, each is accessible and/or removable with removal of mounting hardware (e.g., bolts). This includes water pump 142 and control circuit 150, each could be bolted to available holes or easily created (e.g., drilled) holes in wide side wall 30 or other structure.

Air handler cabinetry 130 has the following features:
a. Each sheet metal piece shown in FIGS. 4A-4T is manufactured from high-sheen, galvanized, 20 gauge metal that can be purchased in high-volume as pre-cut sheets and/or on slit-to-size rolls. This enables cost reduction in materials/engineering/plasma cutting and punching/bending and soft and/or hard tooling since all bend radii stay constant. Sheet galvanizing saves production costs since no degreasing/washing/painting is required and energy costs are reduced when no paint line is required.
b. A single cabinet (130 and FIG. 4A) will house any/all components and can be built using various refrigerant/ heat pump coils, fan assemblies, motors and expansion devices to allow the cooling capacity to cover cooling effect from 1.7/2.1/2.5/2.9/3.3/3.6 and possibly 4.0 tons of refrigeration. These capacities are design parameters and have been computer simulation verified but are subject to actual test chamber audits at GTI, Chicago, IL OH and/or AHRI (Air-Conditioning, Heating and Refrigeration Institute), Arlington, VA.

c. The 1.7 to 2.1 sizes use a Luvata/Heatcraft 2EY 1102E coil, a Morrison or equal 98-8T fan assembly and a Fasco or equal ⅙ hp/1075 rpm/PSC/48 frame/1150-60H-1P motor and an Emerson or equal expansion device rated at 2 tons.

d. The 2.5 to 2.9 sizes use a Luvata/Heatcraft 2EY1103E coil, a Morrison or equal 98-8T for assembly and a Fasco or equal ¼ hp/1075 rpm/PSC/48 frame/115V-60H-1P motor and an Emerson or equal expansion device rated at 3 tons.

e. The 3.3 to 3.6 or 4.0 ton sizes use a Luvata/Heatcraft 3EY1102 or 3D coil, a Morrison or equal 100-9T fan assembly and a Fasco or equal ⅓ hp/1075 rpm/PSC/48 frame/115V-GOH-1P motor and an Emerson or equal expansion device rated at 4 tons.

f. The single cabinet (130 and FIG. 4A) will house a hydronic coil and pump that will produce heating capacities from 25,000 BTUh to 80,0000 BTUh—depending on 2.0-5.0 gpm flow rates/entering hot water temperatures from hot-water generator ranging from 130° F. to 155° F. The coil is Luvata/Heatcraft 3WZ1102 or 3WZ1103 or 3WZ1104 depending on required space heating load. Each coil is fed by a TACO 008 or 009 IFC cartridge pump with an internal check-valve.

g. All above components have been listed by one or more Agencies such as ETL/UL/CSA/Intertek/etc.

A single cabinet (130 and FIG. 4A) can house one or more of the following parts common:

a. Bolts/nuts/screws and other hardware items.
b. Armacell or equal duct—liner/sheet insulation material/varies ID tubular insulation.
c. Motor-mounts for 48 frame motor.
d. Motor starting capacitor.
e. Transformer at 40 VA/115 V to 24V.
f. Color-coded wiring harnesses at 18 gauge.
g. Wire protector grommet at ⅝".
h. Push-fit piping fittings by Sharkbite or Watts at ½" ID to ½" ID and/or ½" ID to ¾" ID.
i. Bent-tube ½" ID copper piping assemblies for hydronic coil.
j. Bent-tube ¾" OD suction and ⅜" liquid copper piping assemblies for refrigerant coil.
k. 0High-grade vinyl framed/viscous media filter at 20"× 24" for in-unit mount.
l. Approved PVC/vinyl condensate piping fittings for primary and secondary drainage.
m. Approved vinyl wire-ties.

Note the following regarding the parts used to construct housing 130.

Wrap around narrow side 20 includes a main side wall 21 with a set of mid openings for bolting cross braces 100A and B. Wrap around parcel side 25 includes a set of such bolt holes 26. Flange 27 would allow slidable support and mating of a corresponding edge of wide piece 30. Opposite edge 23 could include bolt holes 24 for connection to top and bottom pieces and other mid brace pieces 110C and D.

Narrow side mid brace piece 100 includes bolt openings that correspond to and allow mounting to those in wrap-around side wall 20. But mid brace 100 also extends across the open wide side (opposite of wide wall 30) to vertical support 600. Bolt or screw holes match those in support 60. As previously mentioned, each mid brace 100 can include tabs 102A, B and C with larger openings 103 that could be used to bolt, for example, hydronic coil 140 to position. When mid braces 100A and B (in back to back mirror image) are on one side of the interior of housing 130, and another set 100C and D (mirror image and back to back) across the other narrow side, they provide structural under supports upon which that coil can be supported and bolted.

One-piece wide side 30 and its bolt hole patterns can receive mid braces 110 on main portion 31. One edge fits into and along flange 27 of narrow side 20. The other edge 33 (with bolt holes 34) can receive narrow side braces 100C and D as well as top and bottom 40A and 50A and B. The top and bottom of wide wall 30 can have a fairly narrow turned in lip for structural integrity.

Single piece 110 can be used for each of the double wide side mid braces 110A and B and 110C and D. The identical piece can simply be put in parallel in double pairs as indicated. Both holes 110 would align. Opposite turned in flanges 117 and 118 would provide structural integrity to the main body of piece 110.

Vertical support 60 basically is V-shaped (90 degree angles). Bolt holes 62 correspond with those for narrow and wide side braces as well as top and bottom. Top and bottom turned lip 68 and 69 help provide structural support.

Bottom or end piece or wall 40A includes aligning bolt holes as well as an inner raised lip that can receive and allow cover bottom piece 40B to be bolted in position to essentially close off that side if desired. 5Bottom insert or cover panel 40B with main portion 46 as well as openings 47 for such things as passage of refrigerant conduits or other things. Raised edges 48 can have bolt holes to bolt to bottom piece 40A.

Top or end pieces 50A and 50B each have a main surface (51 for 50A and 57 for 50B). Bolt holes 52 allow bolting to other supporting pieces of enclosure 130. Bolt holes 56 would be available for bolting a fan around that supply air opening 55. Turned down edges 53A-D have bolt holes that can match up again for structural support to housing 130.

Top plate 50B can include side edges 50A, B and D with bolt holes for attachment to overall housing 130. There can be openings such as could be used for passing refrigerant conduits. A plurality of such openings would allow easy routing for a variety of configurations. The bigger square openings could be used for routing such things as water pipes or electrical wires or other purposes. Flange 58 can be used to removably mount and seal over the gap between piece 50A and 50B.

Access panels 70B and 80B are identical to 70A or 80A, respectively. Therefore, only one style needs to be manufactured and an inventory. They simply can be turned 180 degrees and used for either bottom or top access panels. Note that there are main portions 71 and 81 respectively and then each has side flanges 73 and 83, respectively, with bolt holes if used. Bosses or bump outs on one edge (76 and 86) allow a panel 70B or 80B to be installed by screws or bolts to cabinet 130 and then a corresponding upper panel 70A or 80A, as the case may be, can be supported while the installer bolts or screws it in place. In embodiment 130, just a handful of screws can secure any panel 70A or B, or 80A or B, to housing 130 (in this example seven screws). The configuration allows one such piece for each side to be used to cover the entire side.

FIGS. 5A-J provide additional details about how housing 130 is assembled and provides a structural cabinet for its contents. As can be seen, for example, in the plan views and sectional views indicated, the panels and interior braces or supports provide a robust structural shell/frame to which the interior components can be installed and to and from which appropriate conduits (e.g. refrigerant, water, electrical, drain) can communicate.

FIGS. 6A and B show one example of a condensate collection and drain pan 90 that has horizontal surface 91, vertical surface 92, and then side edges. Each side edge can either receive a coil support 96 (see enlarged view in FIG. 6B) having a horizontal surface 97 to support a refrigeration cycle type coil lower and at an angle (see FIG. 4T) also an inverted U-shape 98 that defines slot 99 allowing the supports to simply be clipped to a side edge of either the vertical or horizontal main parts of 90. The U-shaped portion 98 can interference fit over those edges or can be crimped to keep those in position. Drain lines can leave housing 130 through performed openings in end/bottom pieces 40A and/or B.

As can be appreciated, if housing 130 is turned horizontal (see FIGS. 13 and 14), drain pan 90, and its coil support brackets 96, could support refrigerant coil 136 in an angled but vertical position by locating drain pan on the bottom inside of housing 130. Drain hoses could exit either end of housing 130.

1. Specific Example Configurations for Housing 130

FIGS. 7A-E, 8A-E, 9A-B, 10A-B, and 11-14 illustrate another aspect of highly flexible configuration of air handler unit housing 130 when installed.

FIG. 7A shows that in a most common configuration, housing 130 has narrow sides vertical. The top includes a substantial size opening 55 for supply air out. Narrow side access panel 70A and 70B allow access. FIG. 7A and isometrics 7B-E illustrate how the lower wide side to housing 130 that could include coverage by access panel 80B instead would be configured to essentially receive duct work for returned air. Above it could be removable access panel 80A.

FIGS. 8A-E are similar to FIGS. 7A-E but show an alternative configuration.

2. Specific Examples of Different Installation(s) of Housing 130

FIGS. 9A-B show one optional way housing 130 could be installed. This assembled housing 130 with internal components could be supported by what it would be called pedestal base 200. FIG. 9B illustrates the base 200 in isolation. Because return air comes through a wide side and supply air out the top, the base can simply be an elongated box frame or even U-shaped frame having an upper surface 202 upon which housing 130 could be supported. There could be openings 204 or open sides 206 through which conduit or other connections can be routed.

FIG. 9A illustrates the most common configuration. Air handler housing 130 is supported on a pedestal base 200 in a generally upright or vertical orientation (the narrow sides are vertical). Return air comes in at FRA (bottom of one of the wide sides). The top of that wide side is covered (e.g. by piece 80A). Both narrow sides are closed. Supply air leaves the top at SA. As shown, access to the interior is at the narrow side shown. No customization of parts is required for this configuration from the starting parts.

FIG. 9B illustrates pedestal base 200. Main body 201 is basically U-shaped, with a floor 202 and spaced-apart upwardly extending opposite sides 203. Floor 202 can be affixed to a support surface (e.g. concrete slab, floor, or other structural surface or member(s)). In one example, screws or lag bolts would be used. L-shaped side brackets would be screwed or bolted to the side of air handler housing 130 that is to abut pedestal base 200 (see preformed holes 207 in the horizontal top surfaces of side brackets 205). Opposite end pieces 208 can slide inside main body 201. Preformed holes 204, 206, a ND 209 in vertical surfaces of main body 201, side brackets 205, and end pieces 208 allow simple screws or bolts/nuts to secure all three together by aligning those hole patterns.

Pedestal base can be made of other materials. One example is wood (2×4 or 2×6 pieces) that would allow screws to affix housing 130 to top horizontal surfaces.

The backbone-side could face down. The legs would then face up and support housing 130 along its bottom center (it would be closed off with panels 40A and B. Preformed openings in each side would allow conduits to enter from any side and be routed appropriately into the open interior space of body 202 and into housing 130 or otherwise (again avoiding having to customize or manufacture such openings at the installation site).

FIG. 10 shows an alternative configuration and mounting for housing 130 (a plenum base 210). Such are well known in the art. Any of these assemblies could be configured at a factory (or other assembly location away from the installation site). Or they could be configured in the field (at the installation site).

The differences from FIG. 9A are principally as follows:
1. Solid end wrapper panel 20 rotates end to end.
2. Panel 50A shifts to the left and panel 50B rotates 180 degrees horizontally on the top the top of housing 130.
3. Hydronic coil/pump rotate 180 degrees horizontally.
4. DX coil rotates 180 top/bottom and 180 degrees horizontally.
5. Control panel shifts left to right.
6. Piping kits move from left end to right end.
7. Use what is called plenum base 210 instead of pedestal base 200.

Again, no customized or different parts are needed. There is just a rearrangement of the starting set of parts. Fasteners are the same. This provides a lower wide side return air option (see FRA) and a top supply air option (SA). It also provides narrow side access. But the configuration is different.

Plenum bases 210, in various possible configurations and styles, are known in the art.

FIG. 11 shows pedestal base 200 supporting air handler housing 130 to a door frame 221 into a closet or room 220. A door 222 closable to frame 221 could include an upper panel that is closed off or decorative and then a lower panel 223 that coincides with the wide side return air opening configuration for housing 130.

In comparison FIG. 12 shows that same pedestal base support 200 for similarly configured air handler housing 130 mounted behind an opening in a wall 230. That opening 231 could receive and upper solid decorative panel 222 that also could be decorative. The lower decorative panel 223 coinciding with return air into housing 130, could allow communication of air there through. It could decorative aspects or simply be a lever or screen.

FIG. 13 shows how housing 130 could be laid down so narrow sides are horizontal. Return air could come in through the bottom piece 40A through duct work or otherwise. Supply air could go out the top main opening in 50A.

Two pedestal bases 200 L and R could support the entire unit 130. Note that each end could be configured for both supply and return air or either. This is also highly flexible. The remainder of housing 130 would basically be solid wall. The top and/or sides could have access panels 70 and/or 80.

FIG. 14 illustrates the configuration like FIG. 13 (narrow sides are horizontal) could be suspended by cables, rods, wires, or otherwise (reference number 240).

D. Options and Alternatives

It will be appreciated the present invention can take many forms and embodiments. The foregoing examples are but a few.

For example, the precise size, shape, and configuration of the components can vary according to need or desire. The specifics regarding operation can also vary according to need or desire. Variations obvious to those skilled in the art are included within the invention. Some other examples of options or alternatives are as follows.

A number of "kits" could be provided for the air handler unit. A brief description of each of these kits follows.

A Pedestal Base Kit is a base for mounting the air handler unit and allows condensate primary, secondary drain lines, and traps to drain through the bottom panel and exit in all directions front, back, either side, above bottom pan for front exit for through-wall mounting. The bottom of the air handler unit is raised by the Pedestal Base Kit to a level that matches a standard panel door when a Return Air Filter Kit is used for door frame installation. The bottom of the air handler unit is raised by the Pedestal Base Kit to a level above decorative baseboard when installed through an interior wall. The Pedestal Base Kit can be used to support the fan coil unit when installed horizontally on slab or floor. Either one or two Pedestal Base Kits can be used as required. Dimensions of the sheet metal enclosure of the Pedestal Base Kit match the bottom of the fan coil unit for stability and provide proper clearances for drain line and traps. One example is shown at FIG. 9B and described earlier.

A Return Air Kit 300 (shown diagrammatically at FIGS. 9A and 10) could be added and designed to work with the Pedestal Base Kit unit and allows top down, or bottom up vertical return airflow on horizontal installations. This kit is a special panel that can be used to replace the bottom, wide side panel on the air handler unit. The purpose of the kit is to match a standard flat or paneled door to provide a means of supplying return air to the air handler unit. The kit is sealed against the door frame when a return air grill is used.

A DX Loop Kit provides a flat panel design for the fan coil unit with no piping above top surface. The DX Loop Kit provides contractor room to avoid interference with duct plenum on the sides and front of the fan coil unit allowing contractor the option of running tubing to/from outside, defrostless heat pump unit to the front, side, up, or down. The DX Loop Kit provides significant contact between suction and liquid refrigerant lines increasing the suction supply temperature and, hence, compressor efficiency and at the same time decreases liquid temperature into the DX coil increasing its capacity/efficiency. The DX Loop Kit suction and liquid lines are located in a single tube of suitable insulation. The ends of the insulation are held back with clamps to allow easy soldering. The clamps can then be released to allow insulation to fully cover the lines. The DX Loop Kit tubing is factory bent/swaged/clamped together to reduce cost by requiring no external fittings and only two internal solder joints. Instead of packaging both the DX coil for heating and cooling in the same box as the hydronic coil, the DX coil is placed in a separate module. The contractor can connect the kit to the air handler unit by soft soldering the DX coil suction and liquid stubs.

A Tank Type Water Heater Loop Kit is unique in that it is a factory pre-assembled kit that simplifies connection to any standard tank type water heater for a hydronic flow loop resulting in dramatically reducing time and skill required to install the loop. Piping on the top of the water tank or in housing 130 in kit form can return water to the tank at a lower temperature (e.g. 105° F.) It has been found this can keep a condensing water heater in condensing mode, which can keep efficiency higher than if not. Normally condensing mode is at around 93-98% efficiency, and around 70% when not. The tank type water heater kit is a factory packaged hydronic piping assembly that sits atop a tank-type water heater and provides the plumber with all items necessary for a proper connection point from the water heater to the fan coil unit. It includes:

a. Cold water inlet ball shut-off valve with ⅝ inch ID by ⅞ inch OD solder cups plus an ASSE approved expansion device to avoid use of an expansion tank.
b. Cold water inlet dielectric union with ⅝ inch ID by ⅞ inch OD solder cups.
c. ASSE 1017 approved mixing valve with internal check-valves and three ⅞ inch unions.
d. Hot water outlet dielectric union with ⅝ inch ID by ⅞ inch OD solder cups.
e. Ball shut off/flow control valve with ⅝ inch ID by ⅞ inch OD solder cups and an auto air vent.
f. Ball shut off/flow control valve with ⅝ inch ID by ⅞ inch OD solder cups and a manual quarter-turn bleed/purge valve.
g. Preformed ½ inch ID by ⅞ inch OD copper tubing assembly designed to accept all above items and dimensioned to fit on any top tapped tank water heater.
h. 4⅝ inch by 4⅝ inch 26 Shark-bite fittings that are factory soldered or shipped loose.
i. Factory piping to and from the hydronic heat coil terminating within the cabinet including proper insulation supplied either loose (in proper lengths) or installed.

An alternative second hydronic type heat exchange kit 310, especially useful for condensing water heaters, is illustrated at FIG. 15 as an optional feature for air handler housing 130. The cabinet 130 (see FIG. 15) will house within its confines an additional hydronic heat exchanger (not the primary hydronic finned coil, i.e. Luvata/Heatcraft 3WE 1102 or 1103 or 1104 shown as 140 on FIG. 15)—that can be factory/field installed as a kit designated as "condensing support kit" and shown in limited detail at reference number 130 on FIG. 15. This kit is located so that it exchanges heat from the return warm water from the primary finned hydronic coil 140 to the returned airstream and thereby allows water returning to a condensing water heater/hot water generator 141 to stay below 105° F. and stay in condensing mode. Condensing mode raises efficiency from 80+ AFUE to 95+ AFUE—thus saving overall cost to run the system in heat mode. Kit 310 reroutes return water downward (see 90 degree push-fit branch 312 in FIG. 15) and through a ½" ID copper loop (trombone loop 311) that has an upper/lower segment in direct contact with return air from the conditioned space. This allows heat transfer from 110° F. to 125° F. return water to 68° F. to 72° F. return air—thus assuming a return water of <105° F. to support condensing. The kit can be sold as a factory installed option or as a field installed kit option. The kit starts with a ½" ID Sharkbite/Watts push-fit connector 314 and returns back (see branch 313) to another ½" ID push-fit 314. The design maximizes heat-exchange surface but allows installation/support within the cabinet confine—while protecting clearances for condensate piping and filter removal. Optionally a cushioned bracket 315 (e.g. L-shaped and attached to panel 20) could support the distal end of trombone 311). Heat Recovery Kit 310 is unique in that it is the only factory pre-assembled system designed to reduce return water temperature to a condensing water heater while using the energy captured to preheat return air. This kit is necessary to cause condensing of the flue gas in the water heater and, hence, maximum efficiency of the condensing water heater. The Heat Recovery Kit is a module to be added to the Tank Type Water Heater Loop Kit. Since it is sold separately the user need only purchase the level of equipment required, i.e. those having tank type water heaters need only purchase the Tank Type Water Heater Loop Kit while those operating a condensing water heater must purchase a Tank Type Water Heater Loop Kit and a Heat Recovery Kit. In order for condensing water heaters to provide maximum efficiency, it is necessary that the return water temperature be less than approximately 105° F. The Heat Recovery Kit provides a bypass copper piping loop that reroutes return water so that it can have heat exchange with relatively cool return air. This lowers the water return temperature and pre heats return air.

Another option is as follows. Instead of an integrated air handler housing/unit 130, a separate housing could include just the secondary heating components. For example, a smaller housing could contain a hydronic coil and water pump with appropriate connectors to a hot water heater or other hot water generator (e.g. natural gas powered, bio fuel powered, solar powered, etc.). It could be sold alone for addition to a primary heat source. It essentially could be an aftermarket module. There could be other kits or modules. Examples are described above. For example, the top half of FIG. 4A could be made as a separate component.

The specific embodiments described herein should not be seen as limiting the scope of the subject invention. Additional variations are possible which would be deemed obvious to one skilled in the art once knowledge of the subject invention was provided.

What is claimed is:

1. A configurable HVAC system for providing conditioned air to a room comprising:
   a. a heat pump sub-system in communication with outside atmospheric air;
   b. an air handler sub-system comprising:
      i. a housing having opposite narrow side walls, opposite wide side walls, and opposite end walls defining an interior space, any of the narrow and wide side walls having the capability of including an access panel to the interior space of the housing;
      ii. a blower mounted to a blower mounting interface on the housing and creating an air path between a return air inlet to the interior space and a supply air outlet from the interior space;
      iii. a heating/cooling coil operatively connected to the heat pump sub-system and mounted along the air path to a heating/cooling coil mounting interface on or in the housing;
      iv. a secondary heating coil mounted to a mounting interface on or in the housing along the air path; and
   c. a control sub-system operatively connected to the heat pump sub-system and the air handler sub-system and further comprising:
      i. a thermostat;
      ii. an outside atmospheric air temperature sensor; and
      iii. a connection to a secondary heat sub-system; and
   d. wherein the control sub-system is programmed to:
      i. monitor supply air temperature at the air handler unit; and
      ii. provide heated air to the room from the heat pump and heating/cooling coil and/or from the secondary heat source and secondary heat coil based on a predetermined supply air temperature; and
   e. wherein upon a call for heat from the thermostat, the control sub-system is programmed to:
      i. operate the heat pump sub-system and air handler to provide heated air from the heating/cooling coil to the room when the temperature sensor senses ambient outdoor temperatures above a predetermined temperature; and
      ii. turn off the heat pump and operate the secondary heat sub-system and air handler to provide heated air from the secondary heating coil when the temperature sensor senses ambient outdoor temperatures below the predetermined temperature.

2. The system of claim 1 wherein the secondary heating coil is operatively connected to a secondary heat source.

3. The system of claim 2 wherein the secondary heat source comprises a tank water heater and the secondary heating coil comprises a hydronic coil, and further comprising a pump to selectively circulate heated water from the water heater through the hydronic coil.

4. The system of claim 3 wherein the water heater is a condensing water heater and further comprising a condensing support sub-system comprising:
   a. a fluid conduit in operative connection to the hydronic coil;
   b. a fluid conduit in operative connection to the water heater;
   c. an intermediate trombone portion positioned in return air to the air handler;
   d. so that additional heat is removed from water returning to the water heater from the hydronic coil to promote condensing mode efficiency at the water heater.

5. The system of claim 1 wherein the predetermined temperature is selected to correspond with whether or not the heat pump requires a defrost cycle.

6. The system of claim 1 wherein the housing has outside dimensions on the order of four feet in height, between one and two feet across narrow sides, and between two and three feet across wide sides.

7. The system of claim 6 wherein any of the narrow and wide side walls having the capability of including an access panel to the interior space of the housing, so that the air handler housing is configurable for different spaces and orientations, the narrow side walls, wide side walls, and end walls have pre-formed and positioned holes which are alignable and joinable by identical fasteners regardless of configuration.

8. The system of claim 6 wherein the narrow side walls and wide side walls have pre-formed and positioned holes to which structural members with pre-formed and positioned holes are alignable and joinable by identical fasteners.

9. A method of providing conditioned air to a room comprising:
   a. providing a heat pump outside the room in communication with outdoor air;
   b. providing an air handler unit in communication with the room, the air handler unit including a heating/cooling coil in operative communication with the heat pump and a secondary heating coil in operative communication with a secondary heat source;
c. monitoring for a request for heat to the room;
d. monitoring outdoor air ambient temperature; and
e. monitoring supply air temperature at the air handler unit, and providing heated air to the room from the heat pump and heating/cooling coil and/or from the secondary heat source and secondary heat coil based on a predetermined supply air temperature; and
f. upon a request for heat:
   i. providing heated air to the room from the heat pump and heating/cooling coil when outdoor air ambient temperature is not indicative of requiring a defrost cycle for the heat pump;
   ii. providing heated air to the room from the secondary heat source and secondary heat coil when outdoor air ambient temperature is indicative of requiring a defrost cycle for the heat pump;
   iii. so that heated air is available to the room without need for defrosting of the heat pump.

10. The method of claim 9 wherein the predetermined supply air temperature is correlated to a comparison of cost of energy to operate the air handler unit versus cost of energy to operate the secondary heat source for a given call for heat to the room.

11. The method of claim 9 wherein the predetermined supply air temperature is at or near normal human body temperature.

12. The method of claim 9 wherein the air handler unit is housed in a configurable housing having opposite narrow sides, opposite wide sides, and opposite end sides, and wherein the housing is installed in one of a plurality of different orientations and configurations.

13. The method of claim 12 wherein the air handler housing comprises parts that can be joined with the same fastening hardware.

14. An HVAC system for providing conditioned air to a space to be heated comprising:
a. a heat pump sub-system in communication with outside atmospheric air;
b. an air handler sub-system with a blower to move air and a heating/cooling coil to add or remove heat from the space to be heated in communication with the heat pump sub-system;
c. a booster heater module in communication with the air handler subsystem comprising:
   i. a housing having opposite narrow side walls, opposite wide side walls, and opposite end walls defining an interior space with an interior temperature sensor;
   ii. an air path between an air inlet to the interior space and an air outlet from the interior space;
   iii. a hydronic coil mounting interface on the housing adapted for mounting of a hydronic heating coil along the air path;
   iv. connections on the hydronic coil for operative connection to a hot water source; and
   v. wherein the air inlet of the booster heater module is in fluid communication with supply air from the air handler unit and the air outlet of the booster heater module becomes the supply air outlet for the air handler sub-system and the booster heater module to the space to be heated;
d. a thermostat;
e. a control sub-system operatively connected to the heat pump sub-system, the combination of the air handler sub-system, the booster heater module, and the thermostat, the control sub-system programmed to:
   i. monitor supply air temperature at the air handler unit; and
   ii. provide heated air to the space to be heated from the heat pump and/or from the booster heater module based on a predetermined supply air temperature; and
f. wherein upon a call for heat from the thermostat, the control sub-system is programmed to:
   i. operate the heat pump sub-system and air handler sub-system to provide heated air from the heating/cooling coil to the room when the temperature sensor senses ambient outdoor temperatures above a predetermined temperature; and
   ii. turn off the heat pump and operate the booster heater module and air handler sub-system to provide heated air from the booster heater module when the interior temperature sensor senses ambient outdoor temperatures below the predetermined temperature.

\* \* \* \* \*